(12) United States Patent
Yuan et al.

(10) Patent No.: US 12,546,647 B2
(45) Date of Patent: Feb. 10, 2026

(54) VIBRATION SENSORS

(71) Applicant: SHENZHEN SHOKZ CO., LTD., Guangdong (CN)

(72) Inventors: Yongshuai Yuan, Shenzhen (CN); Wenjun Deng, Shenzhen (CN); Yujia Huang, Shenzhen (CN); Wenbing Zhou, Shenzhen (CN); Fengyun Liao, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 279 days.

(21) Appl. No.: 18/365,976

(22) Filed: Aug. 5, 2023

(65) Prior Publication Data

US 2023/0384147 A1    Nov. 30, 2023

Related U.S. Application Data

(63) Continuation of application No. PCT/CN2021/129151, filed on Nov. 5, 2021.

(30) Foreign Application Priority Data

Jun. 18, 2021  (CN) .......................... 202110677119.2
Jul. 16, 2021  (WO) ................ PCT/CN2021/106947
(Continued)

(51) Int. Cl.
*G01H 3/06* (2006.01)
*H04R 1/08* (2006.01)
(Continued)

(52) U.S. Cl.
CPC ............. *G01H 3/06* (2013.01); *H04R 1/083* (2013.01); *H04R 9/18* (2013.01); *H04R 9/046* (2013.01)

(58) Field of Classification Search
CPC . G01H 3/06; H04R 1/083; H04R 9/18; H04R 9/046
See application file for complete search history.

(56) References Cited

U.S. PATENT DOCUMENTS 4,211,898 A    7/1980 Atoji et al.
9,661,411 B1   5/2017 Han et al.
(Continued)

FOREIGN PATENT DOCUMENTS

CN    1159950 C    6/2002
CN    1494354 A    5/2004
(Continued)

OTHER PUBLICATIONS

Zhang, Tianhao, Research Of High Speed Acoustic Vibration Sensing Demodulation System Based On Interference Phase Extraction, Chinese Master's Theses Full-text Database Information Science and Technology, 2017, 70 pages.
(Continued)

*Primary Examiner* — Jamel E Williams
(74) *Attorney, Agent, or Firm* — METIS IP LLC

(57) ABSTRACT

Vibration sensors are provided. The vibration sensor may include: a vibration assembly, the vibration assembly including a mass element and an elastic element, and the mass element being connected to the elastic element; a first acoustic cavity, the elastic element constituting one of sidewalls of the first acoustic cavity, and the vibration assembly vibrating to make a volume of the first acoustic cavity change in response to an external vibration signal; an acoustic transducer, the acoustic transducer being in communication with the first acoustic cavity and the acoustic transducer generating an electrical signal in response to a volume change of the first acoustic cavity; and a buffer, the buffer limiting a vibration amplitude of the vibration assembly, wherein the acoustic transducer has a first resonance
(Continued)

frequency, the vibration assembly has a second resonance frequency, and the second resonance frequency of the vibration assembly is smaller than the first resonance frequency.

18 Claims, 22 Drawing Sheets

(30) Foreign Application Priority Data

| | | | |
|---|---|---|---|
| Jul. 22, 2021 | (WO) | ............... | PCT/CN2021/107978 |
| Aug. 11, 2021 | (CN) | ...................... | 202110917789.7 |
| Aug. 11, 2021 | (WO) | ............... | PCT/CN2021/112014 |
| Aug. 11, 2021 | (WO) | ............... | PCT/CN2021/112017 |
| Aug. 19, 2021 | (WO) | ............... | PCT/CN2021/113419 |

(51) Int. Cl.
*H04R 9/18* (2006.01)
*H04R 9/04* (2006.01)

(56) References Cited

U.S. PATENT DOCUMENTS

| | | |
|---|---|---|
| 10,825,982 B1 | 11/2020 | Littrell et al. |
| 11,115,751 B2 | 9/2021 | Zheng et al. |
| 2014/0054104 A1 | 2/2014 | He et al. |
| 2015/0016656 A1 | 1/2015 | Chen et al. |
| 2017/0094414 A1 | 3/2017 | Lembacher et al. |
| 2017/0156002 A1 | 6/2017 | Han et al. |
| 2018/0073917 A1 | 3/2018 | Zhang et al. |
| 2020/0408593 A1 | 12/2020 | Zhang |
| 2021/0160608 A1 | 5/2021 | Zhang et al. |
| 2021/0167275 A1 | 6/2021 | Kim et al. |
| 2022/0386039 A1* | 12/2022 | Krajewski ............. H04R 1/245 |

FOREIGN PATENT DOCUMENTS

| | | | | |
|---|---|---|---|---|
| CN | 101098569 A | | 1/2008 | |
| CN | 101644718 A | | 2/2010 | |
| CN | 103428622 A | * | 12/2013 | ............... H04R 7/26 |
| CN | 104300831 A | | 1/2015 | |
| CN | 105072551 A | | 11/2015 | |
| CN | 204887455 U | | 12/2015 | |
| CN | 106454651 A | | 2/2017 | |
| CN | 206728276 U | | 12/2017 | |
| CN | 108337617 A | | 7/2018 | |
| CN | 108471258 A | | 8/2018 | |
| CN | 208434106 U | | 1/2019 | |
| CN | 209314103 U | * | 8/2019 | |
| CN | 209526837 U | * | 10/2019 | |
| CN | 209526879 U | | 10/2019 | |
| CN | 209659621 U | | 11/2019 | |
| CN | 110536220 A | | 12/2019 | |
| CN | 110567572 A | | 12/2019 | |
| CN | 210958708 U | | 7/2020 | |
| CN | 211085470 U | * | 7/2020 | |
| CN | 111510834 A | * | 8/2020 | ............. H04R 19/00 |
| CN | 111531978 A | | 8/2020 | |
| CN | 111556419 A | | 8/2020 | |
| CN | 111741418 A | | 10/2020 | |
| CN | 111818409 A | * | 10/2020 | ............. H04R 1/08 |
| CN | 211930820 U | * | 11/2020 | |
| CN | 211930871 U | | 11/2020 | |
| CN | 212086490 U | | 12/2020 | |
| CN | 212183709 U | | 12/2020 | |
| CN | 112565993 A | | 3/2021 | |
| CN | 213280084 U | | 5/2021 | |
| CN | 213342678 U | | 6/2021 | |
| CN | 213403413 U | | 6/2021 | |
| CN | 113286213 A | * | 8/2021 | ............. H04R 23/00 |
| CN | 113447115 A | * | 9/2021 | ............. G01H 11/06 |
| CN | 115243176 A | * | 10/2022 | ............. H04R 1/08 |
| CN | 115412816 A | * | 11/2022 | ............. H04R 1/245 |
| EP | 1067513 A1 | | 1/2001 | |
| JP | H02165400 A | | 6/1990 | |
| JP | H08195995 A | | 7/1996 | |
| JP | 2010085313 A | | 4/2010 | |
| TW | I626854 B | | 6/2018 | |
| WO | 2004066464 A2 | | 8/2004 | |

OTHER PUBLICATIONS

International Search Report in PCT/CN2021/129151 mailed on Mar. 8, 2022, 7 pages.
Written Opinion in PCT/CN2021/129151 mailed on Mar. 8, 2022, 9 pages.
International Search Report in PCT/CN2021/106947 mailed on Apr. 13, 2022, 8 pages.
Written Opinion in PCT/CN2021/106947 mailed on Apr. 13, 2022, 9 pages.
International Search Report in PCT/CN2021/107978 mailed on Oct. 21, 2021, 8 pages.
Written Opinion in PCT/CN2021/107978 mailed on Oct. 21, 2021, 7 pages.
International Search Report in PCT/CN2021/112014 mailed on Jan. 19, 2022, 8 pages.
Written Opinion in PCT/CN2021/112014 mailed on Jan. 19, 2022, 7 pages.
International Search Report in PCT/CN2021/112017 mailed on May 5, 2022, 7 pages.
Written Opinion in PCT/CN2021/112017 mailed on May 5, 2022, 8 pages.
International Search Report in PCT/CN2021/113419 mailed on Mar. 28, 2022, 8 pages.
Written Opinion in PCT/CN2021/113419 mailed on Mar. 28, 2022, 8 pages.

* cited by examiner

VIBRATION SENSORS

CROSS-REFERENCE TO RELATED APPLICATION

This application is a Continuation of International Application No. PCT/CN2021/129151, filed on Nov. 5, 2021, which claims priority to Chinese Patent Application No. 202110677119.2, filed on Jun. 18, 2021, International Application No. PCT/CN2021/106947, filed on Jul. 16, 2021, Chinese Application No. 202110917789.7, filed on Aug. 11, 2021, International Application No. PCT/CN2021/107978, filed on Jul. 22, 2021, International Application No. PCT/CN2021/112014, filed on Aug. 11, 2021, International Application No. PCT/CN2021/112017, filed on Aug. 11, 2021, International Application No. PCT/CN2021/113419, filed on Aug. 19, 2021, the entire contents of each of which are herein incorporated by reference.

TECHNICAL FIELD

The present disclosure relates to the field of acoustics, and in particular, to a vibration sensor.

BACKGROUND

The vibration sensor is one of commonly used vibration detection devices, which converts a collected vibration signal into an electrical signal or information of other required forms for output through an internal transducing component of the vibration sensor. A sensitivity represents a ratio of an intensity of an output signal of a sensing device to an intensity of an input signal. If the sensitivity is too small, user experience may be affected. In order to make the vibration sensor have a relatively large sensitivity, a height of a sensing cavity (e.g., an acoustic cavity) in the vibration sensor is generally set to be relatively small, so as to reduce a volume of the sensing cavity. However, when a vibration amplitude of external vibration is relatively large, a vibration amplitude of a diaphragm of the vibration sensor may also be relatively large, and when the volume of the sensing cavity is relatively small, collision may be caused between the diaphragm and other components (e.g., a substrate, a housing) of the vibration sensor, making the diaphragm easily damaged and affecting the use of the vibration sensor.

Therefore, it is desirable to provide a vibration sensor to improve the reliability of the vibration sensor.

SUMMARY

One aspect of the present disclosure provides a vibration sensor, including: a vibration assembly, the vibration assembly includes a mass element and an elastic element, and the mass element being connected to the elastic element; a first acoustic cavity, the elastic element constituting one of the side walls of the first acoustic cavity, and the vibration assembly vibrating to make a volume of the first acoustic cavity change in response to an external vibration signal; an acoustic transducer in communication with the first acoustic cavity, the acoustic transducer generating an electrical signal in response to a volume change of the first acoustic cavity; a buffer that limits a vibration amplitude of the vibration assembly; wherein the acoustic transducer has a first resonance frequency, the vibration assembly has a second resonance frequency, and the second resonance frequency of the vibration assembly is lower than the first resonance frequency.

In some embodiments, at a frequency smaller than 1000 Hz, a sensitivity of the vibration assembly is greater than or equal to −40 dB.

In some embodiments, the second resonance frequency is smaller than the first resonance frequency by 1 kHz to 10 kHz.

In some embodiments, the buffer is disposed on a sidewall of the first acoustic cavity that is perpendicular to a vibration direction of the vibration assembly, the buffer provides a buffer distance in the vibration direction of the vibration assembly for the vibration assembly, and the buffer distance is greater than or equal to 0 and is smaller than a maximum vibration amplitude of the vibration assembly.

In some embodiments, the elastic element is disposed opposite to the acoustic transducer, and the buffer is connected to the elastic element or the acoustic transducer.

In some embodiments, the buffer is of a block shape or a sheet shape; or, the buffer includes a plurality of buffer points, or a plurality of buffer particles, or a plurality of buffer posts spaced on the elastic element or the acoustic transducer.

In some embodiments, the vibration sensor further includes a housing that receives the external vibration signal and transmits the external vibration signal to the vibration assembly.

In some embodiments, the housing forms an acoustic cavity, the vibration assembly is located in the acoustic cavity, and separates the acoustic cavity into the first acoustic cavity and a second acoustic cavity.

In some embodiments, the buffer is disposed in the first acoustic cavity and/or the second acoustic cavity, and the buffer provides a buffer distance in a vibration direction of the vibration assembly for the vibration assembly.

In some embodiments, the buffer distance is greater than or equal to 0 and smaller than the maximum vibration amplitude of the vibration assembly.

In some embodiments, the buffer includes a first buffer part and a second buffer part, and the first buffer part and the second buffer part are respectively disposed on both sides of the elastic element in the vibration direction of the vibration assembly.

In some embodiments, the first buffer part is connected to the housing or the elastic element, and the second buffer part is connected to the elastic element or the acoustic transducer.

In some embodiments, the first buffer part includes a plurality of first buffer blocks, and the second buffer part includes a plurality of second buffer blocks.

In some embodiments, one end of the buffer in the vibration direction of the vibration assembly is connected to the elastic element, and another end of the buffer in the vibration direction of the vibration assembly is connected to the housing or the housing or the acoustic transducer.

In some embodiments, the buffer includes a first buffer part and a second buffer part, and the first buffer part and the second buffer part are respectively disposed on both sides of the elastic element in the vibration direction of the vibration assembly.

In some embodiments, there are a plurality of buffers, and the plurality of the buffers are spaced along a circumferential direction of the elastic element.

In some embodiments, the buffer includes a magnetic buffer for generating a magnetic field. The mass element comprises a magnetic or magnetizable member, the mass element being located within the magnetic field.

In some embodiments, the magnetic buffer includes a coil mounted on a sidewall of the acoustic transducer connected to the first acoustic cavity.

In some embodiments, the coil is embedded in a sidewall of the acoustic transducer connected to the first acoustic cavity.

In some embodiments, the mass of polymer material in the mass element exceeds 80%.

In some embodiments, a mass of a polymer material of the elastic element exceeds 80%.

In some embodiments, the mass element and the elastic element are made of a same material.

In some embodiments, there are multiple mass elements, and the plurality of mass elements are connected to the elastic element.

In some embodiments, a count of the mass elements is greater than or equal to 3. The mass elements are arranged in a non-colinear way.

In some embodiments, the plurality of proof masses differ in at least one structural parameter, the at least one structural parameter including a size, a mass, a density, or a shape.

In some embodiments, one or more cantilever beam structures and one or more mass blocks physically connected to each of the one or more cantilever beam structures are disposed in the first acoustic cavity.

In some embodiments, the vibration assembly includes one or more groups of diaphragms and mass blocks, and in each group of diaphragm and mass block, the mass block is physically connected to the diaphragm.

In some embodiments, the one or more groups of diaphragms and mass blocks are disposed in sequence in a vibration direction of the diaphragms. A distance between adjacent diaphragms in the vibration assembly is greater than or equal to a maximum vibration amplitude of the adjacent diaphragms.

In some embodiments, each group of the one or more groups of diaphragms and mass blocks corresponds to a target frequency band, and a sensitivity of the vibration sensor is greater than a sensitivity of the acoustic transducer in the corresponding target frequency band.

In some embodiments, at least two groups of the one or more groups of diaphragms and mass blocks have different resonance frequencies.

In some embodiments, the vibration assembly further includes a support element configured to support the one or more groups of diaphragms and mass blocks, the support element is physically connected to the acoustic transducer, and the one or more groups of diaphragms and mass blocks are connected to the support element.

In some embodiments, the support element is made of an airtight material, and each diaphragm includes a gas permeable membrane.

In some embodiments, the elastic element includes a first elastic element and a second elastic element, and the first elastic element and the second elastic element are connected to opposite sides of the mass element in the vibration direction of the vibration assembly, respectively.

In some embodiments, a size, a shape, a material, or a thickness of the first elastic element is the same as a size, a shape, a material, or a thickness of the second elastic element.

In some embodiments, the first elastic element is connected to the first buffer part, and the second elastic element is connected to the second buffer part.

In some embodiments, the mass element includes a first mass element and a second mass element, and the first mass element and the second mass element are connected to opposite sides of the elastic element in the vibration direction of the vibration assembly, respectively.

In some embodiments, a size, a shape, a material, or a thickness of the first mass element is the same as a size, a shape, a material, or a thickness of the second mass element.

In some embodiments, the elastic element is connected around a sidewall of the mass element, and the elastic element extends toward the acoustic transducer and is connected to the acoustic transducer directly or indirectly.

In some embodiments, the vibration sensor further includes a substrate, the substrate is disposed on the acoustic transducer, and one end of the elastic element extending toward the acoustic transducer is connected to the substrate.

In some embodiments, the buffer is disposed in the first acoustic cavity, and the buffer is connected to at least one of the mass element and the acoustic transducer, and/or, the buffer is disposed in the second acoustic cavity, and the buffer is connected to at least one of the mass element and the housing.

In some embodiments, the buffer includes a coil for generating a magnetic field; the mass element includes a magnetic member or a magnetizable member, and the mass element is located within the magnetic field; the coil is mounted on a sidewall of the acoustic transducer connected to the first acoustic cavity.

In some embodiments, the elastic element is disposed opposite to the acoustic transducer, at least one convex structure is disposed on a side of the elastic element facing the first acoustic cavity, and the elastic element drives the at least one convex structure to move in response to the external vibration signal, and the movement of the at least one convex structure changes the volume of the first acoustic cavity.

In some embodiments, the at least one convex structure abuts against a sidewall of the first acoustic cavity opposite to the elastic element.

In some embodiments, the at least one convex structure has elasticity, the at least one convex structure produces elastic deformation when the at least one convex structure moves, and the elastic deformation changes the volume of the first acoustic cavity.

In some embodiments, the buffer is disposed in the second acoustic cavity, and the buffer is connected to the mass element and/or the housing.

In some embodiments, the vibration assembly further includes a support element, the mass element and the support element are physically connected to both sides of the elastic element, and the support element is physically connected to the acoustic transducer; and the support element is physically connected to the acoustic transducer. The support element, the elastic element, and the acoustic transducer form the first acoustic cavity In some embodiments, an area of a cross section of the mass element perpendicular to a vibration direction of the vibration assembly is greater than an area of a cross section of the first acoustic cavity perpendicular to the vibration direction of the vibration assembly, and an area of a cross section of the elastic element perpendicular to the vibration direction of the vibration assembly is greater than the area of the cross section of the first acoustic cavity perpendicular to the vibration direction of the vibration assembly. The mass element is configured to compress and deform an area where the elastic element is in contact with the support element in response to the external vibration signal, and the elastic element is capable of vibrating to make the volume of the first acoustic cavity change.

In some embodiments, the support element comprises a ring structure.

In some embodiments, the area of the cross section of the mass element perpendicular to the vibration direction of the vibration assembly is greater than or equal to an area of a cross section of an outer ring of the ring structure perpendicular to the vibration direction of the vibration assembly, and the area of the cross section of the elastic element perpendicular to the vibration direction of the vibration assembly is greater than or equal to the area of the cross section of the outer ring of the ring structure perpendicular to the vibration direction of the vibration assembly.

In some embodiments, the area of the cross section of the mass element perpendicular to the vibration direction of the vibration assembly is equal to the area of the cross section of the elastic element perpendicular to the vibration direction of the vibration assembly.

In some embodiments, the buffer is disposed in the second acoustic cavity, and the buffer is connected to at least one of the mass element and the housing.

BRIEF DESCRIPTION OF THE DRAWINGS

The present disclosure is further illustrated in terms of exemplary embodiments. These exemplary embodiments are described in detail with reference to the drawings. These embodiments are non-limiting exemplary embodiments, in which like reference numerals represent similar structures, wherein.

DETAILED DESCRIPTION

Figure 1:
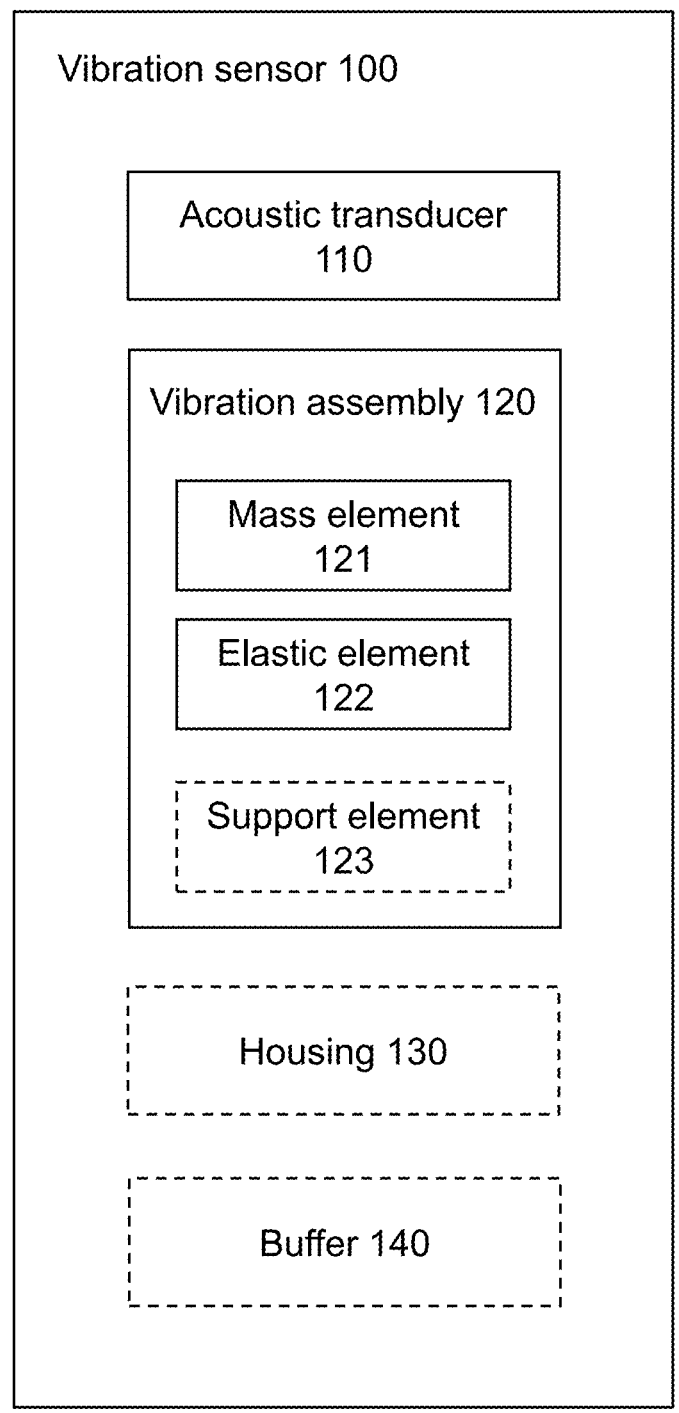
FIG. 1 is a block diagram illustrating an exemplary vibration sensor according to some embodiments of the present disclosure.

In order to more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It should be understood that the "system," "device," "unit," and/or "module" used herein are one method to distinguish different components, elements, parts, sections, or assemblies of different levels. However, if other words can achieve the same purpose, the words can be replaced by other expressions.

As used in the disclosure and the appended claims, the singular forms "a," "an," and "the" include plural referents unless the content clearly dictates otherwise; the plural forms may be intended to include singular forms as well. In general, the terms "comprise," "comprises," and/or "comprising," "include," "includes," and/or "including," merely prompt to include steps and elements that have been clearly identified, and these steps and elements do not constitute an exclusive listing. The methods or devices may also include other steps or elements.

The flowcharts used in the present disclosure illustrate operations that the system implements according to the embodiment of the present disclosure. It should be understood that the foregoing or following operations may not necessarily be performed exactly in order. Instead, the operations may be processed in reverse order or simultaneously. Besides, one or more other operations may be added to these processes, or one or more operations may be removed from these processes.

The embodiment of the present disclosure provides a vibration sensor. The vibration sensor may include an acoustic transducer and a vibration assembly. In some embodiments, the vibration assembly may include a mass element and an elastic element, and the mass element may be connected to the elastic element. A first acoustic cavity may be formed between the elastic element and the acoustic transducer. The elastic element and the acoustic transducer may respectively constitute one of sidewalls of the first acoustic cavity. In response to an external vibration signal, the vibration assembly may vibrate to make a volume of the first acoustic cavity change. The acoustic transducer may be in communication with the first acoustic cavity (e.g., through a sound inlet hole) and the acoustic transducer may generate an electrical signal in response to a volume change of the first acoustic cavity. In some embodiments, the acoustic transducer may have a first resonance frequency, the vibratory assembly may have a second resonance frequency, and the second resonance frequency of the vibratory assembly may be different from the first resonance frequency. In some embodiments, the second resonance frequency may be smaller than the first resonance frequency. Such setting can improve a sensitivity of the vibration sensor in one or more target frequency bands (e.g., frequency bands smaller than the second resonance frequency).

In some embodiments, the vibration sensor may also include a buffer. In some embodiments, the buffer may be used to limit a vibration amplitude of the vibration assembly. In some embodiments, the buffer may be disposed in the first acoustic cavity to provide a buffer distance in the vibration direction of the vibration assembly for the vibration assembly. In some embodiments, the buffer (a first buffer part and a second buffer part) may be respectively disposed on both sides of the elastic element in the vibration direction of the vibration assembly. The first buffer part may be connected to a housing or the elastic element, and the second buffer part may be connected to the elastic element or the acoustic transducer. In some embodiments, the buffer may be disposed in the vibration sensor, which may limit the vibration amplitude of the vibration assembly, thereby preventing the vibration assembly from colliding with other components (e.g., the acoustic transducer, the housing) of the vibration sensor in the vibration process, thereby realizing the protection of the vibration assembly (especially, the elastic element) and improving the reliability of the vibration sensor.

In some embodiments, as shown in FIG. 1, a vibration sensor 100 may include an acoustic transducer 110 and a vibration assembly 120. In some embodiments, the vibration assembly 120 may pick up an external vibration signal and cause the acoustic transducer 110 to generate an electrical signal. When vibration occurs in an external environment, the vibration assembly 120 may transmit the signal to the acoustic transducer 110 in response to the vibration of the external environment, and the acoustic transducer 110 may convert the signal into the electrical signal. In some embodiments, the vibration sensor 100 may be applied to a mobile device, a wearable device, a virtual reality device, an augmented reality device, or the like, or any combination thereof.

In some embodiments, the mobile device may include a smartphone, a tablet computer, a personal digital assistant (PDA), a gaming device, a navigation device, or the like, or any combination thereof. In some embodiments, the wearable device may include a smart bracelet, an earphone, a hearing aid, a smart helmet, a smart watch, smart clothing, a smart backpack, smart accessories, or the like, or any combination thereof. In some embodiments, the virtual reality device and/or the augmented reality device may include a virtual reality helmet, virtual reality glasses, a virtual reality patch, an augmented reality helmet, augmented reality glasses, an augmented reality patch, or the like, or any combination thereof. For example, the virtual reality device and/or the augmented reality device may include Google™ Glass, Oculus Rift™, Hololens, Gear™ VR, etc.

In some embodiments, the acoustic transducer 110 may be used to convert the signal (e.g., the vibration signal, an air conduction sound) into the electrical signal. In some embodiments, the acoustic transducer 110 may include a microphone. Specifically, the microphone may be a microphone with bone conduction as one of the main modes of sound transmission or a microphone with air conduction as one of the main modes of sound transmission. Taking the microphone with air conduction as one of the main modes of sound transmission as an example, the microphone may obtain a sound pressure change of a conduction channel (e.g., a sound pickup hole) and convert the sound pressure change into the electrical signal. In some embodiments, the acoustic transducer 110 may be an accelerometer. The accelerometer may be a specific application of a spring-vibration system, which may obtain the electrical signal by receiving the vibration signal through a sensitive device and obtain acceleration by processing the electrical signal. In some embodiments, the acoustic transducer 110 may have a first resonance frequency. The first resonance frequency may be related to a property (e.g., shape, material, structure) of the acoustic transducer 110. In some embodiments, the acoustic transducer 110 may have a relatively great sensitivity around the first resonance frequency.

In some embodiments, the vibration assembly 120 may have a second resonance frequency. The second resonance frequency may be smaller than the first resonance frequency. In some embodiments, by adjusting the property of the vibration sensor 100 and/or the vibration assembly 120, for example, adjusting the structure and material of the vibration assembly 120, a relationship between the second resonance frequency and the first resonance frequency may be adjusted, so that the second resonance frequency may be smaller than the first resonance frequency, thereby improving the sensitivity of the vibration sensor 100 in a relatively low frequency band. Exemplarily, when the vibration sensor 100 is used as a microphone, a range of a target frequency band may be 200 Hz~2 kHz. Specifically, in some embodiments, if a first resonance frequency of the acoustic transducer is 2 kHz, the second resonance frequency of the vibration assembly 220 may be 800 Hz, 1 kHz, or 1.7 kHz, etc.

In some embodiments, the second resonance frequency may be smaller than the first resonance frequency by 1 kHz~10 kHz. In some embodiments, the second resonance frequency may be smaller than the first resonance frequency by 0.5 kHz~15 kHz. In some embodiments, the second resonance frequency may be smaller than the first resonance frequency by 2 kHz~8 kHz. In some embodiments, the sensitivity of the vibration assembly 120 may be adjusted by adjusting the structure or a parameter of the vibration assembly 120.

The vibration assembly 120 may include a mass element 121 and an elastic element 122. The mass element 121 may be disposed on the elastic element 122. Specifically, the mass element 121 may be disposed on an upper surface and/or a lower surface of the elastic element 122 in the vibration direction of the mass element 121. In some embodiments, the upper surface of the elastic element 122 in a vibration direction of the mass element 121 may be a surface of the elastic element 122 in the vibration direction of the mass element 121 close to the acoustic transducer 110. The lower surface of the elastic element 122 in the vibration direction of the mass element 121 may be a surface of the elastic element 122 in the vibration direction of the mass element 121 away from the acoustic transducer 110.

The mass element 121 may also be called a mass block. In some embodiments, a material of the mass element 121 may be a material with a density greater than a certain density threshold (e.g., 6 g/cm$^3$). In some embodiments, the material of the mass element 121 may be metallic or non-metallic. The metal material may include, but is not limited to steel (e.g., stainless steel, carbon steel), a lightweight alloy (e.g., an aluminum alloy, a beryllium copper alloy, a magnesium alloy, an titanium alloy), or the like, or any combination thereof. The non-metallic material may include, but is not limited to, a polymer material, a glass fiber, a carbon fiber, a graphite fiber, a silicon carbide fiber, etc. In some embodiments, a mass of the polymer material in the mass element 121 may exceed 80%. In some embodiments, the polymer material may include, but is not limited to Poly urethane (PU), Poly amide (PA) (commonly known as nylon), Poly tetra fluoro ethylene (PTFE), Phenol-Formaldehyde (PF), etc. When the vibration assembly 120 receives the vibration signal, the mass element 121 may vibrate in response to the vibration signal. In some embodiments, when the vibration assembly 120 is applied to the vibration sensor or a sound transmission device, the material density of the mass element 121 may have a relatively great influence on a resonance peak of a frequency response curve and the sensitivity of the vibration sensor or the sound transmission device. Under a same volume, the greater the density of the mass element 121 is, the greater the mass of the mass element 121 may be, and the resonance peak of the vibration sensor or the sound transmission device may move to a low frequency, so that the low frequency sensitivity of the vibration sensor or the sound transmission device may increase. In some embodiments, the material density of the mass element 121 may be 6 g/cm 3~20 g/cm$^3$. In some embodiments, the material density of the mass element 121 may be 6 g/cm$^3$~15 g/cm$^3$. In some embodiments, the material density of the mass element 121 may be 6 g/cm$^3$~10 g/cm$^3$. In some embodiments, the material density of the mass element 121 may be 6 g/cm$^3$~8 g/cm$^3$.

In some embodiments, projection of the mass element 121 in the vibration direction of the mass element 121 may be a regular and/or irregular polygon such as a circle, a rectangle, a pentagon, or a hexagon.

In some embodiments, a thickness of the mass element 121 in the vibration direction of the mass element 121 may be 6 um~1400 um. In some embodiments, the thickness of the mass element 121 in the vibration direction of the mass element 121 may be 10 um~1000 um. In some embodiments, the thickness of the mass element 121 in the vibration direction of the mass element 121 may be 50 um~1000 um. In some embodiments, the thickness of the mass element 121 in the vibration direction of the mass element 121 may be 60 um~900 um. In some embodiments, the thickness of the mass element 121 in the vibration direction of the mass element 121 may be 70 um-800 um. In some embodiments, the thickness of the mass element 121 in the vibration direction of the mass element 121 may be 80 um~700 um. In some embodiments, the thickness of the mass element 121 in the vibration direction of the mass element 121 may be 90 um~600 um. In some embodiments, the thickness of the mass element 121 in the vibration direction of the mass element 121 may be 100 um~500 um. In some embodiments, the thickness of the mass element 121 in the vibration direction of the mass element 121 may be 100 um~400 um. In some embodiments, the thickness of the mass element 121 in the vibration direction of the mass element 121 may be 100 um~300 um. In some embodiments, the thickness of the mass element 121 in the vibration direction may be 100 um~200 um. In some embodiments, the thickness of the mass element 121 in the vibration direction of the mass element 121 may be 100 um~150 um.

The elastic element 122 may also be referred to as an elastic membrane, a diaphragm, etc. The elastic element 122 may be an element capable of elastic deformation under the action of an external load. In some embodiments, the elastic element 122 may be a material with good elasticity (i.e., prone to elastic deformation), so that the vibration assembly 120 may have a good vibration response capability. In some embodiments, the material of the elastic element 122 may be a polymer material, a rubber material, or the like, or any combination thereof. In some embodiments, the polymer material may be Polycarbonate (PC), Polyamides (PA), Acrylonitrile Butadiene Styrene (ABS), Polystyrene (PS), High Impact Polystyrene (HIPS), Polypropylene (PP), Polyethylene Terephthalate (PET), Polyvinyl Chloride (PVC), Polyurethanes (PU), Polyethylene (PE), Phenol Formaldehyde (PF), Urea-Formaldehyde (UF), Melamine-Formaldehyde (MF), Polyarylate (PAR), Polyetherimide (PEI), Polyimide (PI), Polyethylene Naphthalate two formic acid glycol ester (PEN), Polyetheretherketone (PEEK), Silicone, or the like, or any combination thereof. The PET may be a kind of thermoplastic polyester that is well molded, and the diaphragm made of the PET may be often referred to as a Mylar membrane. The PC may have a relatively strong impact resistance and may be dimensionally stable after molding. The PAR may be an advanced version of the PC, mainly for an environmental reason. The PEI may be softer than the PET and may have higher internal damping. The PI may have a high temperature resistance, a higher molding temperature, and a long processing time. The PEN may have high strength and may be relatively hard, and a characteristic of the PEN is that the PEN can be painted, dyed, and plated. The PU may be often used in a damping layer or folding ring of a composite material, with high elasticity and high internal damping. The PEEK may be a newer type of material, which may be resistant to friction and fatigue. It should be noted that the composite material can generally take into account characteristics of various materials, commonly, such as a double-layer structure (generally hot-pressed PU, increasing internal resistance), a three-layer structure (a sandwich structure, intermediate damping layer PU, acrylic glue, UV adhesive, pressure-sensitive adhesive), a five-layer structure (two layers of membrane are bonded by double-sided adhesive, and the double-sided adhesive has a base layer, usually PET).

In some embodiments, a Shore hardness of the elastic element 122 may be 1 HA~50 HA. In some embodiments, the Shore hardness of the elastic element 122 may be 1 HA~45 HA. In some embodiments, the Shore hardness of the elastic element 122 may be 1 HA~40 HA. In some embodiments, the Shore hardness of the elastic element 122 may be 1 HA~35 HA. In some embodiments, the Shore hardness of the elastic element 122 may be 1 HA~30 HA. In some embodiments, the Shore hardness of the elastic element 122 may be 1 HA~25 HA. In some embodiments, the Shore hardness of the elastic element 122 may be 1 HA~20 HA. In some embodiments, the Shore hardness of the elastic element 122 may be 1 HA~15 HA. In some embodiments, the Shore hardness of the elastic element 122 may be 1 HA~10 HA. In some embodiments, the Shore hardness of the elastic element 122 may be 1 HA~5 HA. In some embodiments, the Shore hardness of the elastic element 122 may be 14.9 HA~15.1 HA.

In some embodiments, projection of the elastic element 122 in the vibration direction of the mass element 121 may be a regular and/or irregular polygon such as a circle, a rectangle, a pentagon, or a hexagon.

In some embodiments, a structure of the elastic element 122 may be a membrane-like structure, a plate-like structure, etc. Taking the elastic element 122 of the plate-like structure as an example, the plate-like structure refers to a structure made of flexible or rigid materials capable of carrying one or more mass elements 121. The elastic element 122 may include one or more plate-like structures, and each of the one or more plate-like structures may be connected to the one or more mass elements 121. In some embodiments, a structure formed by a plate-like structure and a mass element 121 physically connected to the plate-like structure may be referred to as a resonance structure. Each of the one or more plate-like structures may be connected to the one or more mass elements 121, which may make the vibration assembly 120 have one or more resonance structures, thereby improving the within the sensitivity of the vibration sensor 100 in one or more target frequency bands.

In some embodiments, the vibration assembly 120 may further include a support element 123. The support element 123 may be connected to the elastic element 122 for supporting the elastic element 122. In some embodiments, the support element 123 may be physically connected to both sides of the elastic element 122, respectively. For example, the support elements 123 may be respectively connected to the upper surface and/or the lower surface of the elastic element 122. In some embodiments, the support element 123 may be physically connected to the acoustic transducer 110, for example, one end of the support element 123 may be connected to the surface of the elastic element 122, and the another end of the support element 123 may be connected to the acoustic transducer 110. In some embodiments, the support element 123, the elastic element 122, and the acoustic transducer 110 may form a first acoustic cavity. In some embodiments, the first acoustic cavity may be in acoustic communication with the acoustic transducer 110. For example, a sound inlet hole (also referred to as a sound pickup hole, a conduction channel) may be disposed on the acoustic transducer 110. The sound inlet hole refers to a hole on the acoustic transducer 110 for receiving a volume change signal of the acoustic cavity. The first acoustic cavity may be in communication with the sound inlet hole disposed on the acoustic transducer 110. The acoustic communication between the first acoustic cavity and the acoustic transducer 110 may cause the acoustic transducer 110 to response to a change in a volume of the first acoustic cavity (i.e., a change in a sound pressure in the first acoustic cavity), and generate an electrical signal based on the change in the volume of the first acoustic cavity.

In some embodiments, a material of the support element 123 may be a rigid material, a semiconductor material, an organic polymer material, a rubber material, or the like, or any combination thereof. In some embodiments, the rigid material may include, but is not limited to a metal material, an alloy materials, etc. The semiconductor material may include, but is not limited to silicon, silicon dioxide, silicon nitride, silicon carbide, or the like, or any combination thereof. The organic polymer material may include, but is not limited to polyimide (PI), Parylene, Polydimethylsiloxane (PDMS), hydrogel, or the like, or any combination thereof. The rubber material may include, but is not limited to gel, silicone rubber, acrylic, polyurethane, rubber, epoxy, hot melt, light curing, or the like, or any combination thereof. In some embodiments, a cross-sectional shape of the support element 123 in the vibration direction of the mass element 121 may be a regular and/or irregular geometric shape such as a rectangle, a circle, an ellipse, or a pentagon.

It should be noted that the support element 123 is not a necessary element of the vibration assembly 120, i.e., the vibration assembly 120 may not include the support element 123.

In some embodiments, the vibration sensor 100 may further include a housing 130. In some embodiments, the housing 130 may be a regular or irregular three-dimensional structure with a cavity (i.e., a hollow portion) inside. In some embodiments, the housing 130 may be a hollow frame structure. In some embodiments, the hollow frame structure may include, but is not limited to, a regular shape such as a rectangular frame, a circular frame, or a regular polygonal frame, and any irregular shape. In some embodiments, the housing 130 may be made of metal (e.g., stainless steel, copper, etc.), plastic (e.g., polyethylene (PE), polypropylene (PP), polyvinyl chloride (PVC), polystyrene (PS), acrylonitrile-butadiene-styrene copolymer (ABS), etc.), a composite material (e.g., a metal matrix composite or a non-metal matrix composite), etc. In some embodiments, the vibration assembly 120 and/or the acoustic transducer 110 may be located in the cavity formed by the housing 130 or at least partially suspended in the cavity of the housing 130.

It should be noted that the housing 130 is not a necessary element of the vibration sensor 100, i.e., the vibration sensor 100 may not include the housing 130.

In some embodiments, the housing 130 may be physically connected to the acoustic transducer 110, at least part of the housing 130 and the acoustic transducer 110 may form an acoustic cavity, and the vibration assembly 120 may be located in the acoustic cavity formed by the housing 130 and the acoustic transducer 110.

In some embodiments, the vibration assembly 120 may be located in the cavity formed by the housing 130 or at least partially suspended in the cavity of the housing 130, and may be directly or indirectly connected to the housing 130, which may separate the acoustic cavity into a plurality of acoustic cavities including the first acoustic cavity and a second acoustic cavity.

In some embodiments, when the vibration assembly 120 includes the support element 123, one end of the support element 123 may be connected to the elastic element 122, and the another end of the support element 123 may be connected to the acoustic transducer 110, so that the first acoustic cavity may be formed between the support element 123, the elastic element 122, and the acoustic transducer 110, and the second acoustic cavity may be formed between the support element 123, the elastic element 122, and the housing 130. In some embodiments, when the vibration assembly 120 does not include the support element 123, a circumferential side of the elastic element 122 may be connected to the acoustic transducer 110, so that the first acoustic cavity may be formed between the elastic element 122 and the acoustic transducer 110, and the rest of the acoustic cavity may form the second acoustic cavity. In some embodiments, when the vibration assembly 120 does not include the support element 123, the circumferential side of the elastic element 122 may be connected to the housing 130, so that the first acoustic cavity may be formed between the elastic element 122, the acoustic transducer 110, and the housing 130, and the rest of the acoustic cavity may form the second acoustic cavity.

In some embodiments, the buffer 140 may be used to limit a vibration amplitude of the vibration assembly 120. In some embodiments, the buffer 140 may be compressed by the vibration assembly 120 to provide a damping force for the vibration assembly 120. In some embodiments, the buffer 140 may be disposed on a sidewall of the first acoustic cavity and/or the second acoustic cavity perpendicular to a vibration direction of the vibration assembly 120, and the buffer 140 may provide a buffer distance in the vibration direction of the vibration assembly 120 for the vibration assembly 120. The buffer distance refers to a moving distance of the vibration assembly 120 (e.g., the mass element 121 or the elastic element 122) in the vibration direction before the buffer 140 provides the damping force for movement of the vibration assembly 120. In some embodiments, the buffer distance may be greater than or equal to 0, and may be smaller than a maximum vibration amplitude of the vibration assembly 120. In some embodiments, the buffer 140 may be disposed in the vibration sensor 100, which may limit the vibration amplitude of the vibration assembly 120, thereby preventing the vibration assembly 120 from colliding with other components (e.g., the acoustic transducer 110, the housing 130) of the vibration sensor 100, realizing protection of the vibration assembly 120 (especially, the elastic element 122), and improving reliability of the vibration sensor 100.

In some embodiments, a material of the buffer 140 may be the polymer material, the rubber material, or the like, or any combination thereof. In some embodiments, the polymer material may include, but is not limited to polyimide (PI), Parylene, Polydimethylsiloxane (PDMS), hydrogel, or the like, or any combination thereof. The rubber material may include, but is not limited to, gel, silicone rubber, acrylic, polyurethane, rubber, epoxy, hot melt, light curing, or the like, or any combination thereof. In some embodiments, an elasticity modulus of the buffer 140 may be 1 MPa~1000 MPa. In some embodiments, the elasticity modulus of the buffer 140 may be 1 MPa~800 MPa. In some embodiments, the elasticity modulus of the buffer 140 may be 5 MPa~800 MPa. In some embodiments, the elasticity modulus of the buffer 140 may be 5 MPa~600 MPa. In some embodiments, the elasticity modulus of the buffer 140 may be 10 MPa~600 MPa. In some embodiments, the elasticity modulus of the buffer 140 may be 30 MPa~500 MPa. In some embodiments, the elasticity modulus of the buffer 140 may be 50 MPa~500 MPa. In some embodiments, the elasticity modulus of the buffer 140 may be 80 MPa~500 MPa. In some embodiments, the elasticity modulus of the buffer 140 may be 80 MPa~300 MPa.

In some embodiments, the buffer 140 may also include a magnetic buffer that may generate a magnetic field. The magnetic buffer may include, but is not limited to, a coil, a magnet, etc. In some embodiments, the magnetic field generated by the magnetic buffer may be consistent with the vibration direction of the vibration assembly 120. In some embodiments, the vibration assembly 120 may include a magnetic member or a magnetizable member, and the magnetic member or the magnetizable member may be disposed in the magnetic field generated by the magnetic buffer. In some embodiments, the mass element 121 may include a magnetic member or a magnetizable member. For example, the mass element 121 may include a ferromagnetic material or a magnet. In some embodiments, during the vibration of the vibration assembly 120, the mass element 121 may attract or repel the magnetic buffer, so that the magnetic buffer may provide the damping force for the vibration assembly 120. By adjusting strength of the magnetic field generated by the magnetic buffer, a force on the mass element 121 during vibration may be changed. In some embodiments, when the strength of the magnetic field generated by the magnetic buffer is relatively high, the force on the mass element 121 may be relatively large, so that the vibration assembly 120 may be not easy to vibrate, and the sensitivity of the vibration sensor 100 may be relatively small. When the strength of the magnetic field generated by the magnetic buffer is relatively small, the force on the mass element 121 may be relatively small, so that the vibration assembly 120 may be easy to vibrate, and the sensitivity of the vibration sensor 100 may be relatively great.

Figure 2:
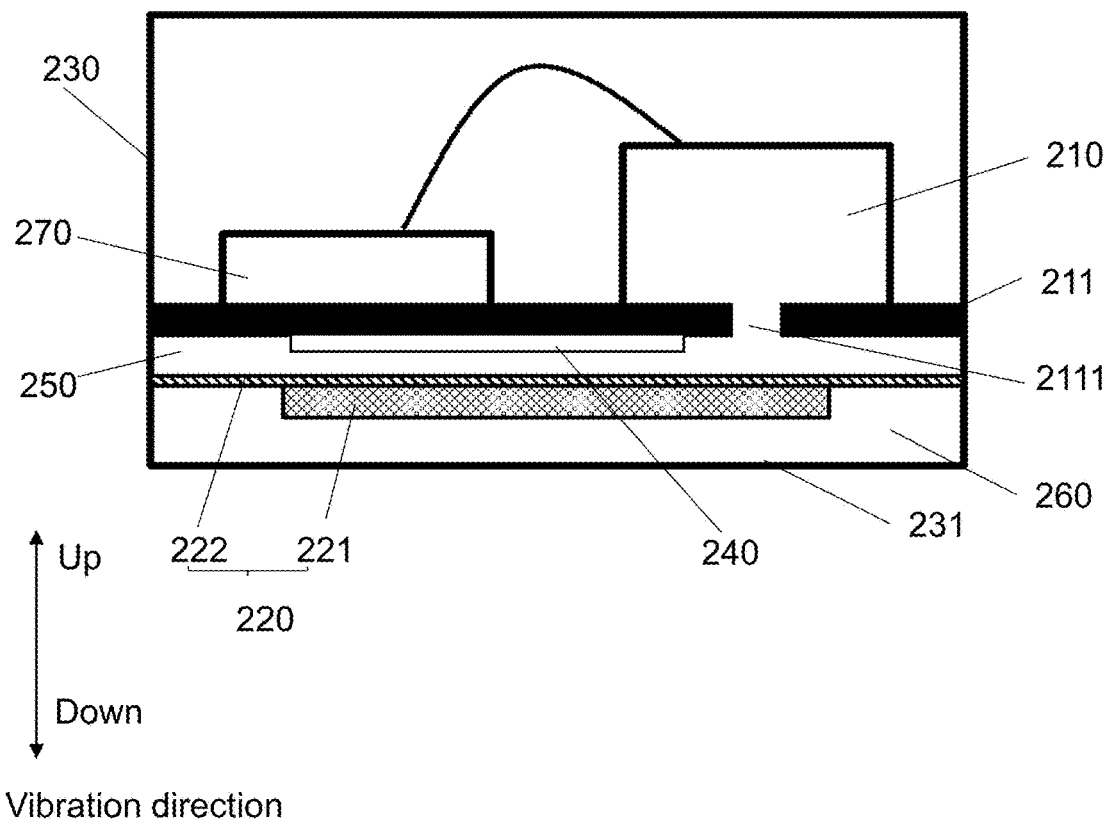
FIG. 2 is a structural diagram illustrating an exemplary vibration sensor according to some embodiments of the present disclosure.
Figure 3:
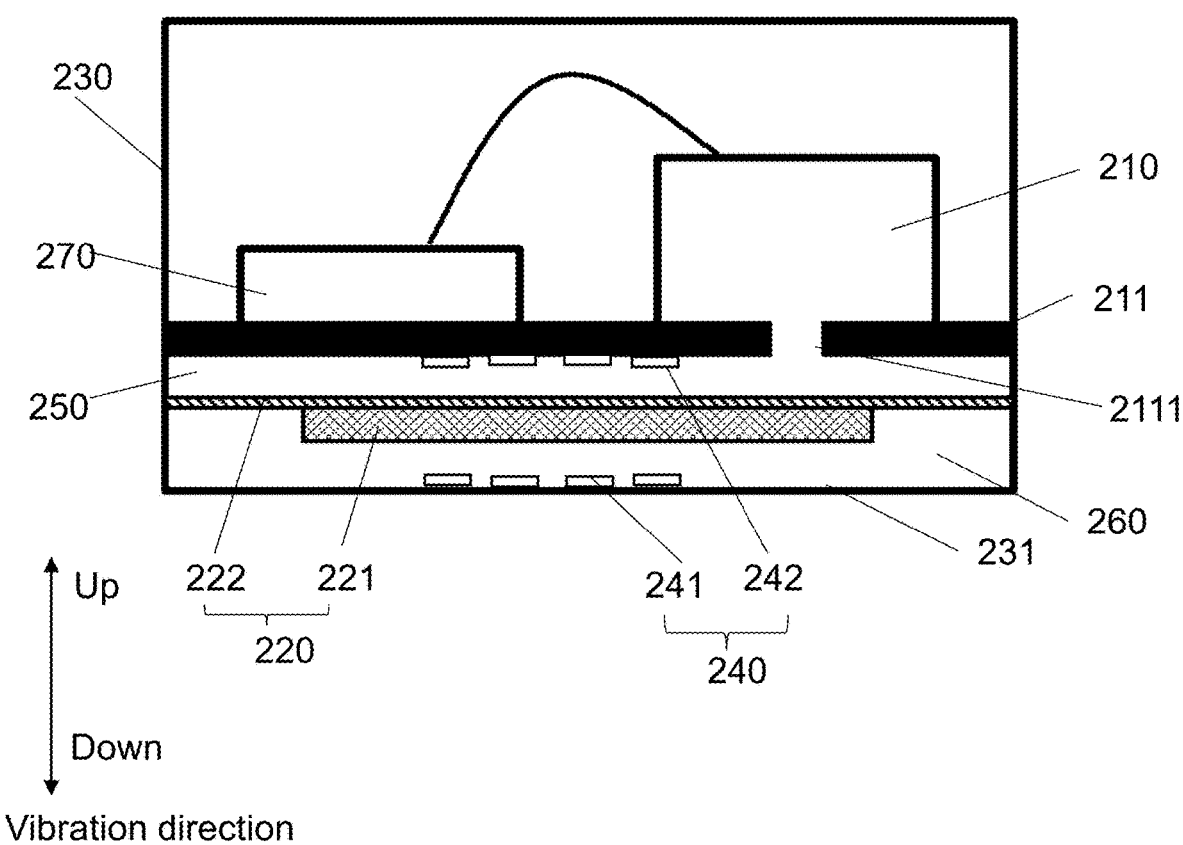
FIG. 3 is a structural diagram illustrating an exemplary vibration sensor according to some embodiments of the present disclosure.
Figure 4:
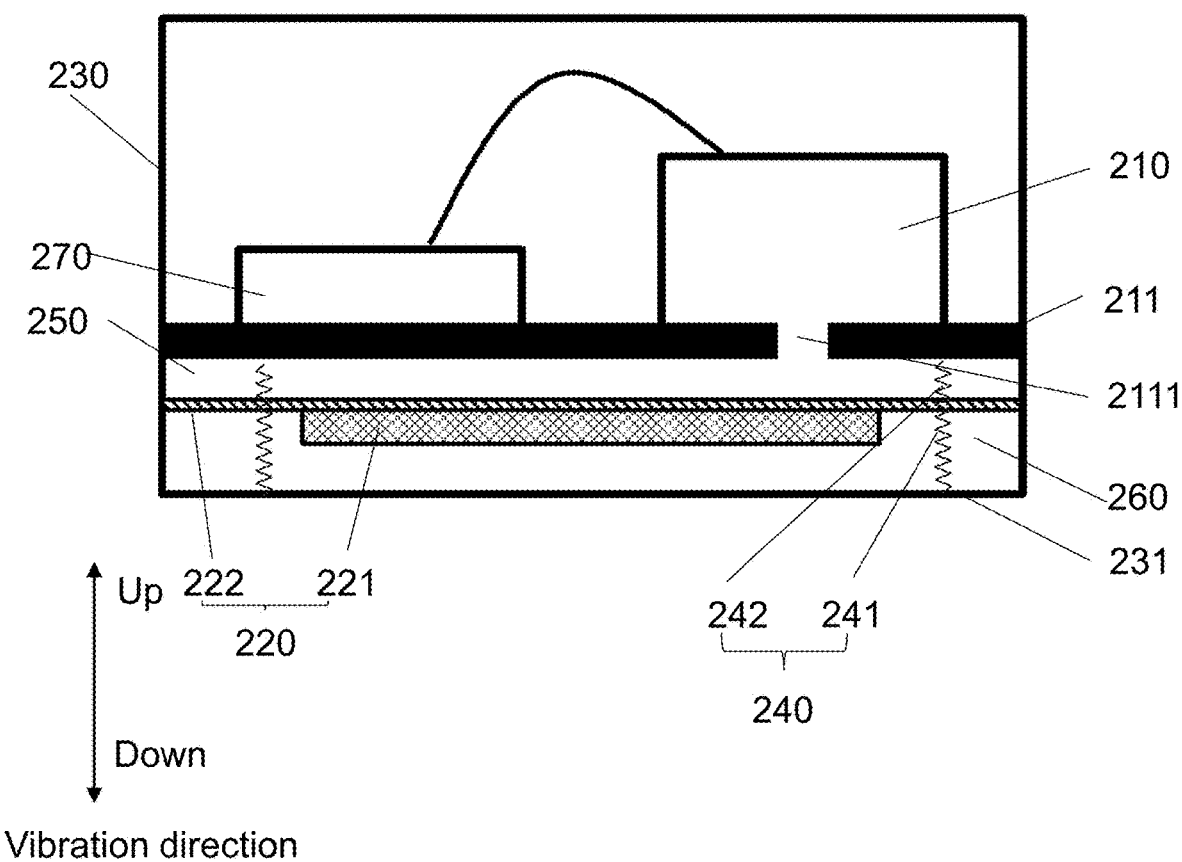
FIG. 4 is a structural diagram illustrating an exemplary vibration sensor according to some embodiments of the present disclosure.

FIG. 2 is a structural diagram illustrating an exemplary vibration sensor according to some embodiments of the present disclosure. FIG. 3 is a structural diagram illustrating an exemplary vibration sensor according to some embodiments of the present disclosure. FIG. 4 is a structural diagram illustrating an exemplary vibration sensor according to some embodiments of the present disclosure.

In some embodiments, as shown in FIGS. 2-4, the vibration sensor 200 may include an acoustic transducer 210, a vibration assembly 220, a housing 230, and a buffer 240. In some embodiments, the acoustic transducer 210 and the processor 270 may be respectively connected to an upper surface of a substrate 211 of the acoustic transducer 210. The substrate 211 may be located in a cavity inside the housing 230. The housing 230 may seal the acoustic transducer 210, the processor 270, the substrate 211, and circuits and other components disposed thereon. The substrate 211 may separate the cavity inside the housing 230 into two chambers disposed up and down. The vibration assembly 220 may be located in a cavity corresponding to a lower surface of the substrate 211. In some embodiments, the acoustic transducer 210 may also have a housing, which may be connected to the substrate 211 to seal an internal component of the acoustic transducer 210. In some embodiments, the housing 230 of the vibration sensor 200 may be a non-closed half-shell-like structure. The substrate 211 of the acoustic transducer 210 may be connected to the housing 230 to form a closed cavity, and the vibration assembly 220 may be disposed in the cavity.

In some embodiments, the vibration assembly 220 may include an elastic element 222 and a mass element 221. The elastic element 222 may be connected to the housing 230 through a circumferential side of the elastic element 222, for example, the elastic element 222 may be connected to an inner wall of the housing 230 by means of gluing, snapping, etc. The mass element 221 may be disposed on the elastic element 222. Specifically, the mass element 221 may be disposed on an upper surface or a lower surface of the elastic element 222. The upper surface of the elastic element 222 refers to a side of the elastic element 222 facing the substrate 211, and the lower surface of the elastic element 222 refers to a side of the elastic element 222 facing away from the substrate 211. In some embodiments, there may be a plurality of mass elements 221, and the plurality of mass elements 221 may be located on the upper surface or the lower surface of the elastic element 222 at the same time. In some embodiments, one part of the plurality of mass elements 221 may be disposed on the upper surface of the elastic element 222, and the other part of the mass elements 221 may be located on the lower surface of the elastic element 222. In some implementations, the mass element 221 may also be embedded in the elastic element 222.

In some embodiments, a first acoustic cavity 250 may be formed between the elastic element 222 and the substrate 211. Specifically, the upper surface of the elastic element 222, the substrate 211, and the housing 230 may form the first acoustic cavity 250, and the lower surface of the elastic element 222 and the housing 230 may form a second acoustic cavity 260. When the vibration sensor 200 (e.g., the housing 230 of the vibration sensor 200) vibrates in response to an external sound signal, since a characteristic of the vibration assembly 220 (the elastic element 222 and the mass element 221) is different from that of the housing 230, the elastic element 222 and the mass element 221 of the vibration assembly 220 may move relative to the housing 230, the elastic element 222 and mass element 221 may make a volume of the first acoustic cavity 250 change during the vibration process relative to the housing 230, and the acoustic transducer 210 may convert an external sound signal into an electrical signal based on a volume change within the first acoustic cavity 250. Specifically, the vibration of the elastic element 222 and the mass element 221 may cause air vibration in the first acoustic cavity 250, and the air vibration may act on the acoustic transducer 210 through a sound inlet hole 2111 disposed on the substrate 211, and the acoustic transducer 210 may convert the air vibration into the electrical signal or generate the electrical signal based on the volume change of the first acoustic cavity 250, and process the electrical signal through the processor 270.

In some embodiments, the vibration sensor 200 may obtain a relatively ideal frequency response by adjusting a mechanical parameter (e.g., a material, a size, or a shape) of the mass element 221, thereby adjusting a resonance frequency, a sensitivity of the vibration sensor 200 and ensuring reliability of the vibration sensor 200. In some embodiments, the mass element 221 may be a regular or irregular shape such as a cuboid, a cylinder, a sphere, an ellipsoid, or a triangle. In some embodiments, a thickness of the mass element 221 may be within a certain range. In some embodiments, the thickness of the mass element 221 may be 1 μm~5000 μm. In some embodiments, the thickness of the mass element 221 may be 1 μm~3000 μm. In some embodiments, the thickness of the mass element 221 may be 1 μm 1000 μm. In some embodiments, the thickness of the mass element 221 may be 1 μm~500 μm. In some embodiments, the thickness of the mass element 221 may be 1 μm~200 μm. In some embodiments, the thickness of the mass element 221 may be 1 μm~50 μm.

In some embodiments, the thickness of the mass element 221 may have a relatively great influence on a resonance peak of a frequency response curve and the sensitivity of the vibration sensor 200. Under a same area, the thicker the mass element 221 is, the greater the total mass of the mass element 221 may be, the resonance peak of the vibration sensor 200 may move forward (which may also be understood as a decrease in the resonance frequency), and the sensitivity may increase. In some embodiments, the area of the mass element 221 may be within a certain range. In some embodiments, the area of the mass element 221 may be 0.1 $mm^2$~100 $mm^2$. In some embodiments, the area of the mass element 221 may be 0.1 $mm^2$~50 $mm^2$. In some embodiments, the area of the mass element 221 may be 0.1 $mm^2$~10 $mm^2$. In some embodiments, the area of the mass element 221 may be 0.1 $mm^2$~6 $mm^2$. In some embodiments, the area of the mass element 221 may be 0.1 $mm^2$~3 $mm^2$. In some embodiments, the area of the mass element 221 may be 0.1 $mm^2$~1 $mm^2$.

In some embodiments, the mass element 221 may contain a polymer material. In some embodiments, the polymer material may include an elastic polymer material, and an elastic property of the elastic polymer material may absorb an external impact load, thereby effectively reducing stress concentration at a joint between the elastic element 222 and the housing 230, so as to reduce a possibility of damage to the vibration sensor 200 due to an external impact. In some embodiments, a mass of the polymer material in mass element 221 may exceed 85%. In some embodiments, the mass of the polymer material in the mass element 221 may exceed 80%. In some embodiments, the mass of polymer material in mass element 221 may exceed 75%. In some embodiments, the mass of the polymer material in the mass element 221 may exceed 70%. In some embodiments, the mass of the polymer material in the mass element 221 may exceed 60%. In some embodiments, the mass element 221 and the elastic element 222 may be made of a same polymer material.

In some embodiments, stiffness of the elastic element 222 may be adjusted by adjusting the mechanical parameter (e.g., Young's modulus, tensile strength, elongation at break, and hardness shore A) of the elastic element 222, so as to adjust the resonance frequency and sensitivity of the vibration sensor 200. In some embodiments, the sensitivity of the vibration sensor 200 in a target frequency band range (e.g., a human voice frequency band range) may be improved by adjusting the Young's modulus parameter of the elastic element 222. In some embodiments, the greater the Young's modulus of the elastic element 222, the greater the stillness, and the greater the sensitivity of the vibration sensor 200. In some embodiments, the Young's modulus of the elastic element 222 may be 1 MPa~10 GPa. In some embodiments, the Young's modulus of the elastic element 222 may be 100 MPa~8 GPa. In some embodiments, the Young's modulus of the elastic element 222 may be 1 GPa~8 GPa. In some embodiments, the Young's modulus of the elastic element 222 may be 2 GPa~5 GPa. It should be noted that the target frequency band range may be adapted and adjusted according to the vibration sensor 200 in different application scenarios. For example, when the vibration sensor 200 is applied to pick up a sound signal when a user speaks, a specific frequency band range may be the human voice frequency band range. As another example, when the vibration sensor 200 is applied to a sound signal of an external environment, the specific frequency band range may be 20 Hz~10000 Hz.

In some embodiments, the sensitivity of the vibration sensor 200 in the target frequency band range (e.g., the human voice frequency band range) may be improved by adjusting the tensile strength of the elastic element 222. The tensile strength of the elastic element 222 may be a maximum tensile stress that the elastic element 222 can withstand when a necking phenomenon occurs (i.e., concentrated deformation occurs). In some embodiments, the greater the tensile strength of the elastic element 222 is, the greater the sensitivity of the vibration sensor 200 in the specific frequency band range (e.g., the human voice frequency band range) may be. In some embodiments, the tensile strength of the elastic element 222 may be 0.5 MPa~100 MPa. In some embodiments, the tensile strength of the elastic element 222 may be 5 MPa~90 MPa. In some embodiments, the tensile strength of the elastic element 222 may be 10 MPa~80 MPa. In some embodiments, the tensile strength of the elastic element 222 may be 20 MPa~70 MPa. In some embodiments, the tensile strength of the elastic element 222 may be 30 MPa~60 MPa.

In some embodiments, the sensitivity of the vibration sensor 200 in the target frequency band range (e.g., the human voice frequency band range) may be improved by adjusting the elongation at break of the elastic element 222. The elongation at break of the elastic element 222 refers to a ratio of an elongation length before and after stretching to a length before stretching when the material of the elastic element 222 is broken by an external force. In some embodiments, the greater the elongation at break of the elastic element 222, the greater the sensitivity and the better the stability of the vibration sensor 200 in the target frequency band range (e.g., the human voice frequency band range). In some embodiments, the elongation at break of the elastic element 222 may be 10%~600%. In some embodiments, the elongation at break of the elastic element 222 may be 20%~500%. In some embodiments, the elongation at break of the elastic element 222 may be 50%~400%. In some embodiments, the elongation at break of the elastic element 222 may be 80%~200%.

In some embodiments, the sensitivity of the vibration sensor 200 in the target frequency band range (e.g., human voice frequency band range) may be improved by adjusting the hardness of the elastic element 222. The hardness of the elastic element 222 refers to the Shore hardness (i.e., hardness Shore A) of the elastic element 222. In some embodiments, the smaller the hardness of the elastic element 222 is, the greater the sensitivity of the vibration sensor 200 may be. In some embodiments, the hardness Shore A of the elastic element 222 may be smaller than 200. In some embodiments, the hardness Shore A of the elastic element 222 may be smaller than 150. In some embodiments, the hardness Shore A of the elastic element 222 may be smaller than 100. In some embodiments, the hardness Shore A of the elastic element 222 may be smaller than 60. In some embodiments, the hardness Shore A of the elastic element 222 may be smaller than 30. In some embodiments, the hardness Shore A of the elastic element 222 may be smaller than 10.

In some embodiments, the material of the mass element 221 and the material of the elastic element 222 may be the same. In some embodiments, the material of the mass element 221 and the material of the elastic element 222 may be partially the same. In some embodiments, the material of the mass element 221 and the material of the elastic element 222 may be different.

In some embodiments, as shown in FIG. 2, the buffer 240 may be disposed on a sidewall of the first acoustic cavity 250 perpendicular to a vibration direction of the vibration assembly 220. The sidewall of the first acoustic cavity 250 refers to the upper surface of the elastic element 222 in the vibration direction of the vibration assembly 220 and/or the lower surface of the substrate 211 of the acoustic transducer 210. The buffer 240 may provide a buffer distance in the vibration direction of the vibration assembly 220 for the vibration assembly 220. In some embodiments, the buffer distance may be greater than or equal to 0 and may be smaller than a maximum vibration amplitude of the vibration assembly 220. In some embodiments, the buffer distance refers to a distance between the buffer 240 and the other sidewall (i.e., a sidewall where the buffer 240 is not disposed) of the first acoustic cavity 250. Taking the buffer 240 disposed on the substrate 211 as an example, the buffer 240 may be connected to the substrate 211, and the buffer distance provided by the buffer 240 for the vibration assembly 220 at this time may be the distance between the lower surface of the buffer 240 in the vibration direction of the vibration assembly 220 and the upper surface of the elastic element 222 in the vibration direction of the vibration assembly 220. In some embodiments, when the vibration sensor 200 works, if the buffer distance is equal to 0, the vibration of the vibration assembly 220 may directly extrude the buffer 240. If the buffer distance is greater than 0 and smaller than the maximum vibration amplitude of the vibration assembly 220, the vibration assembly 220 may merely extrude the buffer 240 when vibrating to a certain amplitude (i.e., the buffer distance, at this time, the elastic element 222 may be in contact with the buffer 240), thereby limiting the vibration amplitude of the vibration assembly 220, further preventing the vibration assembly 220 from colliding with the substrate 211, and improving the reliability of the vibration 200. In some embodiments, the buffer distance of the buffer 240, a projected area of the buffer 240 perpendicular to the vibration direction of the vibration assembly 220, the material of the buffer 240, or the like, or any combination thereof may be by adjusted, so that the sensitivity, a working bandwidth, etc. of the vibration sensor 200 may be adjusted to improve the applicability of the vibration sensor 200.

In some embodiments, the structure of the buffer 240 may be an integral structure, for example, the buffer 240 may be of a block shape, a sheet shape, etc. In some embodiments, the buffer 240 may include a plurality of buffer points, a plurality of buffer particles, a plurality of buffer posts, etc. spaced on the elastic element 222 or the substrate 211 of the acoustic transducer 210. The plurality of buffer points, the plurality of buffer particles, and the plurality of buffer posts may be disposed regularly (e.g., evenly disposed) or irregularly (e.g., unevenly disposed).

It should be noted that a position of the buffer 240 is not limited to the sidewall (e.g., the upper surface of the elastic element 222 in the vibration direction of the vibration assembly 220, the substrate 211 of the vibration assembly 220) perpendicular to the vibration direction of the vibration assembly 220 in the first acoustic cavity 250, and the buffer 240 may also be disposed at other positions of the vibration sensor 200. For example, the buffer 240 may be disposed on a bottom wall 231 of the housing 230 perpendicular to the vibration direction of the vibration assembly 220 in the second acoustic cavity 260 to prevent the mass element 221 from colliding with the housing 230 during vibration.

In some embodiments, in the arrangement shown in FIG. 2, the buffer 240 may be used to limit the vibration amplitude of the vibration assembly 220. In some embodiments, on the one hand, the buffer 240 may be disposed in the vibration sensor 200, which may limit the vibration amplitude of the vibration assembly 220, thereby preventing the vibration assembly 220 from colliding with other components (e.g., the acoustic transducer 210, the housing 230) of the vibration sensor 200 in the vibration process, realizing the protection of the vibration assembly 220 (especially, the elastic element 222), and improving the reliability of the vibration sensor 200. On the other hand, when the buffer 240 is disposed on the surface of the vibration assembly 220 in the vibration direction of the vibration assembly 220, the buffer 240 may also adjust the mass and damping of the vibration assembly 220, thereby adjusting the frequency bandwidth and sensitivity of the vibration sensor 200.

In some embodiments, as shown in FIG. 3, the buffer 240 may be a composite structure composed of a plurality of structures. In some embodiments, the buffer 240 may include a first buffer part 241 and a second buffer part 242, and the first buffer part 241 and the second buffer part 242 may be respectively disposed on both sides of the elastic element 222 in the vibration direction of the vibration assembly 220. In some embodiments, the first buffer part 241 may be connected to the housing 230 or the elastic element 222 (or the mass element 221). The second buffer part 242 may be connected to the acoustic transducer 210 or the elastic element 222 (or the mass element 221). In some embodiments, the first buffer part 241 may provide the vibration assembly 220 with a first buffer distance in the vibration direction of the vibration assembly 220, and the second buffer part 242 may provide the vibration assembly 220 with a second buffer distance in the vibration direction of the vibration assembly 220. 2. Taking the first buffer part 241 being connected to the bottom wall 231 of the housing 230 and the second buffer part 242 being connected to the substrate 211 in FIG. 3 as an example, the first buffer distance may be a distance between an upper surface of the first buffer part 241 in the vibration direction of the vibration assembly 220 and the lower surface of the mass element 221 in the vibration direction of the vibration assembly 220. The second buffer distance may be a distance between a lower surface of the second buffer part 242 in the vibration direction of the vibration assembly 220 and the upper surface of the elastic element 222 in the vibration direction of the vibration assembly 220. In some embodiments, the first buffer distance and/or the second buffer distance may be greater than or equal to 0 and may be smaller than the maximum vibration amplitude of the vibration assembly 220. In some embodiments, the first buffer distance may be the same as the second buffer distance. In some embodiments, since the vibration of the elastic element 222 vibrates uniformly, the same first buffer distance and the second buffer distance may ensure that the vibration amplitude of the elastic element 222 is limited without damaging the vibration amplitude of the elastic element 222. In some embodiments, the first buffer distance may be different from the second buffer distance, for example, the first buffer distance may be slightly smaller than the second buffer distance.

In some embodiments, the first buffer part 241 may include one or more first buffer blocks, and the one or more first buffer blocks may be spaced on the elastic element 222 (or mass element 221), or on the bottom wall 231 (as shown in FIG. 3) of the housing 230 opposite to the elastic element 222, so that the buffer block may directly face the elastic element 222. The second buffer part 242 may include one or more second buffer blocks, and the one or more second buffer blocks may be spaced on the elastic element 222 (or mass element 221), or on the substrate 211 (as shown in FIG. 3) of the acoustic transducer 210 opposite to the elastic element 222, so that the buffer block may directly face the elastic element 222. In some embodiments, the one or more first buffer blocks and the one or more second buffer blocks may also be disposed alternately on both sides of the elastic element 222, i.e., each first buffer block in the vibration direction of the vibration assembly 220 may directly face a gap between the plurality of second buffer blocks, and each second buffer block in the vibration direction of the vibration assembly 220 may directly face a gap between the plurality of first buffer blocks. The one or more first buffer blocks and second buffer blocks disposed alternately may provide support or limit for the elastic element 222 at different positions, preventing the elastic element 222 from vibrating too much.

In some embodiments, in the arrangement of FIG. 3, the buffer 240 may form protection on the both sides of the vibration direction of the vibration assembly 220, and the one or more buffer blocks (e.g., the first buffer block, the second buffer block) disposed in the vibration sensor 200 may realize the protective function in the vibration process of the elastic element 222, so that the elastic element 222 may have more buffer fulcrums to limit the vibration amplitude of the elastic element 222, thereby avoiding the elastic element 222 from colliding with other components (e.g., the acoustic transducer 210 and the housing 230) of the vibration sensor 200 and improving the reliability of the vibration sensor 200.

In some embodiments, as shown in FIG. 4, the buffer 240 may be connected between the elastic element 222 and the acoustic transducer 210 (and/or the housing 230). In some embodiments, the buffer 240 may include the first buffer part 241 and the second buffer part 242. The first buffer part 241 and the second buffer part 242 may be respectively disposed on two sides of the elastic element 222 in the vibration direction of the vibration assembly 220. Specifically, two ends of the first buffer part 241 in the vibration direction of the vibration assembly 220 may be respectively connected to the bottom wall 231 of the housing 230 and the elastic element 222. Two ends of the second buffer part 242 in the vibration direction of the vibration assembly 220 may be respectively connected to the substrate 211 of the acoustic transducer 210 and the elastic element 222. In some embodiments, the two ends of the first buffer part 241 and the two ends of the second buffer part 242 may be fixed, which may effectively ensure the stability of the first buffer part 241 in the vibration process of the elastic element 222 and may also play a role of guiding and limiting in the vibration process of the elastic element 222, so as to ensure that the vibration process of the elastic element 222 is relatively stable.

In some embodiments, there may be a plurality of buffers 240. The plurality of buffers 240 may be spaced along a circumferential direction of the elastic element 222. In some embodiments, there may be a plurality of first buffer parts 241 (and/or second buffer parts 242) located on a same side of the elastic element 222. The plurality of first buffer parts 241 (and/or second buffer parts 242) may be spaced along the circumferential direction of the elastic element 222, and the plurality of first buffer parts 241 (and/or second buffer parts 242) may be all connected to the elastic element 222.

In some embodiments, when the buffer 240 is connected between the elastic element 222 and the acoustic transducer 210 (and/or the housing 230), for example, the buffer 240 may be a buffer spring, and an elastic force direction of the buffer spring may be disposed along the vibration direction of the vibration assembly 220.

In some embodiments, in the arrangement of FIG. 4, the buffer 240 may protect one or both sides of the elastic element 222, and the vibration amplitude of the elastic element 222 may be limited, thereby preventing the elastic element 222 from being damaged by excessive vibration amplitude, thereby improving the reliability of the vibration sensor 200. On the other hand, the buffer 240 may be connected to the vibration assembly 220 (elastic element 222), which can improve the stability of the buffer 240 and the elastic element 222 during vibration.

Figure 5:
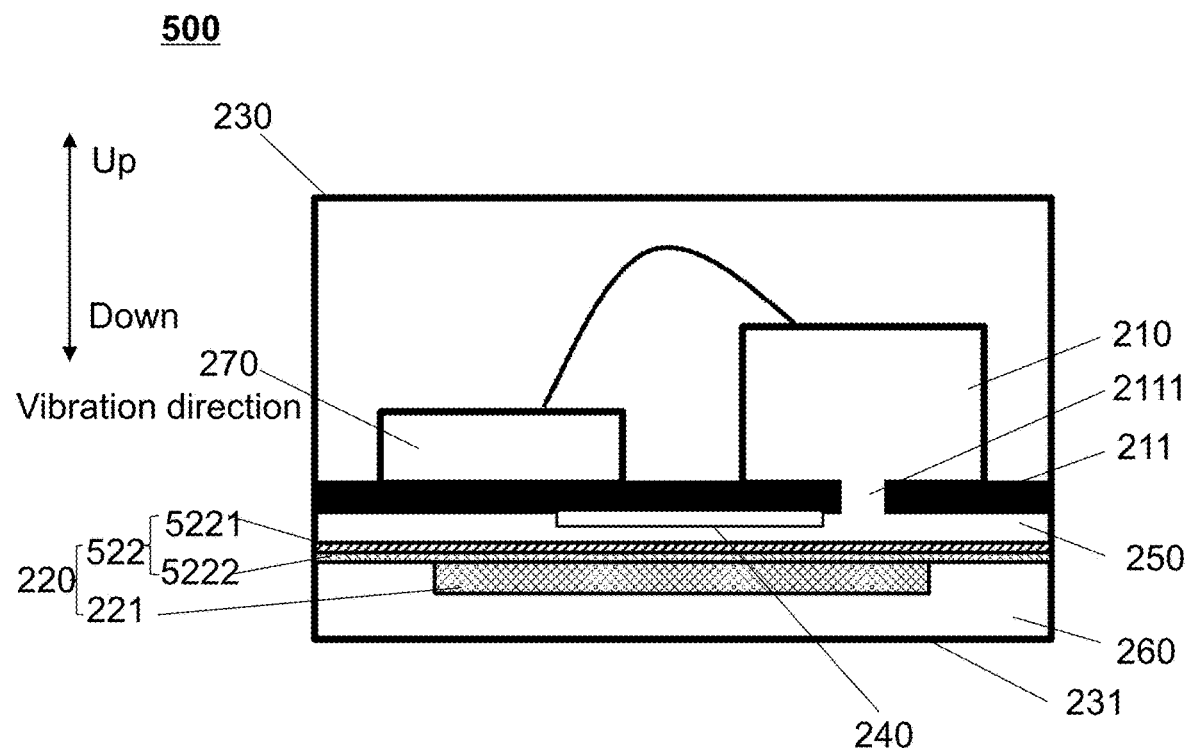
FIG. 5 is a structural diagram illustrating an exemplary vibration sensor according to some embodiments of the present disclosure.
Figure 6:
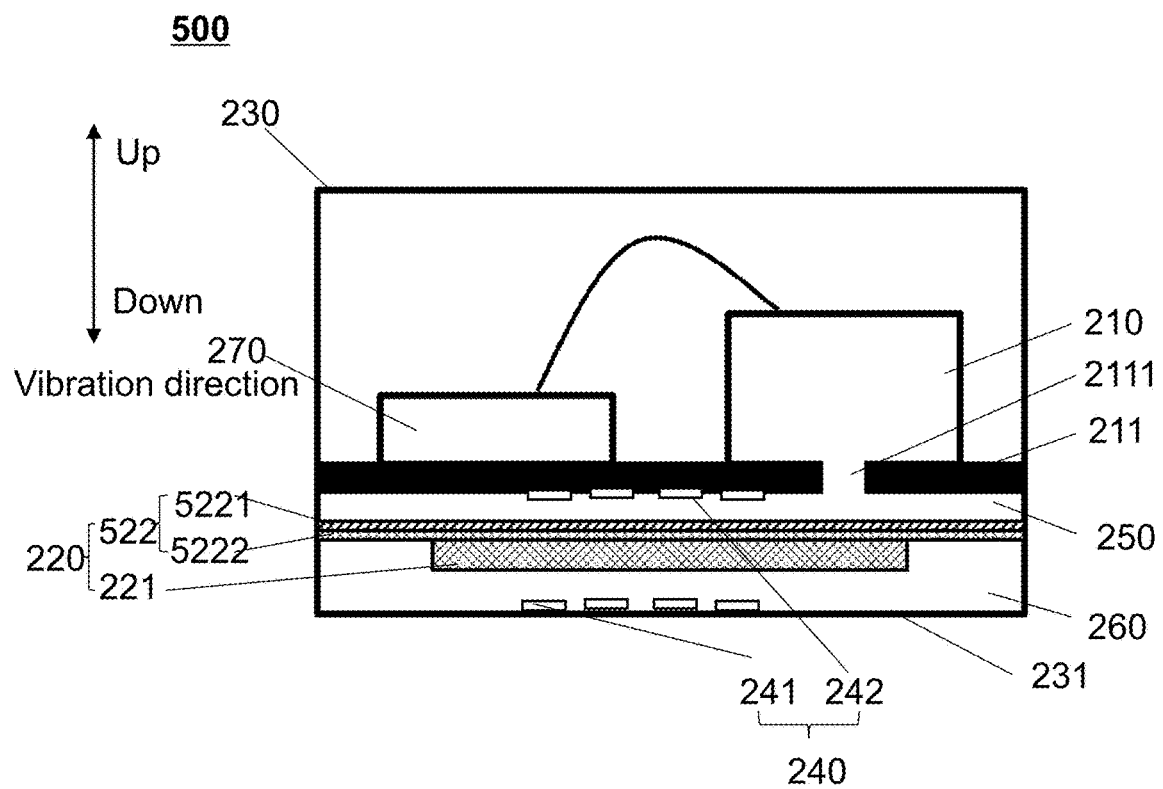
FIG. 6 is a structural diagram illustrating an exemplary vibration sensor according to some embodiments of the present disclosure.
Figure 7:
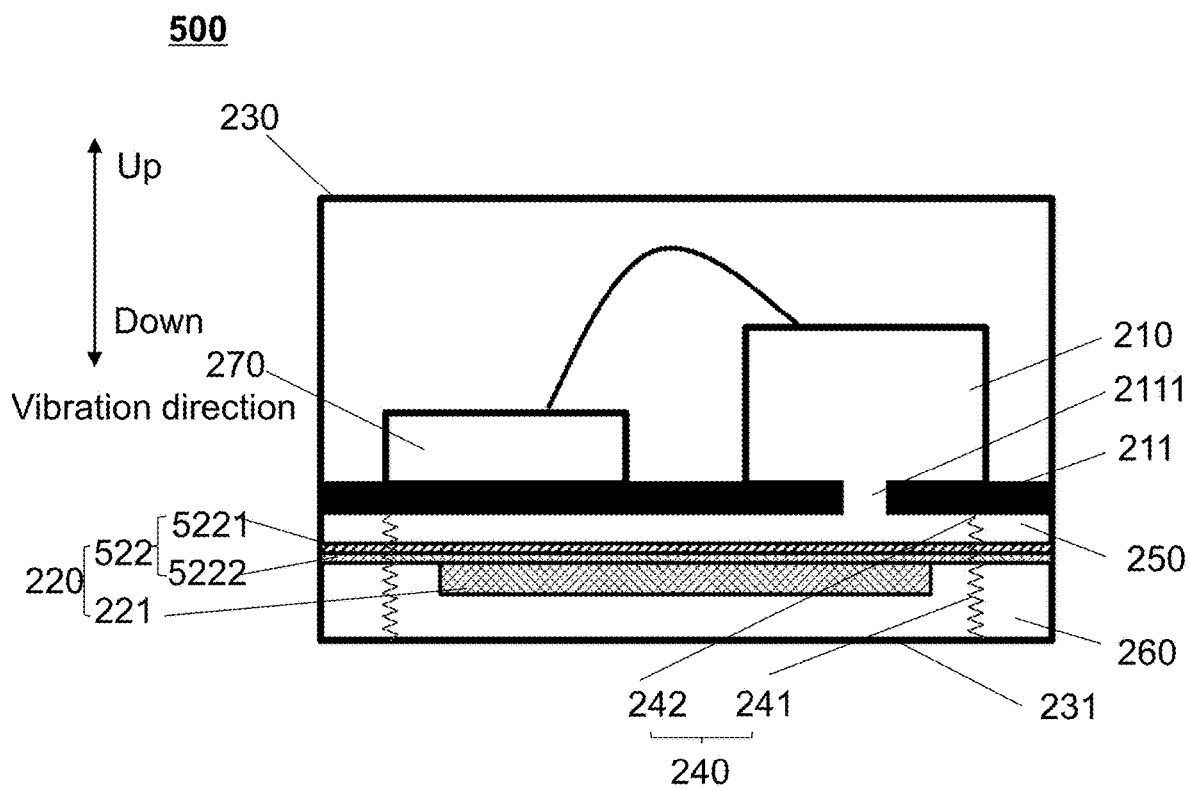
FIG. 7 is a structural diagram illustrating an exemplary vibration sensor according to some embodiments of the present disclosure.

FIG. 5 is a structural diagram illustrating an exemplary vibration sensor according to some embodiments of the present disclosure. FIG. 6 is a structural diagram illustrating an exemplary vibration sensor according to some embodiments of the present disclosure. FIG. 7 is a structural diagram illustrating an exemplary vibration sensor according to some embodiments of the present disclosure.

The structure of the vibration sensor 500 shown in FIGS. 5-7 is similar to that of the vibration sensor 200 shown in FIGS. 2-4, respectively, and the difference lies in the elastic element. In some embodiments, as shown in FIGS. 5-7, the elastic element 522 may be a multilayer composite elastic element, which may include a first elastic element 5221 and a second elastic element 5222. In some embodiments, the first elastic element 5221 and the second elastic element 5222 may be made of a same material or different materials. In some embodiments, stiffness of the first elastic element 5221 may be different from stiffness of the second elastic element 5222, for example, the stiffness of the first elastic element 5221 may be greater or smaller than the stiffness of the second elastic element 5222. In this embodiment, taking the stiffness of the first elastic element 5221 being greater than that of the second elastic element 5222 as an example, the second elastic element 5222 may provide a required damping for the vibration assembly 220, and the first elastic element 5221 may have a relatively high stiffness, which can ensure that the elastic element 522 has a relatively high strength, thereby ensuring the reliability of the vibration assembly 220 and even the entire vibration sensor 500.

It should be noted that a count of elastic elements included in the elastic element 522 in FIGS. 5-7 and related descriptions is merely for the purpose of illustration, and not intended to limit the present disclosure to the scope of the illustrated embodiments. In some embodiments, the count of elastic elements in the embodiment may be more than two, for example, the count of elastic elements may be three, four, five, or more. Merely by way of example, the elastic element may include a first elastic element, a second elastic element, and a third elastic element connected sequentially from top to bottom. A material, a mechanical parameter, and a size dimension of the first elastic element may be the same as those of the third elastic element. A material, a mechanical parameter, and a size of the second elastic element may be different from those of the first elastic element or those the third elastic element. For example, the stiffness of the first elastic element or the stiffness of the third elastic element may be greater than the stillness of the second elastic element. In some embodiments, a mechanical parameter of the elastic element may be adjusted by adjusting the material, the mechanical parameter, the size, etc. of the first elastic element, the second elastic element, and/or the third elastic element, so as to ensure the stability of the vibration sensor 500.

The elastic element 522 may be set as the multilayer elastic element, which may facilitate adjusting the stiffness of the elastic element 522, for example, the count of elastic elements (e.g., the first elastic element 5221 and/or the second elastic element 5222) may be increased or decreased to realize the adjustment of the stiffness and damping of the vibration assembly 220, so that the vibration sensor 500 may generate a new resonance peak in a required frequency band (e.g., near a target frequency band) and improve the sensitivity of the vibration sensor 500 in a specific frequency band range. In some embodiments, two adjacent elastic elements (e.g., the first elastic element 5221 and the second elastic element 5222) in the multilayer composite elastic element may be glued to form the elastic element 522.

In some embodiments, the stiffness of the elastic element 522 may be adjusted by adjusting the mechanical parameter (e.g., material, Young's modulus, tensile strength, elongation at break, and hardness shore A) of at least one layer of elastic element (first elastic element 5221 and/or second elastic element 5222) in the elastic element 522, so that the vibration sensor 500 may obtain a relatively ideal frequency response, thereby adjusting the resonance frequency and sensitivity of the vibration sensor 500.

In some embodiments, the overall tensile strength of the elastic element 522 may be within a certain range by adjusting the tensile strength of the at least one layer of elastic element in the elastic element 522, so as to improve the sensitivity of the vibration assembly 220 in the required frequency band range and improve the sensitivity of the vibration sensor 500. In some embodiments, the overall tensile strength of the elastic element 522 may be 0.5 MPa~100 MPa by adjusting the material, thickness or size of the first elastic element 5221 and/or the second elastic element 5222 of the elastic element 522. In some embodiments, the overall tensile strength of the elastic element 522 may be 5 MPa~90 MPa by adjusting the material or size of the first elastic element 5221 and/or the second elastic element 5222 of the elastic element 522. In some embodiments, the overall tensile strength of the elastic element 522 may be 10 MPa~80 MPa by adjusting the material or size of the first elastic element 5221 and/or the second elastic element 5222 of the elastic element 522. In some embodiments, the overall tensile strength of the elastic element 522 may be 20 MPa~70 MPa by adjusting the material or size of the first elastic element 5221 and/or the second elastic element 5222 of the elastic element 522. In some embodiments, the overall tensile strength of the elastic element 522 may be 30 MPa~60 MPa by adjusting the material, thickness or size of the first elastic element 5221 and/or the second elastic element 5222 of the elastic element 522.

In some embodiments, the overall elongation at break of the elastic element 522 may be within a certain range by adjusting the elongation at break of at least one layer of elastic element in the elastic element 522, so as to improve the sensitivity of the vibration sensor 500 in the required frequency band range. In some embodiments, the greater the elongation at break of at least one layer of elastic element in the elastic element 522, the greater the sensitivity of the vibration sensor 500, and the better the stability of the vibration sensor 500. In some embodiments, the overall elongation at break of the elastic element 522 may be 10%~600%. In some embodiments, the overall elongation at break of the elastic element 522 may be 20%~500%. In some embodiments, the overall elongation at break of the elastic element 522 may be 50%~400%. In some embodiments, the overall elongation at break of the elastic element 522 may be 80%~200%.

In some embodiments, the overall hardness of the elastic elements 522 may be within a certain range by adjusting the hardness of at least one layer of elastic element in the elastic elements 522, so as to improve the sensitivity of the vibration sensor 500 in the required frequency band range. In some embodiments, the smaller the hardness of at least one layer of elastic element in the elastic element 522, the greater the sensitivity of the vibration sensor 500. In some embodiments, the overall hardness Shore A of the elastic member 522 may be smaller than 200. In some embodiments, the overall hardness Shore A of the elastic member 522 may be smaller than 150. In some embodiments, the overall hardness Shore A of the elastic member 522 may be smaller than 100. In some embodiments, the overall hardness Shore A of the elastic member 522 may be smaller than 60. In some embodiments, the overall hardness Shore A of the elastic member 522 may be smaller than 30. In some embodiments, the overall hardness Shore A of the elastic member 522 may be smaller than 10.

In some embodiments, the sensitivity of the vibration sensor 500 may also be adjusted by adjusting the mechanical parameter (e.g., material, size, shape, etc.) of the mass element 221. Descriptions regarding the adjusting the sensitivity of the vibration sensor 500 by adjusting the mechanical parameter of the mass element 221 may be found in the relevant descriptions in FIG. 2 about adjusting the sensitivity of the vibration sensor 200 by adjusting the mechanical parameter of the mass element 221.

In some embodiments, when the parameter of the elastic element (e.g., Young's modulus, tensile strength, hardness, elongation at break) and a volume or mass of the mass element are constant, an electrical signal of the vibration sensor may be increased by improving the efficiency of the elastic deformation of the elastic element, thereby improving the acoustic-electric conversion effect of the vibration sensor. In some embodiments, the efficiency of the elastic deformation of the elastic element may be improved by reducing a contact area between the mass element and the elastic element, thereby increasing the electrical signal output by the sensing device. More descriptions may be found in FIGS. 8-10 and the related descriptions thereof.

In some embodiments, as shown in FIGS. 5-7, the buffer 240 may be used to limit a vibration amplitude of the vibration assembly 220. In some embodiments, the buffer 240 may be disposed in the vibration sensor 200. The buffer 240 may limit a vibration amplitude of the vibration assembly 220 by providing the vibration assembly 220 with a buffer distance in the vibration direction of the vibration assembly 220, thereby preventing the vibration assembly 220 from colliding with other components (e.g., the acoustic transducer 210 and the housing 230) of the vibration sensor 500 in the vibration process, realizing protection of the vibration assembly 220, and improving the reliability of the vibration sensor 500.

In some embodiments, as shown in FIG. 5, the structure and arrangement of the buffer 240 is similar to that of the buffer 240 in FIG. 2. The buffer 240 may be disposed on a sidewall of the first acoustic cavity 250 perpendicular to the vibration direction of the vibration assembly 220. The buffer 240 may provide the vibration assembly 220 with the buffer distance in the vibration direction of the vibration assembly 220. Taking the buffer 240 disposed on the substrate 211 as an example, the buffer 240 is connected to the substrate 211. At this time, the buffer distance may be a distance between a lower surface of the buffer 240 in the vibration direction of the vibration assembly 220 and an upper surfaces of the first elastic element 5221 in the vibration direction of the vibration assembly 220.

In some embodiments, as shown in FIG. 6, the structure and arrangement of the buffer 240 is similar to that of the buffer 240 in FIG. 3. The buffer 240 may include the first buffer part 241 and the second buffer part 242. The first buffer part 241 and the second buffer part 242 may be respectively disposed on both sides of the elastic element 522 in the vibration direction of the vibration assembly 220. The first buffer part 241 may be connected to the housing 230 or the elastic element 522. The second buffer part 242 may be connected to the acoustic transducer 210 or the elastic element 522. In some embodiments, the first buffer part 241 may provide the vibration assembly 220 with a first buffer distance in the vibration direction of the vibration assembly 220, and the second buffer part 242 may provide the vibration assembly 220 with a second buffer distance in the vibration direction of the vibration assembly 220. In the connection mode, the first buffer distance may be a distance between an upper surface of the first buffer part 241 in the vibration direction of the vibration assembly 220 and a lower surface of the mass element 221 in the vibration direction of the vibration assembly 220. The second buffer distance may be a distance between a lower surface of the second buffer part 242 in the vibration direction of the vibration assembly 220 and the upper surface of the first elastic element 5221 in the vibration direction of the vibration assembly 220.

In some embodiments, as shown in FIG. 7, the structure and arrangement of the buffer 240 is similar to that of the buffer 240 in FIG. 4. The buffer 240 may be connected between the elastic element 522 and the acoustic transducer 210 (and/or the housing 230). The buffer 240 may include the first buffer part 241 and the second buffer part 242. The first buffer part 241 and the second buffer part 242 may be respectively disposed on both sides of the elastic element 522 in the vibration direction of the vibration assembly 220. Specifically, two ends of the first buffer part 241 in the vibration direction of the vibration assembly 220 may be respectively connected to the bottom wall 231 of the housing 230 and the second elastic element 5222. Two ends of the second buffer part 242 in the vibration direction of the vibration assembly 220 may be respectively connected to the substrate 211 of the acoustic transducer 210 and the first elastic element 5221.

Figure 8:
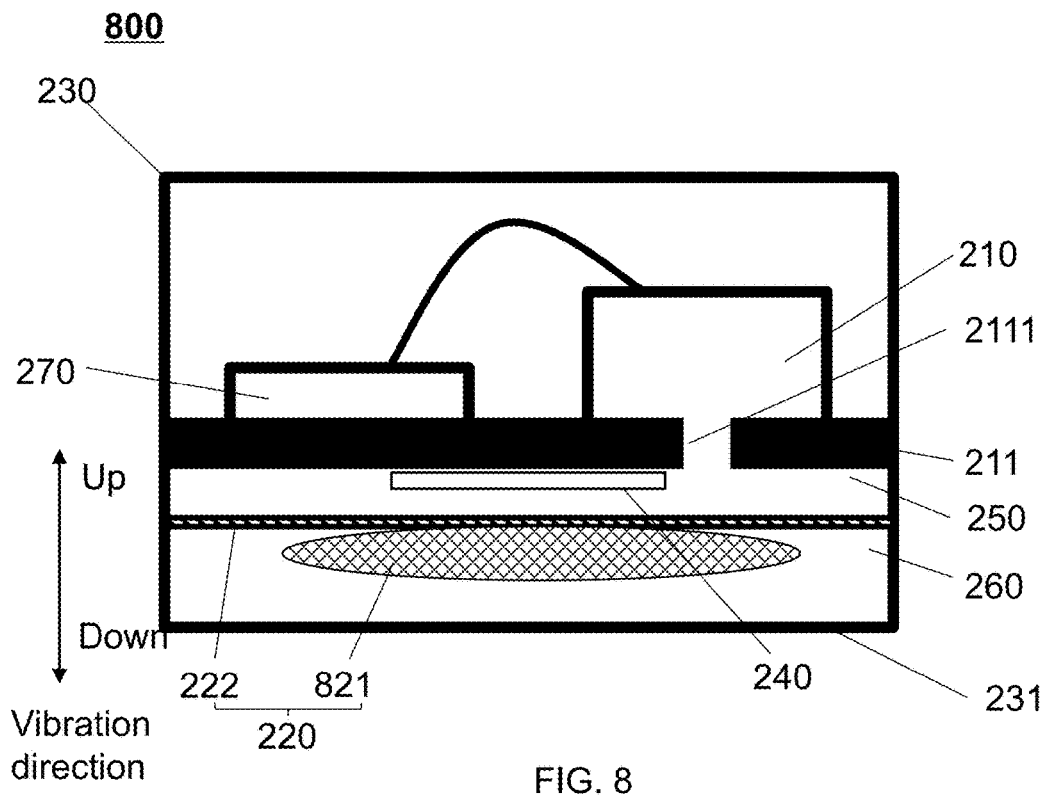
FIG. 8 is a structural diagram illustrating an exemplary vibration sensor according to some embodiments of the present disclosure.
Figure 9:
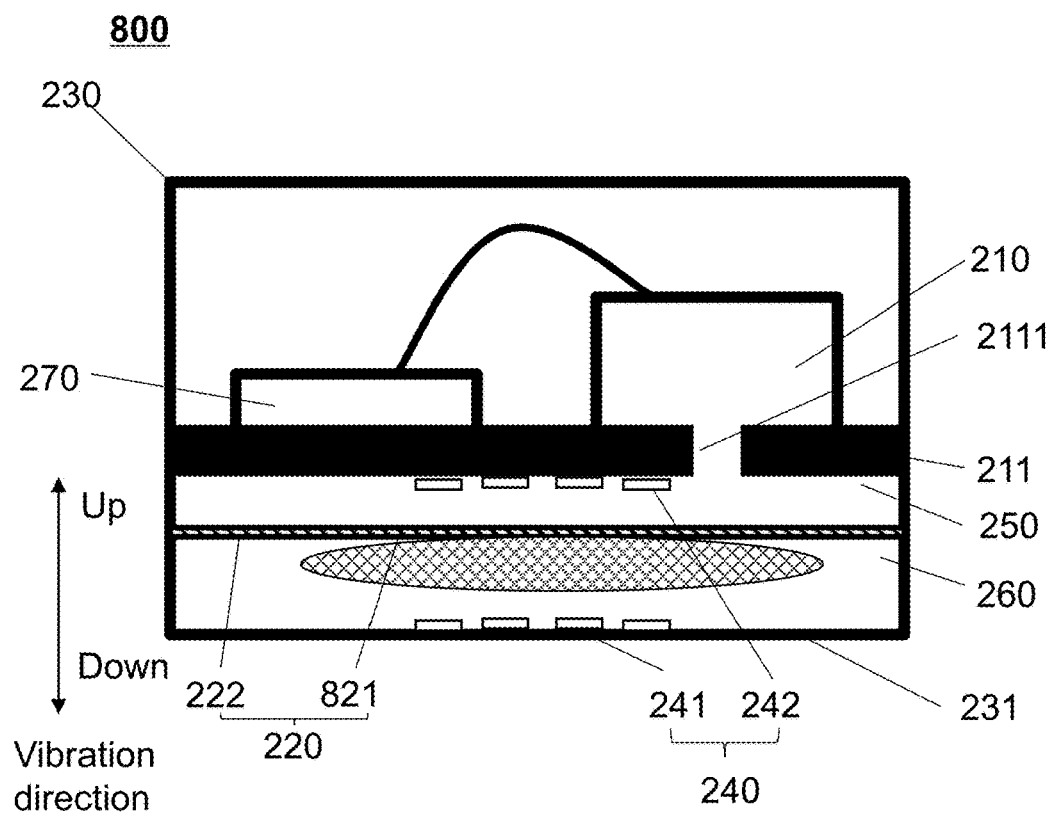
FIG. 9 is a structural diagram illustrating an exemplary vibration sensor according to some embodiments of the present disclosure.
Figure 10:
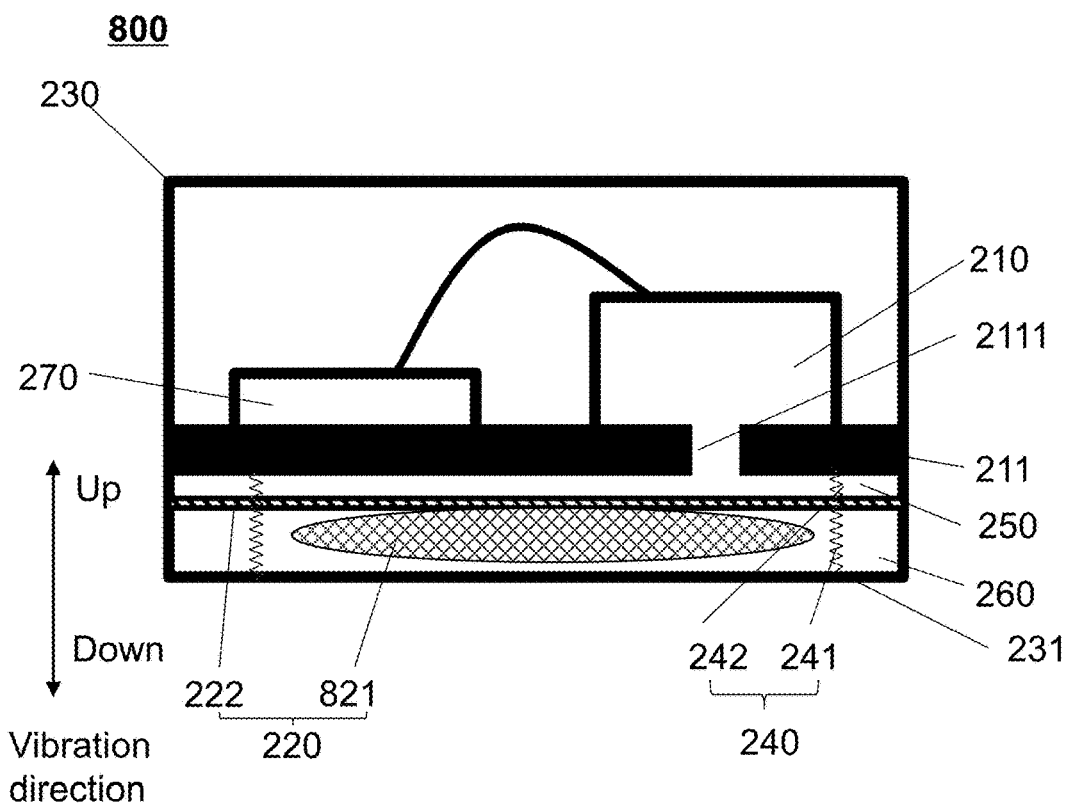
FIG. 10 is a structural diagram illustrating an exemplary vibration sensor according to some embodiments of the present disclosure.

FIG. 8 is a structural diagram illustrating an exemplary vibration sensor according to some embodiments of the present disclosure. FIG. 9 is a structural diagram illustrating an exemplary vibration sensor according to some embodiments of the present disclosure. FIG. 10 is a structural diagram illustrating an exemplary vibration sensor according to some embodiments of the present disclosure.

The structure of the vibration sensor 800 shown in FIGS. 8-10 is similar to the structure of the vibration sensor 200 shown in FIGS. 2-4, and the difference lies in the mass elements. In some embodiments, as shown in FIGS. 8-10, the mass element 821 may be an ellipsoid, and a contact area between the mass element 821 and the elastic element 222 may be smaller than a projected area of the mass element 821 on the elastic element 222, which may ensure that, the mass element 821 and the elastic element have a relatively small contact area under a same volume or mass of the mass element 821, it may be approximately regarded that no deformation occurs in the contact area between the elastic element 222 and the mass element 821 when the vibration of the housing 230 of the vibration sensor 800 drives the mass element 821 to vibrate, and an area where the elastic element 222 does not contact the mass element 821 may be increased by reducing the contact area between the elastic element 222 and the mass element 821, thereby increasing an area where the elastic element 222 deforms in the vibration process (i.e., the area where the elastic element 222 does not contact the mass element 821) and increasing an amount of compressed air in the first acoustic cavity 250, so that the acoustic transducer 210 may output a larger electrical signal and the acoustic-electric conversion effect of the vibration sensor 800 can be improved.

In some embodiments, the mass element 821 may also be a trapezoidal body. A side of the trapezoidal body with a relatively small area may be connected to the elastic element 222, so that a contact area between the mass element 821 and the elastic element may be smaller than a projected area of the mass element 821 on the elastic element 222. In some embodiments, the mass element 821 may also be an arched structure. When the mass element 821 is the arched structure, two arch feet of the arched structure may be connected to an upper surface or a lower surface of the elastic element 222. A contact area between the two arch feet and the elastic element 222 may be smaller than a projected area of an arch waist on the elastic element 222, i.e., a contact area between the mass element 821 and the elastic element 222 of the arched structure may be smaller than a projected area of the mass element 821 on the elastic element 222. It should be noted that, in the embodiment, any regular or irregular shape or structure that can meet the requirement that the contact area between the mass element 821 and the elastic element is smaller than the projected area of the mass element 821 on the elastic element 222 falls within the scope of changes in the embodiments of the present disclosure, which will not be list one by one in the present disclosure.

In some embodiments, the mass element 821 may be a solid structure. For example, the mass element 821 may be a regular or irregular structure such as a solid cylinder, a solid cuboid, a solid ellipsoid, or a solid triangle. In some embodiments, in order to ensure that the contact area between the mass element 821 and the elastic element 222 is reduced and the sensitivity of the vibration sensor 800 in a specific frequency band is improved when the mass element 821 has a constant mass, the mass element 821 may also be partially hollowed-out structure. For example, the mass element 821 may be an annular cylinder, a rectangular cylindrical structure, etc.

In some embodiments, the mass element 821 may include a plurality of sub-mass blocks separated from each other, and the plurality of sub-mass elements may be located in different regions of the elastic element 222. In some embodiments, the mass element may include two or more sub-mass elements separated from each other, e.g., 3, 4 or 5. In some embodiments, a mass, size, shape, material, etc. of the plurality of sub-mass elements separated from each other may be the same or different. In some embodiments, the plurality of sub-mass elements separated from each other may be distributed on the elastic element 222 at an equal interval, at unequal intervals, symmetrically or asymmetrically. In some embodiments, the plurality of mutually sub-mass elements separated from each other may be disposed on the upper surface and/or the lower surface of the elastic element 222. The plurality of sub-mass elements separated from each other may be disposed in a middle area of the elastic element 222, which may not only increase the area where the elastic element 222 deforms under the vibration driven by the housing 230, improve the deformation efficiency of the elastic element 222 to improve the sensitivity of the vibration sensor 800, but also improve the reliability of the vibration assembly 220 and the vibration sensor 800. In some embodiments, the parameter such as the mass, size, shape or material of the plurality of mass elements may be adjusted so that the plurality of sub-mass elements may have different frequency responses, thereby further improving the sensitivity of the vibration sensor 800 in different frequency bands.

In some embodiments, as shown in FIGS. 8-10, the buffer 240 may be used to limit a vibration amplitude of the vibration assembly 220. In some embodiments, the buffer 240 may be disposed in the vibration sensor 800, and the buffer 240 may limit the vibration amplitude of the vibration assembly 220 by providing a buffer distance for the vibration assembly 220, thereby preventing the vibration assembly 220 from colliding with other components (e.g., the acoustic transducer 210 and the housing 230) of the vibration sensor 800 in the vibration process, realizing the protection of the vibration assembly 220, and improving the reliability of the vibration sensor 800.

In some embodiments, as shown in FIG. 8, the structure and arrangement of the buffer 240 is similar to that of the buffer 240 in FIG. 2. The buffer 240 may be disposed on a sidewall of the first acoustic cavity 250 perpendicular to the vibration direction of the vibration assembly 220. The buffer 240 may provide the vibration assembly 220 with the buffer distance in the vibration direction of the vibration assembly 220.

In some embodiments, as shown in FIG. 9, the structure and arrangement of the buffer 240 is similar to that of the buffer 240 in FIG. 3. The buffer 240 may include the first buffer part 241 and the second buffer part 242. The first buffer part 241 and the second buffer part 242 may be respectively disposed on both sides of the elastic element 522 in the vibration direction of the vibration assembly 220. The difference may be that when the mass element 821 is an ellipsoid, distances between different positions of a lower surface of the mass element 821 and an upper surface of the first buffer part 241 are different. Based on this, a first buffer distance provided by the first buffer part 241 for the vibration assembly 220 may be a shortest distance between the upper surface of the first buffer part 241 in the vibration direction of the vibration assembly 220 and the lower surface of the mass element 221 in the vibration direction of the vibration assembly 220.

In some embodiments, as shown in FIG. 10, the structure and arrangement of the buffer 240 is similar to that of the buffer 240 in FIG. 4. The buffer 240 may include the first buffer part 241 and the second buffer part 242. The first buffer part 241 and the second buffer part 242 may be respectively disposed on both sides of the elastic element 522 in the vibration direction of the vibration assembly 220.

Figure 11:
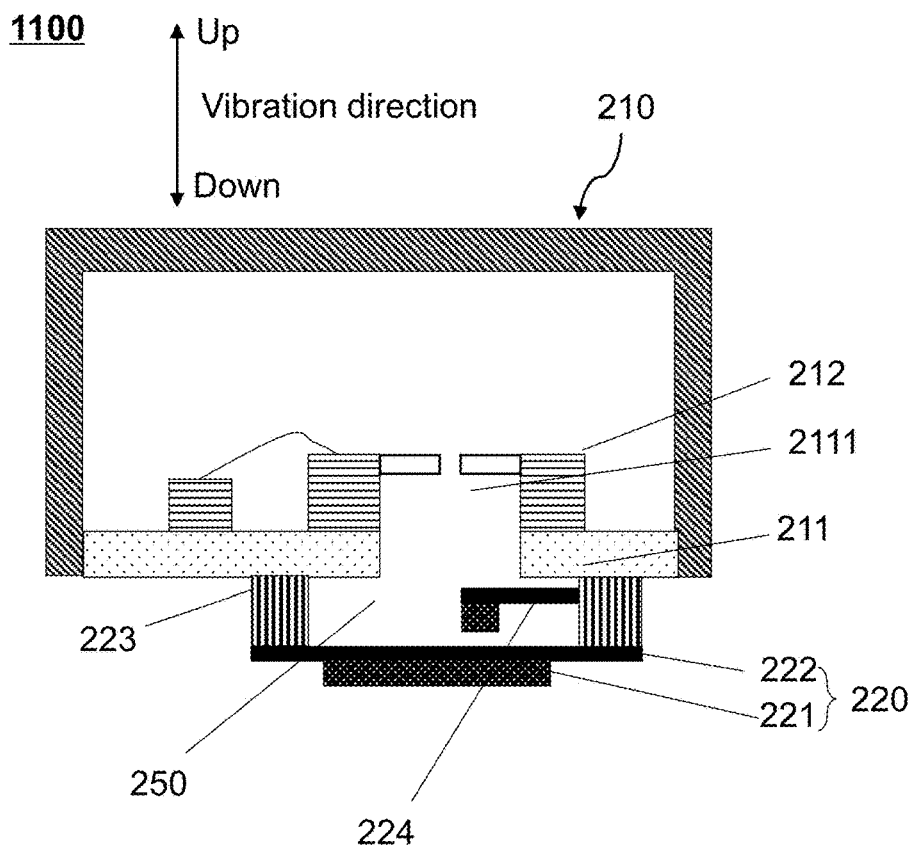
FIG. 11 is a structural diagram illustrating an exemplary vibration sensor according to some embodiments of the present disclosure.
Figure 12:
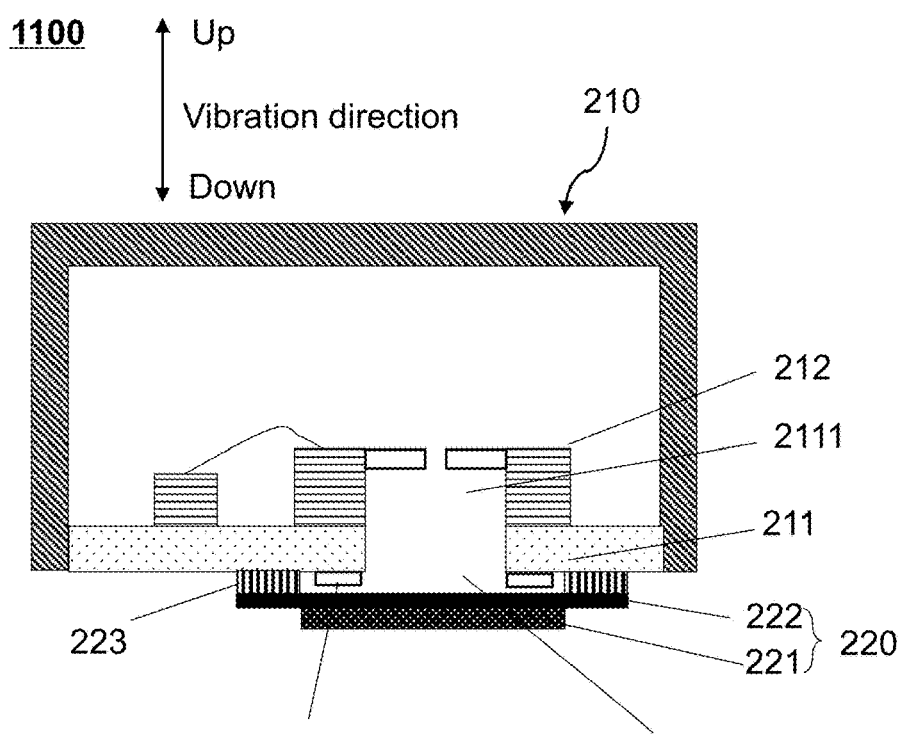
FIG. 12 is a structural diagram illustrating an exemplary vibration sensor according to some embodiments of the present disclosure.
Figure 13:
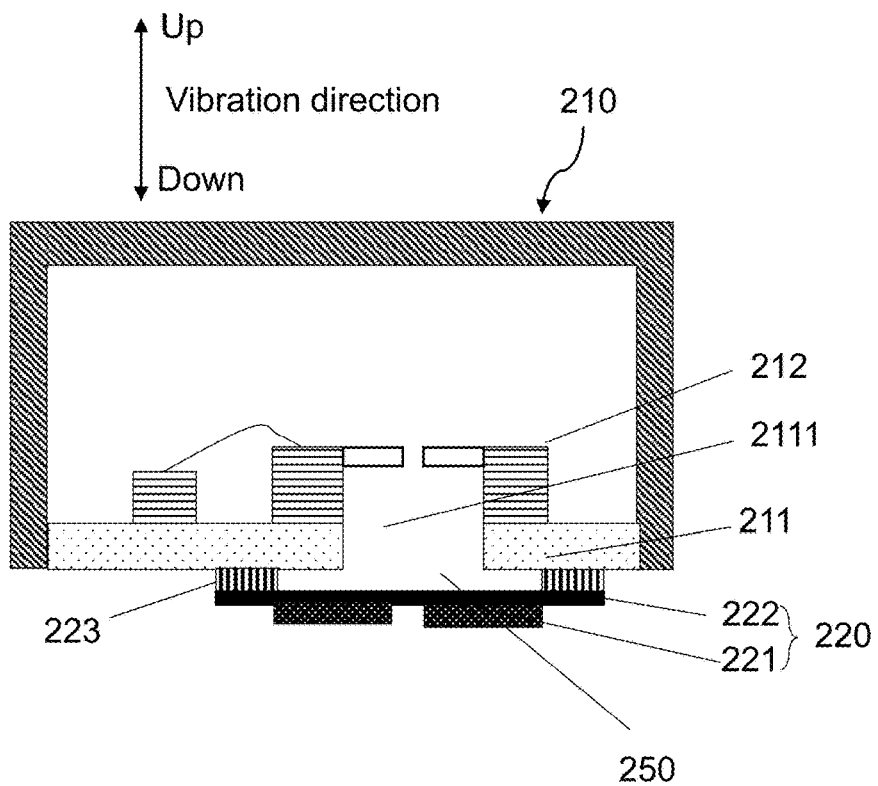
FIG. 13 is a structural diagram illustrating an exemplary vibration sensor according to some embodiments of the present disclosure.
Figure 14:
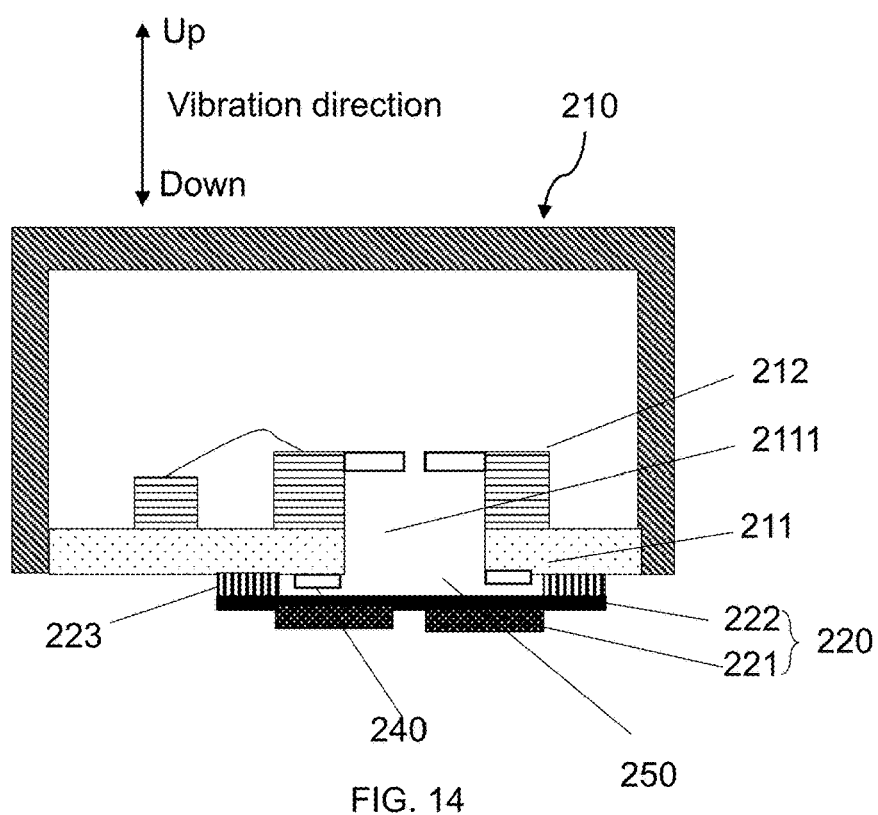
FIG. 14 is a structural diagram illustrating an exemplary vibration sensor according to some embodiments of the present disclosure.
Figure 14A:
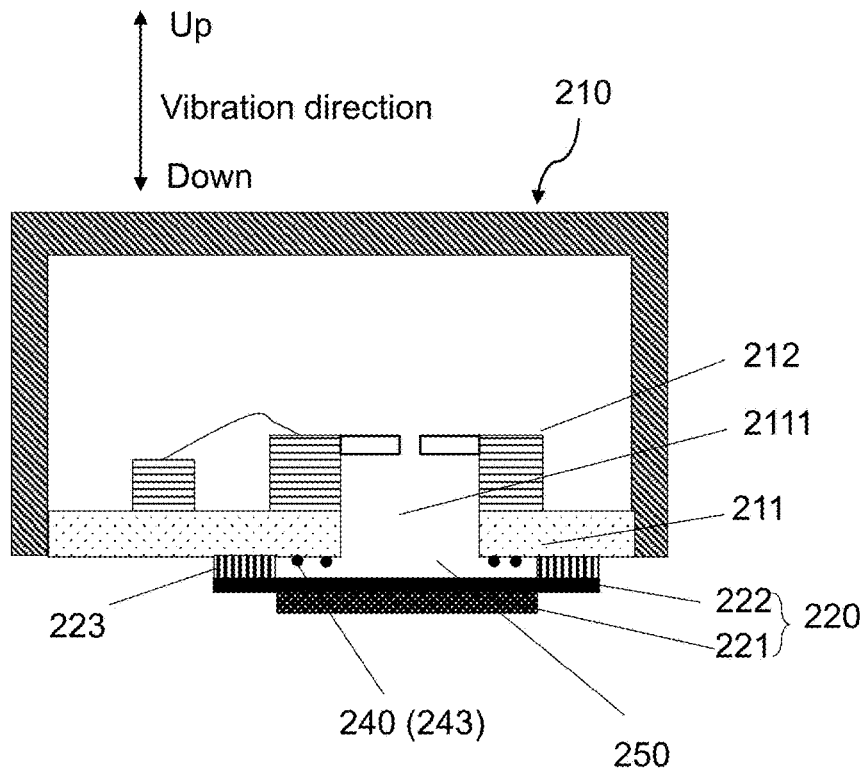
FIG. 14A is a structural diagram illustrating an exemplary vibration sensor according to some embodiments of the present disclosure.
Figure 14B:
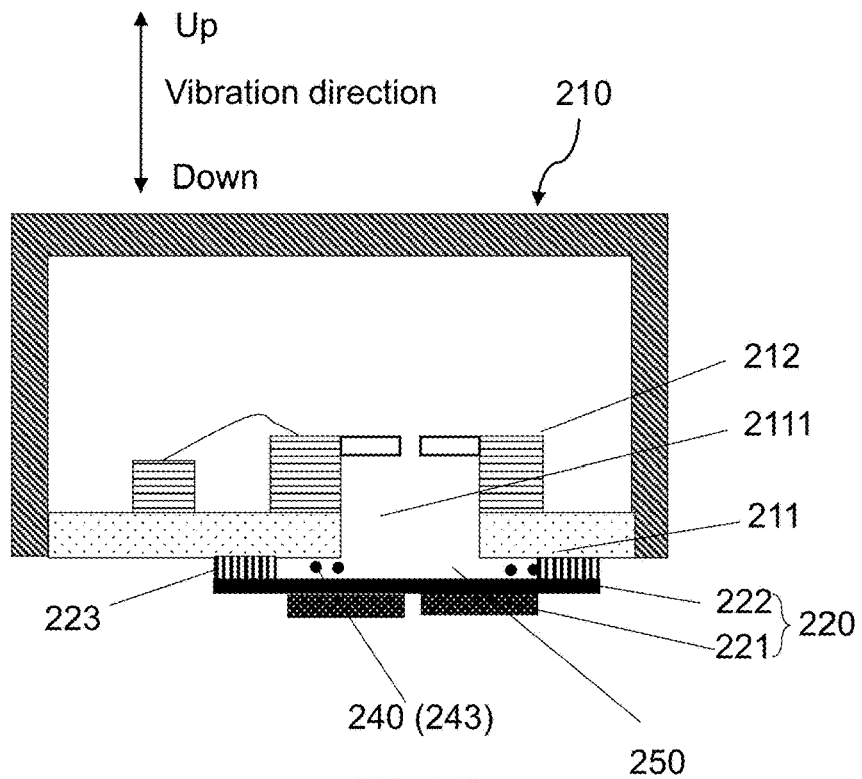
FIG. 14B is a structural diagram illustrating an exemplary vibration sensor according to some embodiments of the present disclosure.

FIG. 11 is a structural diagram illustrating an exemplary vibration sensor according to some embodiments of the present disclosure. FIG. 12 is a structural diagram illustrating an exemplary vibration sensor according to some embodiments of the present disclosure. FIG. 13 is a structural diagram illustrating an exemplary vibration sensor according to some embodiments of the present disclosure. FIG. 14 is a structural diagram illustrating an exemplary vibration sensor according to some embodiments of the present disclosure. FIG. 14A is a structural diagram illustrating an exemplary vibration sensor according to some embodiments of the present disclosure. FIG. 14B is a structural diagram illustrating an exemplary vibration sensor according to some embodiments of the present disclosure.

In some embodiments, as shown in FIGS. 11-12, the vibration sensor 1100 may include the acoustic transducer 210 and the vibration assembly 220. The vibration sensor 1100 shown in FIGS. 11-12 may differ from the vibration sensor 200 shown in FIG. 2 in that the vibration assembly 220 is disposed in the acoustic transducer 2111 in a vibration direction of the vibration assembly 220 or outside the sound inlet hole 2111 as shown in FIGS. 11-12. The first acoustic cavity 250 may be formed between the vibration assembly 220 and the substrate 211 of the acoustic transducer 210.

In some embodiments, the vibration assembly 220 may include the elastic element 222 and the mass element 221. In some embodiments, the elastic element 222 may include a plate-like structure connected to the mass element 221. In some embodiments, the plate-like structure and the mass element 221 may be connected by snapping, bonding, or integral molding, and the connection method is not limited in the present disclosure. In some embodiments, the elastic element 222 may be set to be breathable or airtight. Exemplarily, in order to have a better sound pickup effect, in some embodiments, the elastic element 222 may be airtight.

It should be noted that one elastic element or one plate-like structure shown in FIG. 11 is merely for convenience of description, but does not limit the scope of protection of the present disclosure. In some embodiments, there may be a plurality of mass elements. In some embodiments, the plurality of mass elements may be respectively disposed on both sides of the elastic element 222. In some embodiments, the plurality of mass elements may also be disposed on a same side of the elastic element 222.

In some embodiments, as shown in FIGS. 13-14, the vibration assembly 220 may include the elastic element 222 and two mass elements 221 disposed on the elastic element 222. In some embodiments, structural parameters of the two mass elements 221 may be the same or different. In some embodiments, the two mass elements 221 may be physically connected to the elastic element 222, and the two mass elements 221 may be disposed on the same side of the elastic element 222 in the vibration direction. In some embodiments, the two mass elements 221 may be physically connected to the elastic element 222, and the two mass elements 221 may be respectively disposed on both sides of the elastic element 222 in the vibration direction. In some embodiments, the two mass elements 221 may have a same cross-sectional shape in the vibration direction, for example, the two mass elements 221 may have the same circular cross-sectional shape in the vibration direction. In some embodiments, the two mass elements 221 may have different heights in a horizontal direction (a direction perpendicular to the vibration direction). Thus, the two mass elements 221 may make the vibration assembly 220 have a plurality of vibration modes in a target frequency band, so that a frequency response curve of the vibration sensor 1000 may have two resonance peaks, thereby increasing a frequency range of a high sensitivity of the vibration sensor 1000, so that the sensitivity of the vibration sensor 1000 in the frequency range (i.e., the target frequency band) near the two resonance frequencies may be improved, thereby achieving the effect of broadening the bandwidth of the frequency band and improving the sensitivity.

In some embodiments, at least two resonance peaks may be formed on the frequency response curve of the vibration sensor 1100 with the vibration assembly 220 by setting the parameters of the elastic element 222 and the plurality of mass elements 221, thereby forming the plurality of frequency ranges of the high sensitivity and wider frequency bands. In some embodiments, the plurality of resonance frequencies of the elastic element 222 and the plurality of mass elements 221 physically connected to the elastic element 222 may be related to the parameters of the elastic element 222 and/or the mass elements 221, and the parameters may include Young's modulus of the elastic element 222, a volume of a cavity formed between the acoustic transducer 210 and the elastic element 222, a radius of the mass element 221, a height of the mass element 221, a density of the mass element 221, or any combination thereof.

In some embodiments, the parameters of the two mass elements 221, for example, the heights in the vibration direction may meet a preset ratio. For example, in some embodiments, the height ratio of the two mass elements 221 may be 3:2, 2:1, 3:4, 3:1 etc.

It should be noted that a count of mass elements connected to the elastic element 222 may not be limited to two, for example, the count may be three, four or more than five. In some embodiments, the plurality of mass elements 221 may be disposed collinearly or not. Taking the count of mass elements 221 connected to the elastic element 222 of three as an example, the three mass elements 221 may be disposed on the elastic element 222 in a non-colinear way. It can be understood that, when there are three mass elements 221, lines connecting any two of the three mass elements may not coincide. In some embodiments, the three mass elements 221 may be distributed in a triangle, and distances between any two of the three mass elements 221 may be the same. In some embodiments, the three mass elements 221 may improve the sensitivity of the vibration assembly 520 in frequency intervals near at least two frequency points in the target frequency band, thereby achieving the effect of broadening the bandwidth of the frequency band and improving the sensitivity. Further, taking the count of mass elements 221 connected to the elastic element 222 of four as an example, the four mass elements 221 may be disposed in an array (e.g., a ring array or a rectangular array). In some embodiments, at least two mass elements 221 of the four mass elements 221 may have different resonance peaks. In some embodiments, when there are four or more mass elements 221, the lines connecting center points of any two mass elements on the elastic element 222 may not coincide into a straight line.

In some embodiments, one elastic element 222 and the plurality of mass elements 221 physically connected to the elastic element 222 may correspond to a plurality of target frequency bands of one or more different target frequency bands, so that the sensitivity of the vibration sensor 1100 in the corresponding target frequency band may be greater than the sensitivity of the acoustic transducer 210. In some embodiments, the plurality of resonance frequencies of one elastic element 222 and the plurality of mass elements 221 physically connected to the elastic element 222 may be the same or different. In some embodiments, the sensitivity of the vibration sensor 1100 attached with one or more groups of mass elements 221 and elastic elements 222 may be increased by 3 dB~30 dB compared with the sensitivity of the acoustic transducer 210 in the target frequency band. In some embodiments, a manner of measuring the sensitivity of the vibration sensor 100 and the acoustic transducer 110 may be: under excitation of a given acceleration (e.g., 1 g, g is the acceleration of gravity), acquiring an electrical signal (e.g., −30 dBV) of the device, and the sensitivity may be −30 dBV/g. In some embodiments, if the acoustic transducer 110 is an air conduction microphone, when the sensitivity is measured, the excitation source may be replaced with sound pressure, i.e., the sound pressure in a specified frequency band may be input as the excitation, and the electrical signal of the device may be measured and acquired. It should be noted that, in some embodiments, the sensitivity of the vibration sensor 1100 attached with the vibration assembly 220 may be increased by more than 30 dB compared with the sensitivity of the acoustic transducer 210, for example, the plurality of mass elements 221 physically connected to the elastic element 222 may have a same resonance peak.

In some embodiments, as shown in FIGS. 11-14, the vibration assembly 220 may further include the support element 223. The support element 223 may be used to support the one or more groups of elastic elements 222 and mass elements 221. The support element 223 may be disposed between the substrate 211 of the acoustic transducer 210 and the vibration assembly 220, an upper surface of the support element 233 may be connected to the substrate 211, and a lower surface of the support element 233 may be connected to the elastic element 222. The first acoustic cavity 250 may be formed between the support member 233, the substrate 211, and the elastic member 222.

In some embodiments, the support element 223 may be made of an airtight material, and the airtight support element 223 may make the vibration signal in the air cause the sound pressure change (or air vibration) in the support element 223 in the transmission process, so that the internal vibration signal of the support element 223 may be transmitted to the acoustic transducer 210 through the sound inlet hole 2111 and may not escape outward through the support element 223 in the transmission process, thereby ensuring the sound pressure intensity and improving the sound transmission effect.

In some embodiments, in a direction (i.e., the vibration direction) perpendicular to a surface connected to the elastic element 222 and the mass element 221, a projected area of the mass element 221 may not overlap with a projected area of the support element 223. This arrangement is to prevent the vibration of the elastic element 222 and the mass element 221 from being restricted by the support element 223. In some embodiments, a shape of a cross section of the elastic element 222 in the vibration direction may include a circle, a rectangle, a triangle, or an irregular figures, etc. In some embodiments, the shape of the elastic element 222 may also be set based on the shape of the support element 223, which is not limited in the present disclosure. In some embodiments, in order to prevent excessive concentration of stress at angular points due to excessive non-smooth curves, the elastic element 222 may be selected to be the circle in this embodiment of the present disclosure.

In some embodiments, as shown in FIGS. 12 and 14, the vibration sensor 1100 may further include the buffer 240. The buffer 240 may be used to limit a vibration amplitude of the vibration assembly 220. In some embodiments, the buffer 240 may be disposed in the vibration sensor 1100. The buffer 240 may limit the vibration amplitude of the vibration assembly 220 by providing the vibration assembly 220 with a buffer distance in the vibration direction of the vibration assembly 220, thereby preventing the vibration assembly 220 from colliding with other components (e.g., the acoustic transducer 210) of the vibration sensor 1100 in the vibration process, realizing protection of the vibration assembly 220, and improving the reliability of the vibration sensor 1100.

In some embodiments, as shown in FIG. 12 and FIG. 14, the structure and arrangement of the buffer 240 is similar to that of the buffer 240 in FIG. 2. The buffer 240 may be disposed on a sidewall of the first acoustic cavity 250 perpendicular to the vibration direction of the vibration assembly 220. The buffer 240 may provide the vibration assembly 220 with the buffer distance in the vibration direction of the vibration assembly 220. In some embodiments, when the buffer 240 is connected to the substrate 211 and covers the sound inlet hole 2111, the buffer 240 may be set as a ring structure, so that a hollowed-out part inside the ring structure may be opposite to the sound inlet hole 2111, thereby ensuring that the buffer 240 may provide a buffer distance for the vibration assembly 220 without blocking the sound inlet hole 2111, avoiding affecting a sound pickup device 212 of the acoustic transducer 210 to pick up the vibration signal.

The vibration sensor 1100 may also include a housing (not shown). The housing cover may be disposed at the periphery of the vibration assembly 220, so that the vibration assembly 220 may be located in the acoustic cavity formed by the housing and the acoustic transducer 210, and the vibration assembly 220 may separate the acoustic cavity into the first acoustic cavity 250 and a second acoustic cavity. In some embodiments, the buffer 240 may include a first buffer part and a second buffer part, and the first buffer part and the second buffer part may be respectively disposed on both sides of the elastic element 222 in the vibration direction of the vibration assembly 220. The first buffer part may be located in the second acoustic cavity and connected to the housing or the elastic element 222. The second buffer part 242 may be located in the first acoustic cavity 250 and connected to the acoustic transducer 210 or the elastic element 222. In some embodiments, the first buffer part 241 may provide the vibration assembly 220 with a first buffer distance in the vibration direction of the vibration assembly 220, and the second buffer part 242 may provide the vibration assembly 220 with a second buffer distance in the vibration direction of the vibration assembly 220. More descriptions regarding the buffer 240 being disposed on the both sides of the elastic element 222 in the vibration direction of the vibration assembly 220 may be found in FIG. 3 and the related descriptions thereof.

In some embodiments, the buffer 240 may also be connected between the elastic element 222 and the acoustic transducer 210. The buffer 240 may include the second buffer part, and two ends of the second buffer part in the vibration direction of the vibration assembly 220 may be respectively connected to the substrate 211 of the acoustic transducer 210 and the elastic element 222. In some embodiments, when the vibration sensor 1100 includes the housing, the buffer may further include the first buffer part, and two ends of the first buffer part in the vibration direction of the vibration assembly 220 may be respectively connected to the housing and the elastic element 222. More descriptions regarding the buffer 240 being connected between the elastic element 222 and the acoustic transducer 210 (and/or the housing) may be found in FIG. 4 and the related descriptions thereof.

In some embodiments, as shown in FIGS. 14A-14B, the buffer 240 may include a magnetic buffer 243 used to generate a magnetic field. In some embodiments, the magnetic buffer 243 may include a coil. The coil may be mounted on a sidewall of the acoustic transducer 110 connected to the first acoustic cavity 250. For example, the coil may be mounted on a lower surface of the substrate 211 in the vibration direction. In other embodiments, the coil may also be supported and positioned by a limit structure, for example, a support net or a support frame may be disposed between the substrate 211 and the vibration assembly 220 to mount the coil, etc. In some embodiments, the coil may be embedded in the sidewall of the acoustic transducer 110 connected to the first acoustic cavity. For example, the coil may be embedded in the substrate 211. In some embodiments, when the coil is embedded in the substrate 211, the coil may be formed by directly etching in the substrate 211. In other embodiments, when the vibration sensor 1100 includes the housing, the magnetic buffer 243 may also be mounted on an inner wall of the housing, and the inner wall of the housing may directly face the vibration assembly 220 in the vibration direction of the vibration assembly 220. In some other embodiments, the magnetic buffer may also be embedded inside the inner wall of the housing.

In some embodiments, a shape of the coil may be a concentric circular structure, a concentric rectangular structure, a concentric polygonal structure, etc., which is not specifically limited herein.

In some embodiments, the mass element 221 may include a magnetic member or a magnetizable member, and the mass element 221 may be located within the magnetic field generated by the magnetic buffer 243 (e.g., a coil). In some embodiments, the magnetizable member included in the mass element 221 may be understood to magnetize the mass element 221 before the vibration sensor 1100 works so that the mass element 221 may have magnetism. In some embodiments, a magnetic field direction of the magnetic field generated by the coil may be consistent with the vibration direction of the vibration assembly 120, and the mass element 221 and the coil may attract or repel each other. In some embodiments, a material of the mass element 221 may be a magnetic material, a magnetizable material, etc. In some embodiments, the magnetic material refers to a material capable of directly or indirectly generating magnetism such as iron, cobalt, nickel, or alloy thereof. An exemplary magnetic material may include, but is not limited to, iron, ferrite, nickel oxide, cobalt oxide, etc. In some embodiments, the magnetizable material may be a material capable of obtaining magnetism under the action of the magnetic field or an electric current. In some embodiments, the magnetizable material may include, but is not limited to, alloy oxide, metal, etc.

In some embodiments, when the vibration sensor 1100 has the plurality of mass elements, one or more of some of the mass elements in the plurality of mass elements may include the magnetic member or the magnetizable member. In some embodiments, one of the plurality of mass elements may include the magnetic member or the magnetizable member. In some embodiments, two mass elements that are far apart from each other of the plurality of mass elements may include the magnetic member or the magnetizable member, and the remaining mass elements may not have the magnetic member or the magnetizable member. The arrangement may make the vibration amplitude of the mass element with the magnetic member or the magnetizable member adjustable and also avoid mutual magnetic force between the mass elements including the magnetic member or the magnetizable member. In some embodiments, all mass elements of the plurality of mass elements may have the magnetic member or the magnetizable member. In the arrangement, the magnetic force between the plurality of mass elements may be adjusted by adjusting the magnetic permeability or magnetization of each of the plurality of mass elements.

In some embodiments, on the one hand, the magnetic buffer 243 (e.g., the coil) may be disposed in the vibration sensor 1100, and the magnetic buffer 243 may be used to generate the magnetic field, so that the mass element 221 including the magnetic member or the magnetizable member may have magnetism, force on the mass element 221 may be changed, and the vibration amplitude of the mass element 221 may be adjusted to avoid collision between the mass element 221 or the elastic element 222 and the acoustic transducer 210 or the housing 230 in the vibration process of the mass element 221. On the other hand, the force on the mass element 221 may be adjusted through the magnetic field generated by the magnetic buffer 243, which may also adjusted the sensitivity of the vibration sensor 1100. In some embodiments, when a magnetic field strength of the magnetic field generated by the magnetic buffer 243 is relatively great, the force on the mass element 221 may be relatively great, so that the elastic element 222 may be not easy to vibrate, and the sensitivity of the vibration sensor 1100 may be relatively small. In some embodiments, when the magnetic field strength of the magnetic field generated by the magnetic buffer 243 is relatively small, the force on the mass element 221 may be relatively small, so that the elastic element 222 may be easy to vibrate, and the sensitivity of the vibration sensor 1100 may be relatively great.

In some embodiments, as shown in FIG. 11, in order to dispose a plurality of groups of vibration assemblies in a relatively small volume space, the vibration assembly 220 may further include one or more cantilever beam structures 224. The one or more cantilever beam structures 224 may be disposed in the first acoustic cavity 250. One end of the cantilever beam structure 224 may be physically connected to one side of the support element 223, and the another end may be a free end, and the free end of the cantilever beam structure 224 may be physically connected to one or more mass blocks. Specifically, the physical connection manner of the cantilever beam structure 224 and the support element 223 may include a connection manner such as welding, snapping, bonding, or integral molding, which is not limited herein. In some embodiments, the vibration assembly 220 may not include the support element 223. The cantilever beam structure 224 may be disposed in the sound inlet hole 2111 in a radial section of the sound inlet hole 2111 (i.e., the vibration direction of the vibration assembly 220) or outside the sound inlet hole 2111, and the cantilever beam structure 224 may not completely cover the sound inlet hole 2111.

In some embodiments, a material of the cantilever beam structure 224 may include a metallic material and an inorganic non-metallic material. The metal material may include, but is not limited to, copper, aluminum, tin, etc. or other alloys. The inorganic non-metallic material may include, but is not limited to, silicon, aluminum nitride, zinc oxide, lead zirconate titanate, or the like, or any combination thereof. In some embodiments, the mass element 221 may be disposed on any side of the cantilever beam structure 224 in the vibration direction. In the embodiment, the mass element 221 may be disposed on a side of the cantilever structure 224 that vibrates away from the acoustic transducer (not shown in the figure).

In some embodiments, one or more mass elements 221 may be disposed on either side of the free end of the cantilever beam structure 224 perpendicular to the vibration direction. The dimensions of the mass elements 221 may be partially or all the same, or all different. In some embodiments, distances between adjacent mass elements 221 may be the same or different. In some embodiments, when there are a plurality of mass elements 221 on the cantilever beam structure 224, structural parameters of the plurality of mass elements 221 may be the same, partially or all different. In actual use, the structural parameters of the plurality of mass elements 221 may be designed according to the vibration mode.

In a Microelectromechanical systems (MEMS) device process, in some embodiments, a length of the cantilever beam structure 224 may be 500 μm~1500 μm; in some embodiments, a thickness of the cantilever beam structure 224 may be 0.5 μm~5 μm; in some embodiments, a side length of the mass element 221 may be 50 μm~1000 μm; and in some embodiments, a height of the mass element 221 may be 50 μm~5000 μm. In some embodiments, the length of the cantilever beam structure 224 may be 700 μm~1200 μm, and the thickness of the cantilever beam structure 224 may be 0.8 μm~2.5 μm; and the side length of the mass element 221 may be 200 μm~600 μm, and the height of the mass element 221 may be 200 μm~1000 μm.

In a macro device, the length of the cantilever beam structure 224 may be 1 mm to 20 cm, and the thickness of the cantilever beam structure 224 may be 0.1 mm to 10 mm; and in some embodiments, the side length of the mass element 221 may be 0.2 mm~5 cm, and the height of the mass element 221 may be 0.1 mm~10 mm. In some embodiments, the length of the cantilever beam structure 224 may be 1.5 mm to 10 mm, and the thickness of the cantilever beam structure 224 may be 0.2 mm to 5 mm; and the side length of the mass element 221 may be 0.3 mm~5 cm, and the height of the mass element 221 may be 0.5 mm~5 cm.

Figure 15:
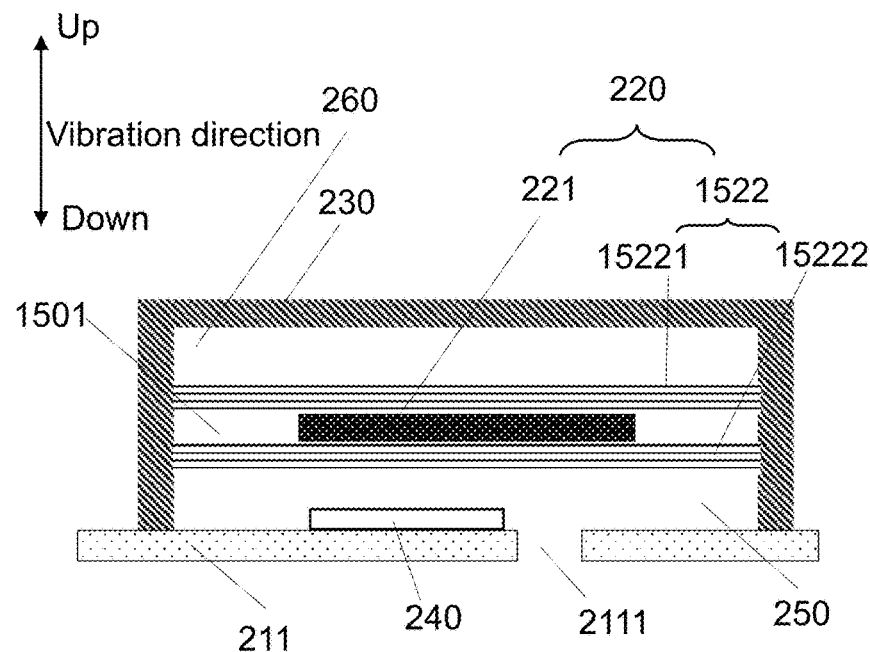
FIG. 15 is a structural diagram illustrating an exemplary vibration sensor according to some embodiments of the present disclosure.
Figure 16:
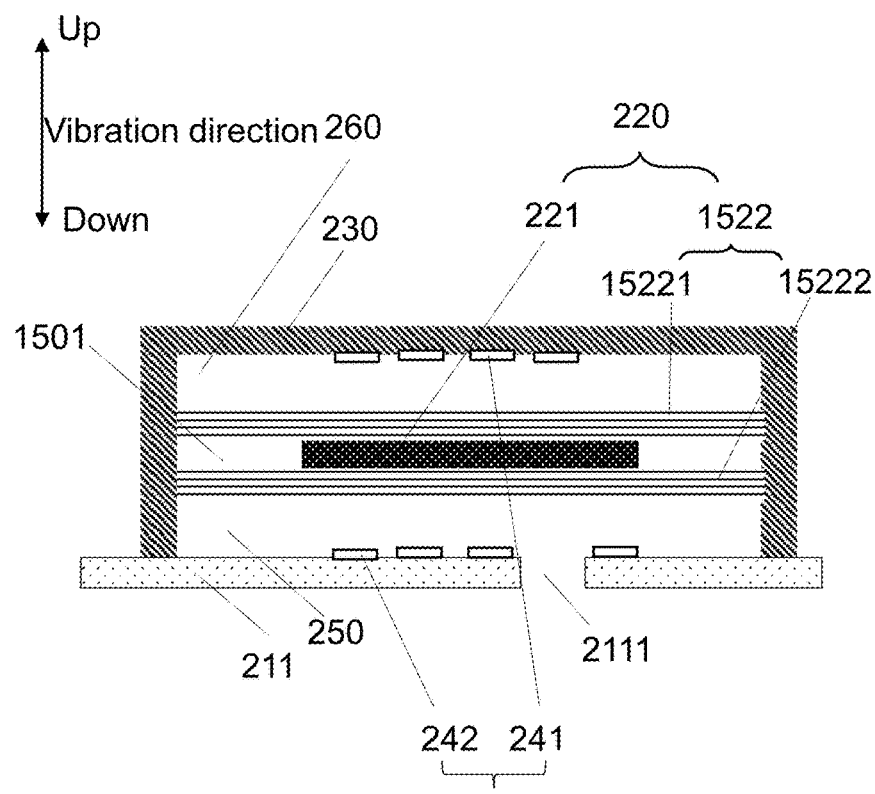
FIG. 16 is a structural diagram illustrating an exemplary vibration sensor according to some embodiments of the present disclosure.
Figure 17:
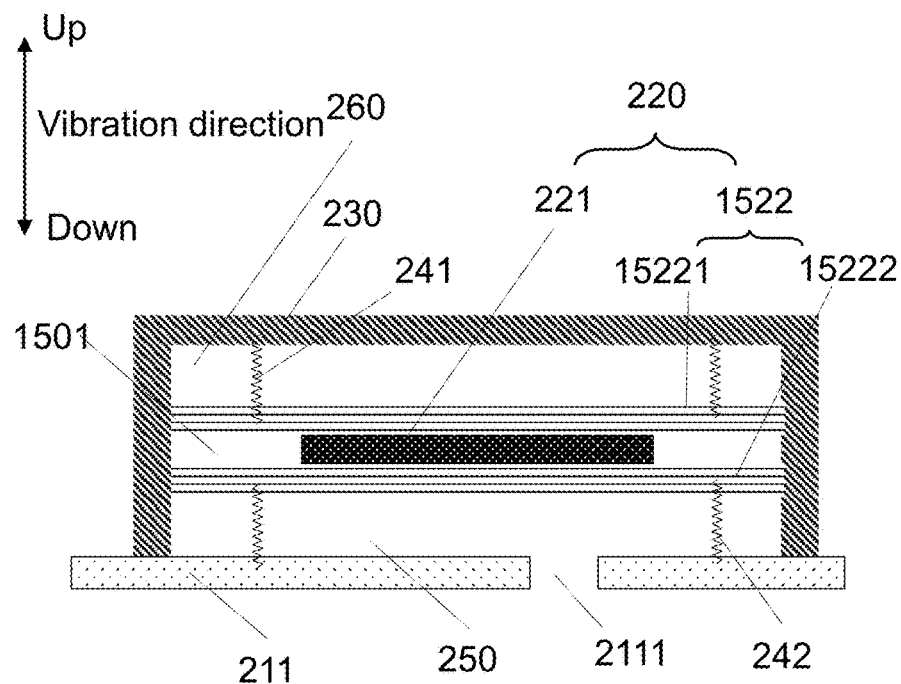
FIG. 17 is a structural diagram illustrating an exemplary vibration sensor according to some embodiments of the present disclosure.

FIG. 15 is a structural diagram illustrating an exemplary vibration sensor according to some embodiments of the present disclosure. FIG. 16 is a structural diagram illustrating an exemplary vibration sensor according to some embodiments of the present disclosure. FIG. 17 is a structural diagram illustrating a n exemplary vibration sensor according to some embodiments of the present disclosure.

In some embodiments, as shown in FIGS. 15-17, the vibration sensor 1500 may include an acoustic transducer (not shown in the figures), the vibration assembly 220, and the buffer 240. In some embodiments, the vibration assembly 220 may include the mass element 221 and an elastic element 1522. The elastic element 1522 may include a first elastic element 15221 and a second elastic element 15222. In some embodiments, the first elastic element 15221 and the second elastic element 15222 may be membrane-like structures. In some embodiments, the first elastic element 15221 and the second elastic element 15222 may be approximately symmetrically distributed relative to the mass element 221 in the vibration direction of the mass element 221. In some embodiments, the first elastic element 15221 and the second elastic element 15222 may be connected to the housing 230. For example, the first elastic element 15221 may be located on a side of the mass element 221 away from the substrate 211. A lower surface of the first elastic element 15221 may be connected to an upper surface of the mass element 221. A circumferential side of the first elastic element 15221 may be connected to an inner wall of the housing 230. The second elastic element 15222 may be located on a side of the mass element 221 close to the substrate 211. An upper surface of the second elastic element 15222 may be connected to a lower surface of the mass element 221. A circumferential side of the second elastic element 15222 may be connected to the inner wall of the housing 230. It should be noted that the membrane-like structures of the first elastic element 15221 and the second elastic element 15222 may be regular and/or irregular structures such as rectangles or circles, and shapes of the first elastic element 15221 and the second elastic element 15222 may be adaptively adjusted according to a cross-sectional shape of the housing 230.

In some embodiments, the first elastic element 15221 and the second elastic element 15222 may be disposed symmetrically with respect to the mass element 221 in the vibration direction of the mass element 221, so that a center of gravity of the mass element 221 may approximately coincide with a centroid of the elastic element 1522, and a size, shape, material, or thickness of the first elastic element 15221 may be same as those of the second elastic element 15222, so that when the vibration assembly 220 vibrates in response to vibration of the housing 230, the vibration of the mass element 221 in a direction perpendicular to the vibration direction of the mass element 221 may be reduced, thereby reducing a response sensitivity of the vibration assembly 220 to the vibration of the housing 230 in the direction perpendicular to the vibration direction of the mass element 221 and improving the direction selectivity of the vibration sensor 1500.

In some embodiments, the response sensitivity of the vibration assembly 220 to the vibration of the housing 230 in the vibration direction of the mass element 221 may be changed (e.g., improved) by adjusting the thickness or an elastic coefficient of the mass element 221 quality, a mass or a size of the elastic element 1522, etc.

In some embodiments, a distance between the centroid of at least one elastic element 1522 and the center of gravity of the mass element 221 in the vibration direction of the mass element 221 may be smaller than or equal to ⅓ of the thickness of the mass element 221. In some embodiments, the distance between the centroid of at least one elastic element 1522 and the center of gravity of the mass element 221 in the vibration direction of the mass element 221 may be smaller than or equal to ½ of the thickness of the mass element 221. In some embodiments, the distance between the centroid of at least one elastic element 1522 and the center of gravity of the mass element 221 in the vibration direction of the mass element 221 may be no smaller than or equal to ¼ of the thickness of the mass element 221.

In some embodiments, a distance between the centroid of at least one elastic element 1522 and the center of gravity of the mass element 221 in a direction perpendicular to the vibration direction of the mass element 221 may be smaller than or equal to ⅓ of a side length or radius of the mass element 221. In some embodiments, the distance between the centroid of at least one elastic element 1522 and the center of gravity of the mass element 221 in the direction perpendicular to the vibration direction of the mass element 221 may be smaller than or equal to ½ of the side length or radius of the mass element 221. In some embodiments, the distance between the centroid of at least one elastic element 1522 and the center of gravity of the mass element 221 in the direction perpendicular to the vibration direction of the mass element 221 may be smaller than or equal to ¼ of the side length or radius of the mass element 221.

In some embodiments, when the centroid of at least one elastic element 1522 coincides or approximately coincides with the center of gravity of the mass element 221, a resonance frequency of the vibration assembly 220 vibrating in the direction perpendicular to the vibration direction of the mass element 221 may be shifted to a high frequency without changing a resonance frequency of the vibration assembly 220 vibrating in the vibration direction of the mass element 221. In some embodiments, when the centroid of at least one elastic element 1522 coincides or approximately coincides with the center of gravity of the mass element 221, the resonance frequency of the vibration assembly 220 vibrating in the vibration direction of the mass element 221 may remain substantially unchanged, for example, the resonance frequency at which the vibration assembly 220 vibrates in the vibration direction of the mass element 221 may be a frequency within a relatively strong frequency range (e.g., 20 Hz~2000 Hz, 2000 Hz~3000 Hz) that is perceived by human ears. The resonance frequency of the vibration assembly 220 vibrating in the direction perpendicular to the vibration of the mass element 221 may be shifted to the high frequency and located within a relatively weak frequency range (e.g., 5000 Hz~9000 Hz, 1 kHz~14 kHz) that is perceived by human ears. The resonance frequency of the vibration assembly 220 vibrating in the direction perpendicular to the vibration direction of the mass element 221 may be shifted to the high frequency, and the resonance frequency of the vibration assembly 220 vibrating in the vibration direction of the mass element 221 may remain substantially unchanged, which may make a ratio of the resonance frequency of the vibration assembly 220 vibrating in the direction perpendicular to the vibration direction of the mass element 221 to the resonance frequency of the vibration assembly 220 vibrating in the vibration direction of the mass element 221 greater than or equal to 2. In some embodiments, the ratio of the resonance frequency of the vibration assembly 220 vibrating in the direction perpendicular to the vibration direction of the mass element 221 to the resonance frequency of the vibration assembly 220 vibrating in the vibration direction of the mass element 221 may also be greater than or equal to other values. For example, the ratio of the resonance frequency of the vibration assembly 220 vibrating in the direction perpendicular to the vibration direction of the mass element 221 to the resonance frequency of the vibration assembly 220 vibrating in the vibration direction of the mass element 221 may also be greater than or equal to 1.5.

In some embodiments, when the first elastic element 15221 and the second elastic element 15222 are membrane-like structures, a size of the upper surface or the lower surface of the mass element 221 may be smaller than sizes of the first elastic element 15221 and the second elastic element 15222, and a side surface of the mass element 221 and the inner wall of the housing 230 may form a ring or a rectangle with an equal interval. In some embodiments, the thickness of the first elastic element 15221 and the thickness of the second elastic element 15222 may be 0.1 μm~500 μm. In some embodiments, the thickness of the first elastic element 15221 and the thickness of the second elastic element 15222 may be 0.05 μm~200 μm. In some embodiments, the thickness of the first elastic element 15221 and the thickness of the second elastic element 15222 may be 300 μm~800 μm. In some embodiments, a thickness ratio of each elastic element (e.g., the first elastic element 15221 or the second elastic element 15222) to the mass element 221 may be 2~100. In some embodiments, the thickness ratio of each elastic element to the mass element 221 may be 10~50. In some embodiments, the thickness ratio of each elastic element to the mass element 221 may be 20~40. In some embodiments, a thickness difference between the mass element 221 and each elastic element (e.g., the first elastic element 15221 or the second elastic element 15222) may be 9 μm~500 μm. In some embodiments, the thickness difference between the mass element 221 and each elastic element may be 50 μm~400 μm. In some embodiments, the thickness difference between the mass element 221 and each elastic element may be 100 μm~300 μm.

In some embodiments, a gap 1501 may be formed between the first elastic element 15221, the second elastic element 15222, the mass element 221, and the housing 230 corresponding to the acoustic cavity or the acoustic transducer. As shown in FIG. 15, in some embodiments, the gap 1501 may be located on a circumferential side of the mass element 221. When the mass element 221 vibrates relative to the housing 230 in response to an external vibration signal, the gap 1501 may prevent the mass element 221 from colliding with the housing 230 during the vibration to a certain extent. In some embodiments, the gap 1501 may include a filler, and a quality factor of the vibration sensor 1500 may be adjusted by setting the filler in the gap 1501. As a preference, the filler may be set in the gap 1501, which may make the quality factor of the vibration sensor 1500 be 0.7~10. As a preference, the filler may be set in the gap 1501, which may make the quality factor of the vibration sensor 1500 be 1~5. In some embodiments, the filler may be gas, liquid (e.g., silicone oil), an elastic material, or the like, or any combination thereof. Exemplary gas may include, but is not limited to, air, argon, nitrogen, carbon dioxide, or the like, or any combination thereof. An exemplary elastic material may include, but is not limited to, silicone gel, silicone rubber, or the like.

In some embodiments, the first acoustic cavity 250 may be formed between the housing 230, the second elastic element 15222, and the substrate 211 of the acoustic transducer, and the second acoustic cavity 260 may be formed between the housing 230 and the first elastic element 15221. In some embodiments, the first acoustic cavity 250 and the second acoustic cavity 260 may have air inside. When the vibration assembly 220 vibrates relative to the housing 230, the vibration assembly 220 may compress the air inside the two acoustic cavities, the first acoustic cavity 250 and the second acoustic cavity 260 may be approximately regarded as two air springs, and a volume of the second acoustic cavity 260 may be greater than or equal to a volume of the first acoustic cavity 250, so that coefficients of the air springs brought by the compressed air of the vibration assembly 220 during the vibration may be similar, thereby further improving the symmetry of the elastic elements (including air springs) on upper and lower sides of the mass element 221. In some embodiments, the volume of the first acoustic cavity 250 and the volume of the second acoustic cavity 260 may be 10 μm³~1000 μm³. As a preference, the volume of the first acoustic cavity 250 and the volume of the second acoustic cavity 260 may be 50 μm³~500 μm³.

In some embodiments, as shown in FIGS. 15-17, in order to further prevent the mass element 221 from colliding with the housing 230 when vibrating, the vibration sensor 1500 may include the buffer 240. The buffer 240 may be used to limit a vibration amplitude of the vibration assembly 220. In some embodiments, the buffer 240 may be disposed in the vibration sensor 1500. The buffer 240 may limit the vibration amplitude of the vibration assembly 220 by providing the vibration assembly 220 with a buffer distance in the vibration direction of the vibration assembly 220, thereby preventing the vibration assembly 220 from colliding with other components (e.g., the acoustic transducer and the housing 230) of the vibration sensor 1500 in the vibration process, realizing protection of the vibration assembly 220, and improving the reliability of the vibration sensor 1500.

In some embodiments, as shown in FIG. 15, the structure and arrangement of the buffer 240 is similar to that of the buffer 240 in FIG. 2. The buffer 240 may be disposed on a sidewall of the first acoustic cavity 250 perpendicular to the vibration direction of the vibration assembly 220. The buffer 240 may provide the vibration assembly 220 with the buffer distance in the vibration direction of the vibration assembly 220. In some embodiments, the buffer 240 may also be disposed on a sidewall of the second acoustic cavity 260 perpendicular to the vibration direction of the vibration assembly 220, for example, on a sidewall of the housing 230 opposite to the vibration assembly 220.

In some embodiments, as shown in FIG. 16, the structure and arrangement of the buffer 240 is similar to that of the buffer 240 in FIG. 3. The buffer 240 may include the first buffer part 241 and the second buffer part 242. The first buffer part 241 and the second buffer part 242 may be respectively disposed on both sides of the elastic element 1522 in the vibration direction of the vibration assembly 220. The first buffer part 241 may be connected to the housing 230 or the first elastic element 15221. The second buffer part 242 may be connected to the substrate 211 of the acoustic transducer or the second elastic element 15222. In some embodiments, the first buffer part 241 may provide the vibration assembly 220 with a first buffer distance in the vibration direction of the vibration assembly 220, and the second buffer part 242 may provide the vibration assembly 220 with a second buffer distance in the vibration direction of the vibration assembly 220.

In some embodiments, as shown in FIG. 17, the structure and arrangement of the buffer 240 is similar to that of the buffer 240 in FIG. 4. The buffer 240 may be connected between the elastic element 1522 and the acoustic transducer (and/or the housing 230). The first buffer part 241 and the second buffer part 242 of the buffer 240 may be respectively disposed on both sides of the elastic element 1522 in the vibration direction of the vibration assembly 220. Specifically, two ends of the first buffer part 241 located in the second acoustic cavity 260 in the vibration direction of the vibration assembly 220 may be respectively connected to the housing 230 and the first elastic element 15221. Two ends of the second buffer part 242 located in the first acoustic cavity 250 in the vibration direction of the vibration assembly 220 may be respectively connected to the substrate 211 of the acoustic transducer and the second elastic element 15222.

In some embodiments, the buffer 240 of the vibration sensor 1500 may include a magnetic buffer. The magnetic buffer may be used to generate a magnetic field. In some embodiments, the magnetic buffer may be mounted on a sidewall of the acoustic transducer connected to the first acoustic cavity 250, for example, an upper surface of the substrate 211 in the vibration direction. In some embodiments, the magnetic buffer may also be embedded in the sidewall of the acoustic transducer connected to the first acoustic cavity 250, for example, inside the substrate 211. In some embodiments, the magnetic buffer may also be mounted on a sidewall of the second acoustic cavity 260 in the vibration direction of the vibration assembly 220. For example, the magnetic buffer may be mounted on a sidewall of the housing 230, and the sidewall of the housing 230 may directly face the vibration assembly 220 in the vibration direction of the vibration assembly 220. In some embodiments, the magnetic buffer may also be embedded inside the sidewall of the housing 230. In some embodiments, when the buffer 240 includes the magnetic buffer, the mass element 221 may include a magnetic member or a magnetizable member, the mass element 221 may be located within the magnetic field generated by the magnetic buffer, and the mass element 221 may be subjected to the magnetic force of the magnetic field. In some embodiments, the magnetic buffer may be located on the sidewall of the first acoustic cavity 250 and the sidewall of the second acoustic cavity 260 at the same time, so that the magnetic field generated by the magnetic buffer is more uniform. In some embodiments, the magnetic field generated by the magnetic buffer may adjust the force on the mass element 221, thereby limiting the vibration amplitude of the mass element 221. More descriptions regarding the magnetic buffer may be found in FIGS. 14A and 14B, and the related descriptions thereof.

Figure 18:
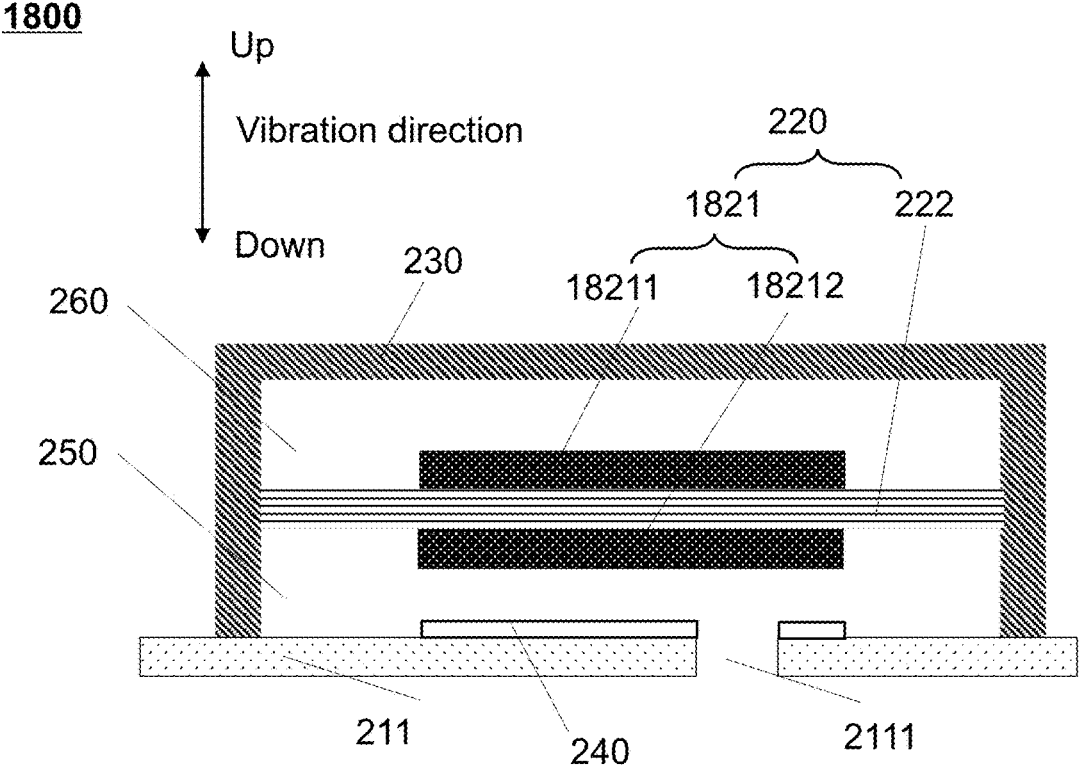
FIG. 18 is a structural diagram illustrating an exemplary vibration sensor according to some embodiments of the present disclosure.
Figure 19:
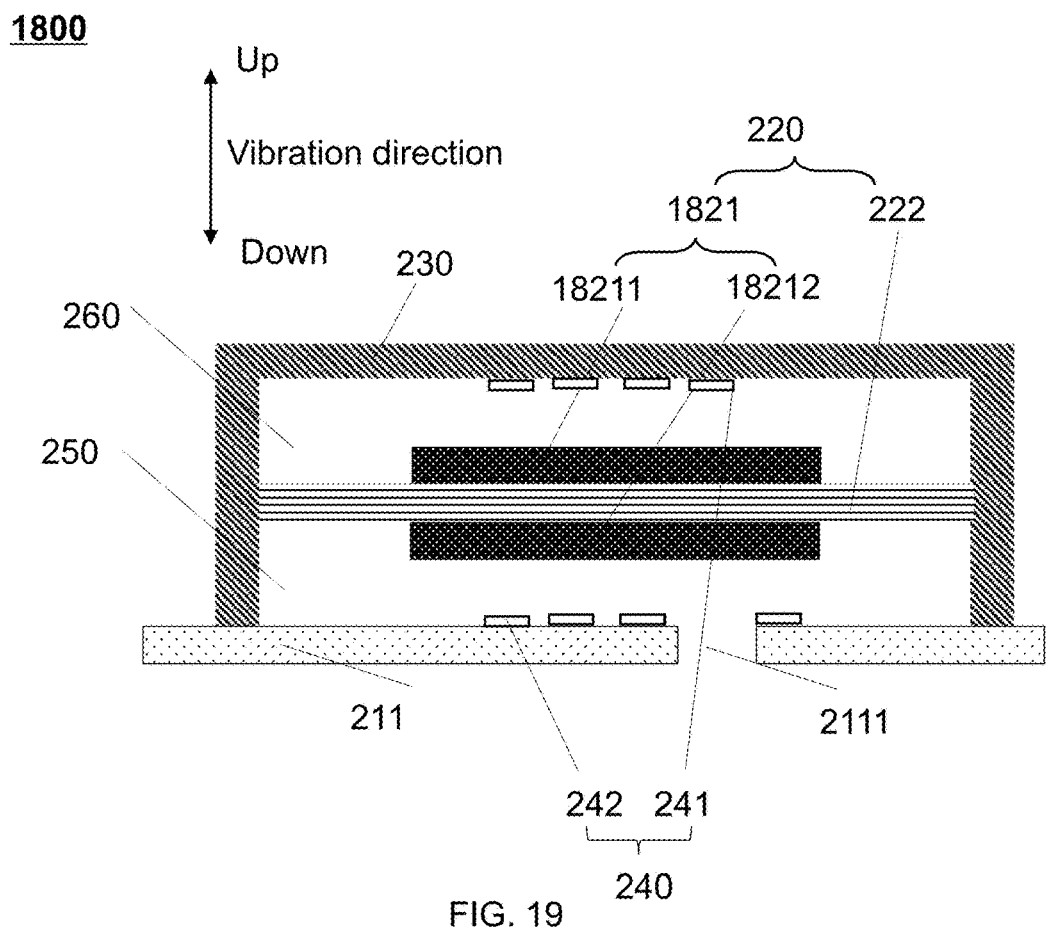
FIG. 19 is a structural diagram illustrating an exemplary vibration sensor according to some embodiments of the present disclosure.
Figure 20:
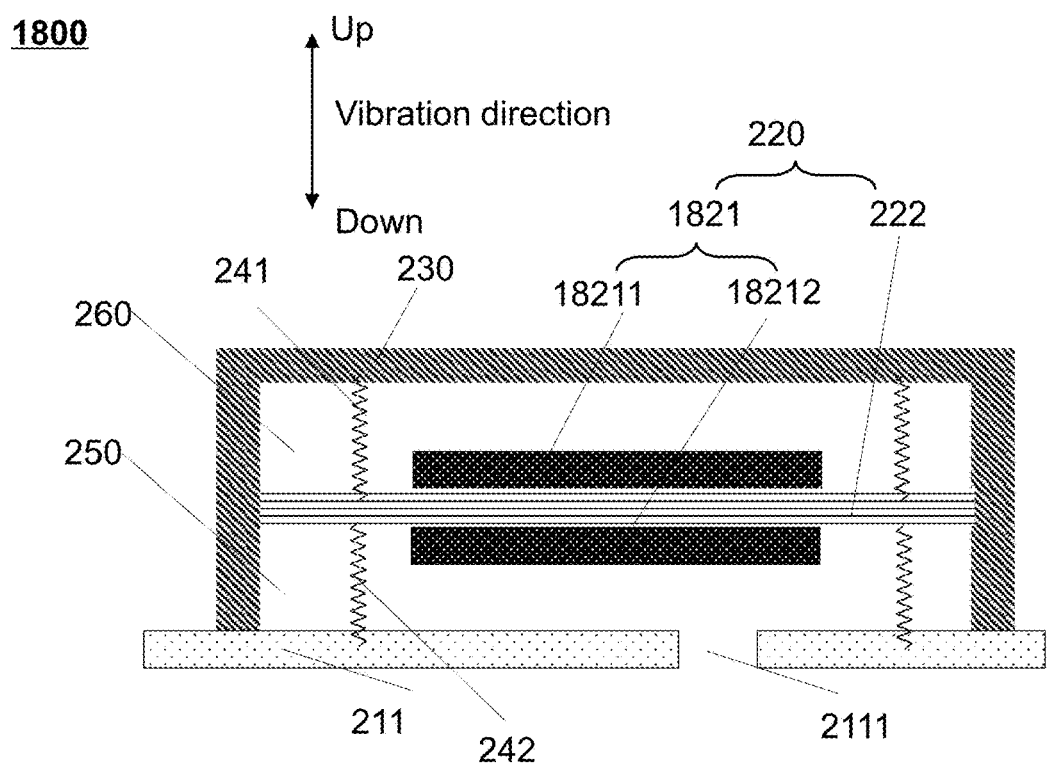
FIG. 20 is a structural diagram illustrating an exemplary vibration sensor according to some embodiments of the present disclosure.

FIG. 18 is a structural diagram illustrating an exemplary vibration sensor according to some embodiments of the present disclosure. FIG. 19 is a structural diagram illustrating an exemplary vibration sensor according to some embodiments of the present disclosure. FIG. 20 is a structural diagram illustrating an exemplary vibration sensor according to some embodiments of the present disclosure.

The structure of the vibration sensor 1800 shown in FIGS. 18-20 is similar to that of the vibration sensor 1500 shown in FIGS. 15-17, and the difference lies in the a vibration assembly. The vibration assembly 220 of the vibration sensor 1800 may include at least one elastic element 222 and two mass elements (e.g., a first mass element 18211 and a second mass element 18212). In some embodiments, the mass element 1821 may include the first mass element 18211 and the second mass element 18212. The first mass element 18211 and the second mass element 18212 may be symmetrically disposed in the vibration direction thereof with respect to the at least one elastic element 222. In some embodiments, the first mass element 18211 may be located on a side of the at least one elastic element 222 away from the substrate 211, and a lower surface of the first mass element 18211 may be connected to an upper surface of the at least one elastic element 222. The second mass element 18212 may be located on a side of the at least one elastic element 222 towards the substrate 211, and an upper surface of the second mass element 18212 may be connected to a lower surface of the at least one elastic element 222. In some embodiments, a size, shape, material, or thickness of the first mass element 18211 may be the same as a size, shape, material, or thickness of the second mass element 18212. In some embodiments, the first mass element 18211 and the second mass element 18212 may be symmetrically disposed in the vibration direction thereof with respect to the at least one elastic element 222, so that a center of gravity of the mass element 1821 may approximately coincide with a centroid of the at least one elastic element 222, and when the vibration assembly 220 vibrates in response to vibration of the housing 230, the vibration of the mass element 1821 in a direction perpendicular to the vibration direction of the mass element 1821 may be reduced, thereby reducing a response sensitivity of the vibration assembly 220 to the vibration of the housing 230 in the direction perpendicular to the vibration direction of the mass element 1821 and improving the direction selectivity of the vibration sensor 1800.

In some embodiments, as shown in FIGS. 18-20, the buffer 240 may be disposed in the vibration sensor 1800. The buffer 240 may be used to limit a vibration amplitude of the vibration assembly 220. In some embodiments, the buffer 240 may limit the vibration amplitude of the vibration assembly 220 by providing the vibration assembly 220 with a buffer distance in the vibration direction of the vibration assembly 220, thereby preventing the vibration assembly 220 from colliding with other components (e.g., the acoustic transducer and the housing 230) of the vibration sensor 1800 in the vibration process, realizing protection of the vibration assembly 220, and improving the reliability of the vibration sensor 1800.

In some embodiments, as shown in FIG. 18, the structure and arrangement of the buffer 240 is similar to that of the buffer 240 in FIG. 15. The buffer 240 may be disposed on a sidewall of the first acoustic cavity 250 or the second acoustic cavity 260 perpendicular to the vibration direction of the vibration assembly 220. The buffer 240 may provide the vibration assembly 220 with the buffer distance in the vibration direction of the vibration assembly 220. In the structural setting, the buffer distance refers to a distance between a non-contact surface of the buffer 240 and the first mass element 18211 or the second mass element 18212.

In some embodiments, as shown in FIG. 19, the structure and arrangement of the buffer 240 is similar to that of the buffer 240 in FIG. 16. The buffer 240 may include the first buffer part 241 and the second buffer part 242. The first buffer part 241 and the second buffer part 242 may be respectively disposed on both sides of the elastic element 222 in the vibration direction of the vibration assembly 220. The first buffer part 241 may be disposed in the second acoustic cavity 260 and connected to the housing 230 or the elastic element 222. The second buffer part 242 may be disposed in the first acoustic cavity 250 and connected to the substrate 211 of the acoustic transducer or the elastic element 222. In some embodiments, the first buffer part 241 may provide the vibration assembly 220 with a first buffer distance in the vibration direction of the vibration assembly 220, and the second buffer part 242 may provide the vibration assembly 220 with a second buffer distance in the vibration direction of the vibration assembly 220. The first buffer distance refers to a distance between a non-contact surface of the first buffer part 241 and the first mass element 18211 or the housing 230. The second buffer distance refers to a distance between a non-contact surface of the second buffer part 242 and the second mass element 18212 or the substrate 211.

In some embodiments, as shown in FIG. 20, the structure and arrangement of the buffer 240 is similar to that of the buffer 240 in FIG. 17. The buffer 240 may be connected between the elastic element 222 and the acoustic transducer (and/or the housing 230). The first buffer part 241 and the second buffer part 242 of the buffer 240 may be respectively disposed on both sides of the elastic element 222 in the vibration direction of the vibration assembly 220. Specifically, the first buffer part 241 may be disposed in the second acoustic cavity 260 and two ends of the first buffer part 241 in the vibration direction of the vibration assembly 220 may be respectively connected to the housing 230 and the elastic element 222. The second buffer part 242 may be disposed in the first acoustic cavity 250 and two ends of the second buffer part 242 in the vibration direction of the vibration assembly 220 may be respectively connected to the substrate 211 of the acoustic transducer and the elastic element 222.

In some embodiments, the buffer 240 of the vibration sensor 1800 may include a magnetic buffer. The magnetic buffer may be used to generate a magnetic field. In some embodiments, the magnetic buffer may be mounted on a sidewall of the acoustic transducer connected to the first acoustic cavity 250 and/or a sidewall of the second acoustic cavity 260 in the vibration direction of the vibration assembly 220. In some embodiments, the magnetic buffer may also be embedded in the sidewall of the acoustic transducer connected to the first acoustic cavity 250, for example, inside the substrate 211. In some embodiments, the magnetic buffer may also be embedded in the sidewall of the second acoustic cavity 260 in the vibration direction of the vibration assembly 220, for example, a sidewall of the housing 230. In some embodiments, when the buffer 240 includes a magnetic buffer, the mass element 221 may include a magnetic member or a magnetizable member, the mass element 221 may be located within the magnetic field generated by the magnetic buffer, and the mass element 221 may be subjected to the magnetic force of the magnetic field. In some embodiments, the magnetic field generated by the magnetic buffer may adjust the force on the mass element 221, thereby limiting the vibration amplitude of the mass element 221. More descriptions regarding the magnetic buffer may be found in FIGS. 14A and 14B, and the related descriptions thereof.

Figure 21:
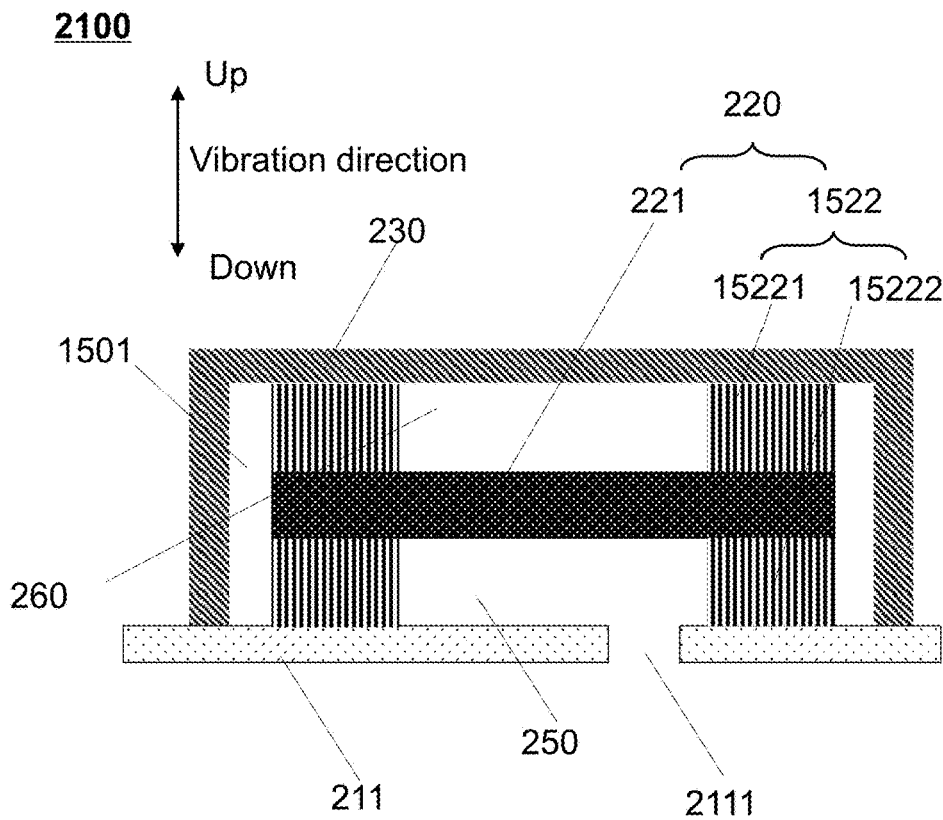
FIG. 21 is a structural diagram illustrating an exemplary vibration sensor according to some embodiments of the present disclosure.

FIG. 21 is a structural diagram illustrating a n exemplary vibration sensor according to some embodiments of the present disclosure.

The vibration sensor 2100 shown in FIG. 21 is similar to the vibration sensor 1500 shown in FIG. 15, and the difference lies in the structure and arrangement of an elastic element. In some embodiments, as shown FIG. 21, the first elastic element 15221 and the second elastic element 15222 of the vibration sensor 2100 may be columnar structures, and the first elastic element 15221 and the second elastic element 15222 may respectively extend in the vibration direction of the mass element 221 and may be connected to the housing 230 or the substrate 211 of the acoustic transducer. It should be noted that the columnar structures of the first elastic element 15221 and the second elastic element 15222 may be regular and/or irregular structures such as columns and square columns, and shapes of the first elastic element 15221 and the second elastic element 15222 may be adaptively adjusted according to the cross-sectional shape of the housing 230.

In some embodiments, when the first elastic element 15221 and the second elastic element 15222 are the columnar structures, a thickness of the mass element 221 may be 10 µm~1000 µm. In some embodiments, the thickness of the mass element 221 may be 4 µm~500 µm. In some embodiments, the thickness of the mass element 221 may be 600 µm~1400 µm. In some embodiments, a thickness of the first elastic element 15221 and a thickness of the second elastic element 15222 may be 10 um~1000 µm. In some embodiments, the thickness of the first elastic element 15221 and the thickness of the second elastic element 15222 may be 4 µm~500 µm. In some embodiments, the thickness of the first elastic element 15221 and the thickness of the second elastic element 15222 may be 600 µm~1400 µm. In some embodiments, a difference between the thickness of each of the elastic elements 1522 (e.g., the first elastic element 15221 and the second elastic element 15222) and the thickness of the mass element 221 may be 0 µm~500 µm. In some embodiments, the difference between the thickness of each elastic element 1522 and the thickness of the mass element 221 may be 20 μm~400 μm. In some embodiments, the difference between the thickness of each elastic element 1522 and the thickness of the mass element 221 may be 50 μm~200 μm. In some embodiments, a ratio of the thickness of each elastic element 1522 to the thickness of the mass element 221 may be 0.01~100. In some embodiments, the ratio of the thickness of each elastic element 1522 to the thickness of the mass element 221 may be 0.5~80. In some embodiments, the ratio of the thickness of each elastic element 1522 to the thickness of the mass element 221 may be 1~40.

In some embodiments, the first elastic element 15221 in the vibration sensor 2100 may be connected between the mass element 221 and the housing 230, and the second elastic element 15222 may be connected between the mass element 221 and the substrate 211. In this connection mode, when the vibration assembly 220 vibrates, the first elastic element 15221 and the second elastic element 15222 may be extruded, thereby limiting a vibration amplitude of the vibration assembly 220 and preventing the vibration assembly 220 from colliding with the housing 230 and the substrate 211, thereby improving the reliability of the vibration sensor 2100.

Figure 22:
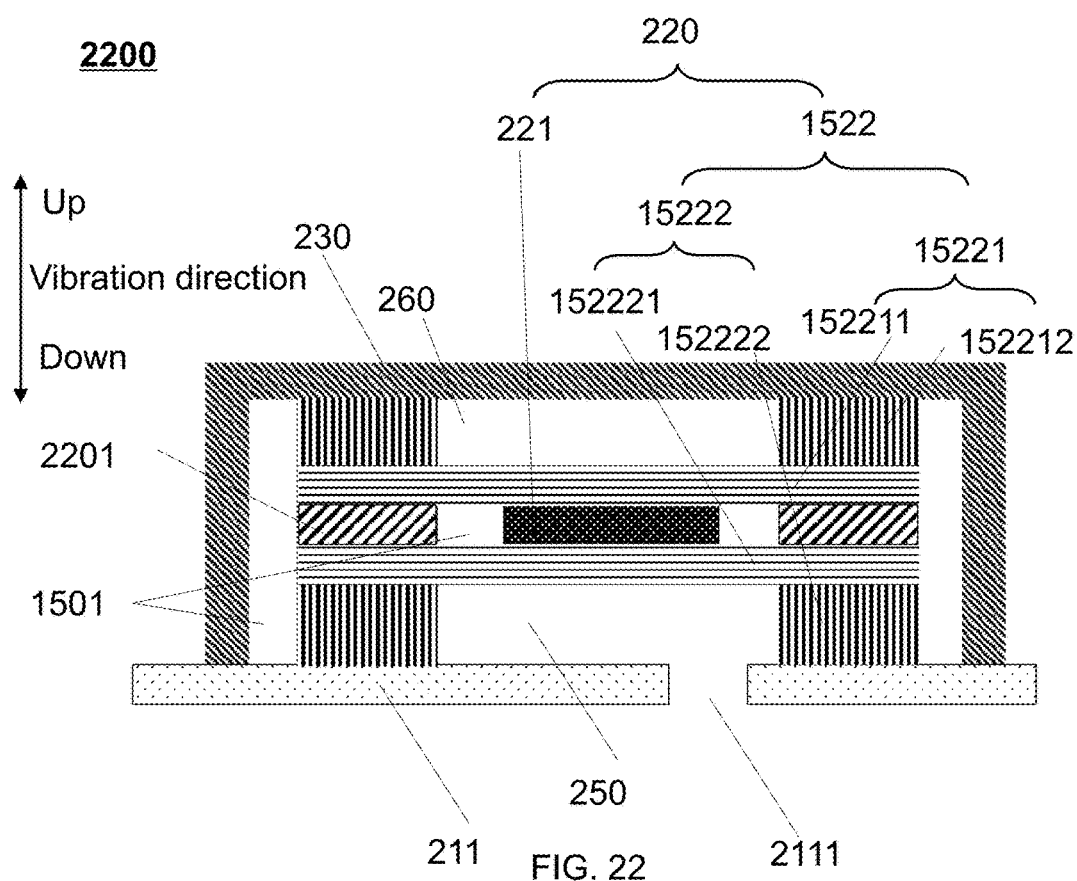
FIG. 22 is a structural diagram illustrating an exemplary vibration sensor according to some embodiments of the present disclosure.
Figure 23:
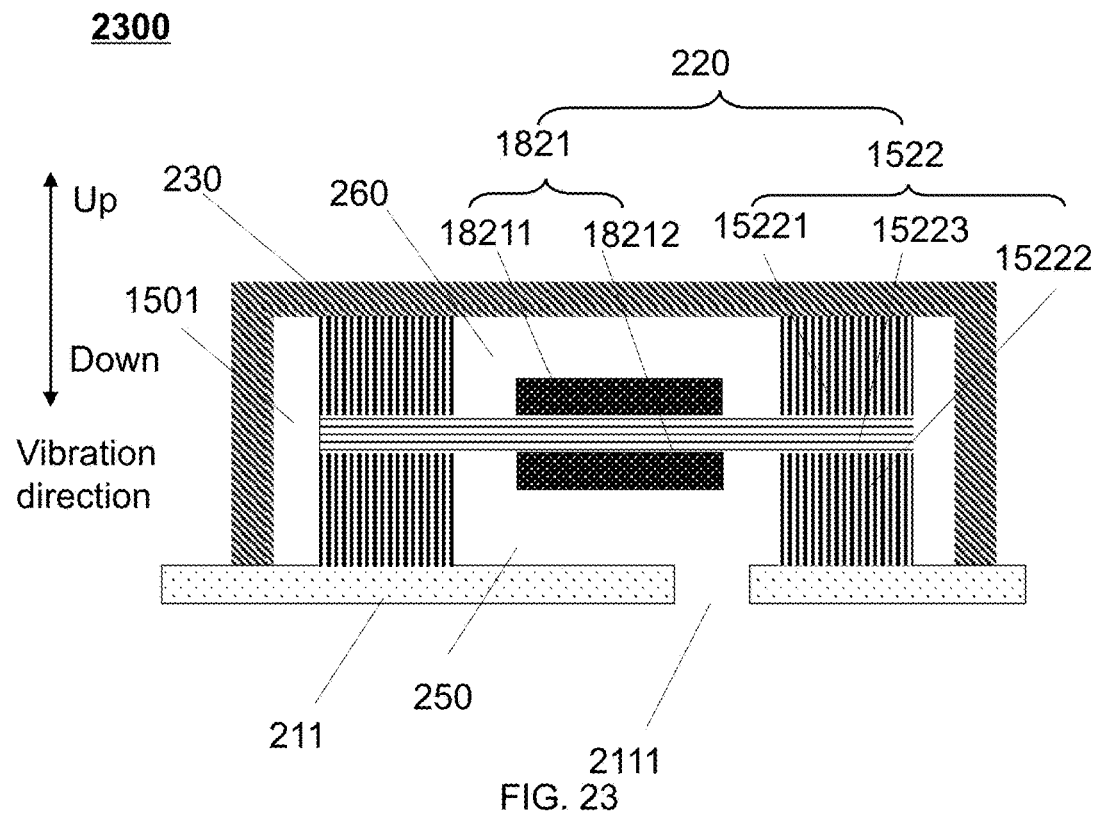
FIG. 23 is a structural diagram illustrating an exemplary vibration sensor according to some embodiments of the present disclosure.

FIG. 22 is a structural diagram illustrating a n exemplary vibration sensor according to some embodiments of the present disclosure. FIG. 23 is a structural diagram illustrating a n exemplary vibration sensor according to some embodiments of the present disclosure.

The vibration sensor 2200 shown in FIG. 22 is similar to the vibration sensor 1500 shown in FIG. 15, and the difference lies in an elastic element. In some embodiments, as shown in FIG. 22, the first elastic element 15221 of the vibration sensor 2200 may include a first sub-elastic element 152211 and a second sub-elastic element 152212. The first sub-elastic element 152211 may be connected to the housing 230 corresponding to the second acoustic cavity 260 through the second sub-elastic element 152212, and the first sub-elastic element 152211 may be connected to an upper surface of the mass element 221. In some embodiments, a circumferential side of the first sub-elastic element 152211 and a circumferential side of the second sub-elastic element 152212 may or may not coincide. In some embodiments, the second elastic element 15222 of the vibration sensor 2200 may include a third sub-elastic element 152221 and a fourth sub-elastic element 152222. The third sub-elastic element 152221 may be connected to the substrate 211 corresponding to the first acoustic cavity 250 through the fourth sub-elastic element 152222, and the third sub-elastic element 152221 may be connected to a lower surface of the mass element 221. In some embodiments, the circumferential side of the third sub-elastic element 152221 and the circumferential side of the fourth sub-elastic element 152222 may or may not coincide.

In some embodiments, the vibration sensor 2200 may further include a fixing piece 2201. The fixing piece 2201 may be distributed along a circumferential side of the mass element 221. The fixing piece 2201 may be located between the first sub-elastic element 152211 and the third sub-elastic element 152221, and an upper surface and a lower surface of the fixing piece 2201 may be connected to the first sub-elastic element 152211 and the third sub-elastic element 152221, respectively.

In some embodiments, a material of the fixing piece 2201 may be an elastic material such as foam, plastic, rubber, or silicone. In some embodiments, the material of the fixing piece 2201 may also be a rigid material such as metal or metal alloy. In some embodiments, the fixed piece 2201 may achieve a the fixing function of the gap 1501, and the fixed piece 2201 may also be used as an additional mass element, so as to adjust a resonance frequency of the vibration sensor 2200, thereby adjusting (e.g., reducing) the sensitivity of the vibration sensor 2200.

In some embodiments, the first sub-elastic element 152211 and the second sub-elastic element 152212 may be disposed in the first elastic element 15221, and the third sub-elastic element 152221 and the fourth sub-elastic element 152222 may be disposed in the second elastic element 15222, so that in this arrangement, the second sub-elastic element 152212 and the fourth sub-elastic element 152222 may be used to limit a vibration amplitude of the vibration assembly 220, thereby preventing the vibration assembly 220 from colliding with other components (e.g., the substrate 211, the housing 230) of the vibration sensor 2200 and improving the reliability of the vibration sensor 2200.

In some embodiments, as shown in FIG. 23, the vibration sensor 2300 shown in FIG. 23 is similar to the vibration sensor 1800 shown in FIG. 18, and the difference lies in a structure and connection method of the elastic element. The elastic element 1522 of the vibration sensor 2300 shown in FIG. 23 may include the first elastic element 15221, the second elastic element 15222, and a third elastic element 15223. The third elastic element 15223 may be respectively connected to the housing 230 and the substrate 211 through the first elastic element 15221 and the second elastic element 15222. In this arrangement, when the vibration assembly 220 vibrates, the first elastic element 15221 and the second elastic element 15222 may be extruded, and the first elastic element 15221 and the second elastic element 15222 may limit the vibration amplitude of the vibration assembly 220, thereby preventing the vibration assembly 220 from colliding with other components (e.g., the substrate 211, the housing 230) of the vibration sensor 2200, thereby improving the reliability of the vibration sensor 2200.

Figure 24:
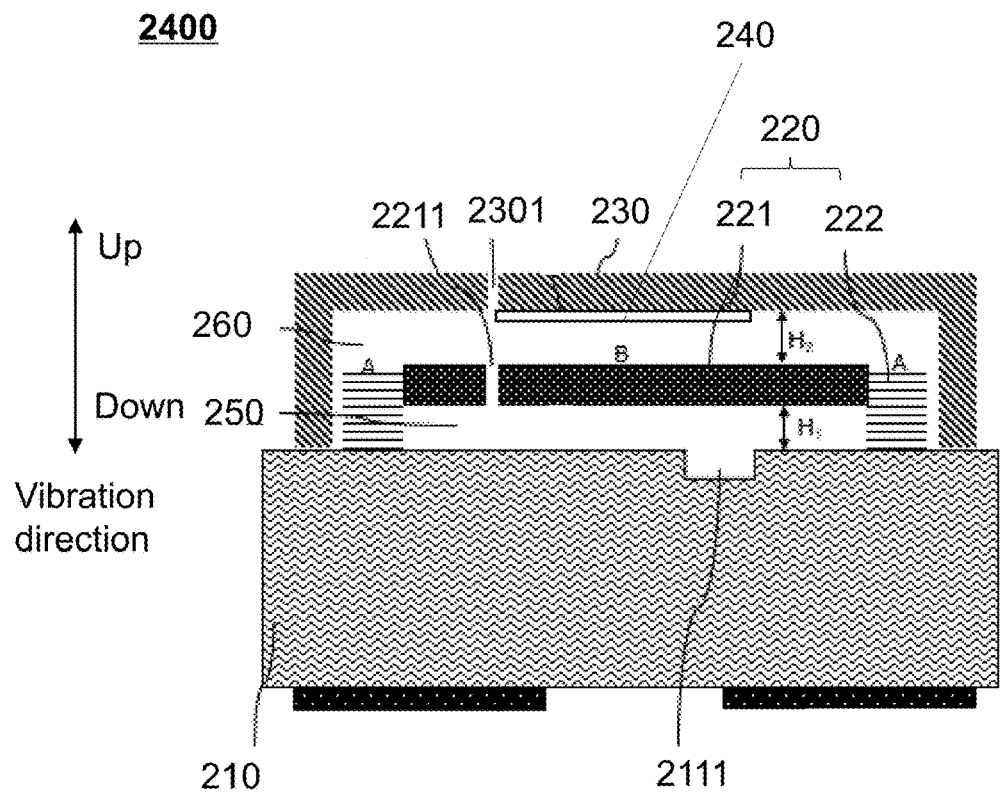
FIG. 24 is a structural diagram illustrating an exemplary vibration sensor according to some embodiments of the present disclosure.
Figure 25:
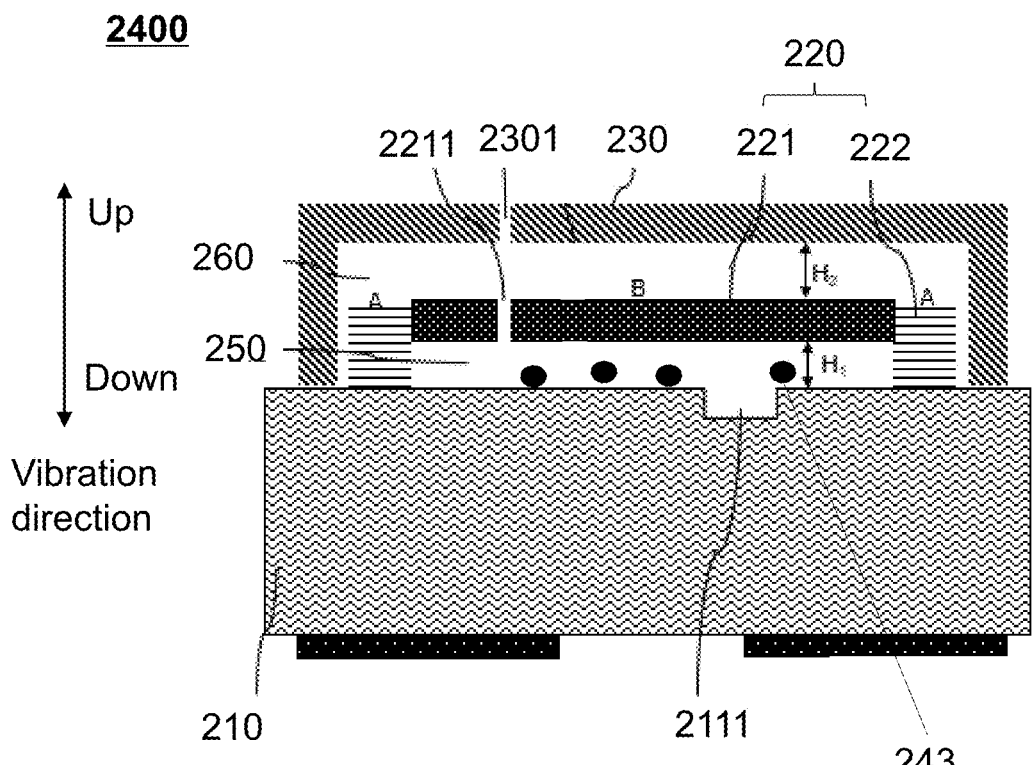
FIG. 25 is a structural diagram illustrating an exemplary vibration sensor according to some embodiments of the present disclosure.

FIG. 24 is a structural diagram illustrating an exemplary vibration sensor according to some embodiments of the present disclosure. FIG. 25 is a structural diagram illustrating a n exemplary vibration sensor according to some embodiments of the present disclosure.

The vibration sensor 2400 shown in FIGS. 24-25 is similar to the vibration sensor 200 shown in FIG. 2, and the difference lies in that an elastic element and a mass element are connected in a different way. In some embodiments, the vibration assembly 220 of the vibration sensor 2400 may include the mass element 221 and the elastic element 222. The elastic element 222 may be connected around a sidewall of the mass element 221, and an inner side of the elastic element 222 may be connected to the sidewall of the mass element 221. The inner side of the elastic element 222 refers to a side where space surrounded by the elastic element 222 is located. The sidewall of the mass element 221 refers to a side of the mass element 221 parallel to the vibration direction. In some embodiments, the elastic element 222 may extend toward the acoustic transducer 210 and may be directly or indirectly connected to the acoustic transducer 210. For example, one end of the elastic element 222 extending toward the acoustic transducer 210 may be directly physically connected (e.g., glued) to the acoustic transducer 210. As another example, the acoustic transducer 210 may include a substrate, and one end of the elastic element 222 extending toward the acoustic transducer 210 may be connected to the acoustic transducer 210 through the substrate. In some embodiments, a first acoustic cavity may be formed between the mass element 221, the elastic element 222, and the acoustic transducer 210, and the acoustic transducer 210 may be in communication with the first acoustic cavity through the sound inlet hole 2111. In some embodiments, since the elastic element 222 is connected around the sidewall of the mass element 221, when the vibration assembly 220 vibrates in the vibration direction, momentum of the mass element 221 may be converted into a force on the elastic element 222, so that the elastic element 222 may undergo shear deformation. Compared with tension and compression deformation, the shear deformation may reduce a spring constant of the elastic element 222, which may reduce a resonance frequency of the vibration sensor 2400, thereby improving the vibration amplitude of the mass element 221 in the vibration process of the vibration assembly 220 and improving the sensitivity of the vibration sensor 2400. Moreover, when the elastic element 222 undergoes the shear deformation, as a deformation amount of the shear deformation increases, a direction in which a shear force acts on the mass element 221 may change accordingly, and a proportion of the shear force in the vibration direction may become larger, so that the elastic element 222 may provide a sufficient elastic force for the mass element 221 in the vibration direction, thereby ensuring the vibration performance of the vibration assembly 220.

In some embodiments, at least one pressure relief hole may be disposed on at least one of the housing 230 or the mass element 221 of the vibration sensor 2400. In some embodiments, the at least one pressure relief hole 2301 may be disposed on the housing 230. The pressure relief hole 2301 may pass through the housing 230. In some embodiments, the at least one pressure relief hole 2211 may be disposed on the mass element 221. The pressure relief hole 2211 may pass through the mass element 221. The pressure relief hole 2211 on the mass element 221 may allow gas in the first acoustic cavity 250 to communicate with gas in the second acoustic cavity 260, and the pressure relief hole 2301 on the housing 230 may allow gas in the second acoustic cavity 260 to communicate with gas outside. In this way, an air pressure change inside the first acoustic cavity 250 and the second acoustic cavity 260 caused by a temperature change in a preparation process of the vibration sensor 2400 (e.g., in a reflow soldering process) may be balanced, and damages (e.g., cracking or deformation) to components of the vibration sensor 2400 caused by the air pressure change may be reduced or prevented. In some embodiments, the at least one pressure relief hole 2301 may be disposed on the housing 230, and the pressure relief hole 2301 may be used to reduce damping generated by the gas in the second acoustic cavity 260 when the mass element 221 vibrates.

In some embodiments, as shown in FIGS. 24-25, the buffer 240 may be disposed in the vibration sensor 2400, and the buffer 240 may be used to limit a vibration amplitude of the vibration assembly 220. In some embodiments, the buffer 240 may be disposed in the vibration sensor 2400. The buffer 240 may limit the vibration amplitude of the vibration assembly 220 by providing the vibration assembly 220 with a buffer distance in the vibration direction of the vibration assembly 220, thereby preventing the vibration assembly 220 from colliding with other components (e.g., the acoustic transducer 210 and the housing 230) of the vibration sensor 2400 in the vibration process, realizing protection of the vibration assembly 220, and improving the reliability of the vibration sensor 2400.

In some embodiments, as shown in FIG. 24, the buffer 240 may be disposed in the second acoustic cavity 260 and connected to the mass element 221 and/or the housing 230. For example, the buffer 240 may be disposed on a side wall perpendicular to the vibration direction of the vibration assembly 220 in the second acoustic cavity 260, and the buffer 240 may be connected to the housing 230. The buffer 240 may provide the vibration assembly 220 with the buffer distance in the vibration direction of the vibration assembly 220. Taking the buffer 240 being disposed on a sidewall of the housing 230 perpendicular to the vibration direction in the second acoustic cavity 260 as an example, the buffer 240 may be connected to the sidewall of the housing 230, and the buffer distance provided by the buffer 240 for the vibration assembly 220 may be a distance between a lower surface of the buffer 240 in the vibration direction of the vibration assembly 220 and an upper surface of the mass element 221 in the vibration direction of the vibration assembly 220. In some embodiments, the buffer 240 may also be disposed in the first acoustic cavity 250 and connected to the mass element 221 and/or the substrate of the acoustic transducer 210. In some embodiments, when the pressure relief hole 2211 is disposed on the mass element 221, or the pressure relief hole 2301 is disposed on the housing 230, the buffer 240 may not cover the pressure relief hole 2211 or the pressure relief hole 2301. For example, a hole directly facing the pressure relief hole 2211 or the pressure relief hole 2301 may be disposed on the buffer 240, so that the buffer 240 may not block the pressure relief hole 2211 or the pressure relief hole 2301.

In some embodiments, as shown in FIG. 25, the buffer 240 may include the magnetic buffer 243. The magnetic buffer 243 may be used to generate a magnetic field. In some embodiments, the magnetic buffer 243 may include a coil. The coil may generate the magnetic field. In some embodiments, the magnetic buffer 243 may be mounted on a sidewall of the acoustic transducer 210 connected to the first acoustic cavity 250, for example, an upper surface of the substrate in the vibration direction. In some embodiments, the magnetic buffer 243 may also be embedded in the sidewall of the acoustic transducer 210 connected to the first acoustic cavity 250, for example, inside the substrate. In other embodiments, the magnetic buffer 243 may also be mounted on the sidewall of the housing 230 perpendicular to the vibration direction in the second acoustic cavity 260, or embedded in the sidewall of the housing 230. In some embodiments, when the buffer 240 includes the magnetic buffer 243, the mass element 221 may include a magnetic member or a magnetizable member, the mass element 221 may be located within the magnetic field generated by the magnetic buffer 243, and the mass element 221 may be subjected to the magnetic force of the magnetic field. In some embodiments, the magnetic field generated by the magnetic buffer 243 may adjust the force on the mass element 221, thereby limiting the vibration amplitude of the mass element 221. More descriptions regarding the magnetic buffer may be found in FIGS. 14A and 14B, and the related descriptions thereof.

Figure 26:
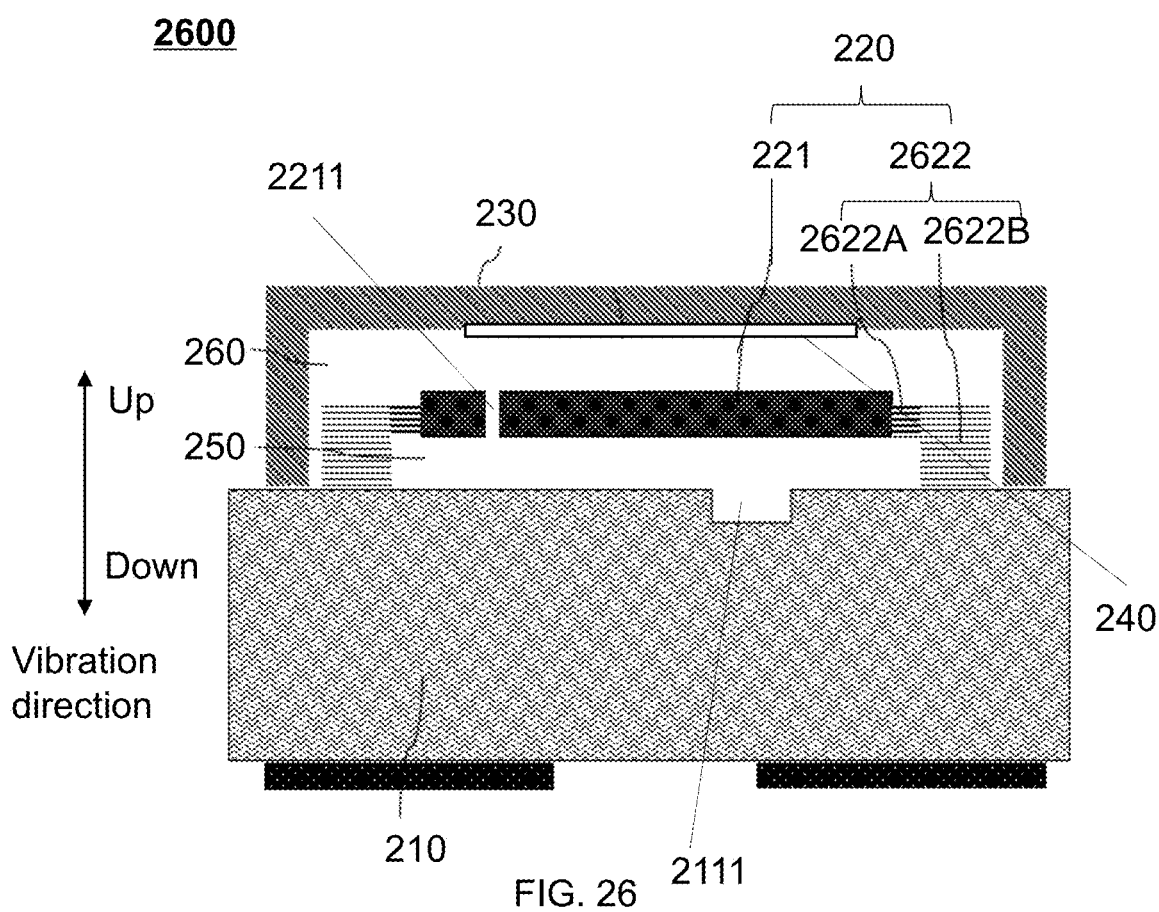
FIG. 26 is a structural diagram illustrating an exemplary vibration sensor according to some embodiments of the present disclosure.
Figure 27:
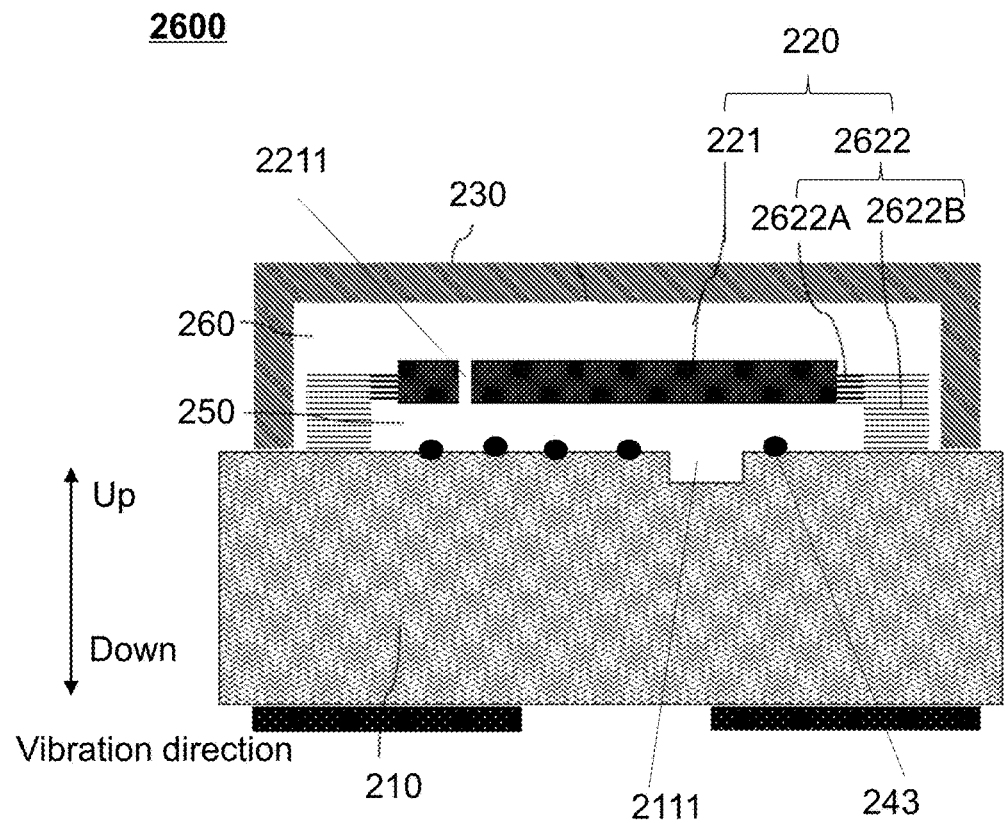
FIG. 27 is a structural diagram illustrating an exemplary vibration sensor according to some embodiments of the present disclosure.

FIG. 26 is a structural diagram illustrating a n exemplary vibration sensor according to some embodiments of the present disclosure. FIG. 27 is a structural diagram illustrating a n exemplary vibration sensor according to some embodiments of the present disclosure.

The vibration sensor 2600 shown in FIGS. 26-27 is similar to the vibration sensor 2400 shown in FIGS. 24-25, and the difference lies in the elastic element. As shown in FIGS. 26-27, an elastic element 2622 of the vibration sensor 2600 may include a first elastic part 2622A and a second elastic part 2622B. Two ends of the first elastic part 2622A may be respectively connected to a sidewall of the mass element 221 and the second elastic part 2622B. The second elastic part 2622B may extend toward the acoustic transducer 210 and may be directly or indirectly connected to the acoustic transducer 210. In this embodiment, the first elastic part 2622A may be not connected to/in contact with the acoustic transducer 210 or the substrate, which may effectively reduce the stiffness of the elastic element 2622, thereby increasing a vibration amplitude of the mass element 221 in the vibration process of the vibration assembly 220, further reducing a resonance frequency of the vibration sensor 2600, and improving the sensitivity of the vibration sensor 2600. In some embodiments, the resonance frequency of the vibration sensor 2600 may be 1000 Hz~4000 Hz. As a preference, the resonance frequency of the vibration sensor 2600 may be 1000 Hz~3000 Hz. As a preference, the resonance frequency of the vibration sensor 2600 may be 1000 Hz~2000 Hz. As a preference, the resonance frequency of the vibration sensor 2600 may be 1000 Hz~1500 Hz. As a preference, the resonance frequency of the vibration sensor 2600 may be 2000 Hz~4000 Hz. As a preference, the resonance frequency of the vibration sensor 2600 may be 3000 Hz~4000 Hz. As a preference, the resonance frequency of the vibration sensor 2600 may be 2000 Hz~3500 Hz. As a preference, the resonance frequency of the vibration sensor 2600 may be 2500 Hz~3000 Hz.

In some embodiments, the first elastic part 2622A and the second elastic part 2622B may be made of a same material or different materials. In some embodiments, a Shore hardness of the first elastic part 2622A and a Shore hardness of the second elastic part 2622B may be 0.1 HA~100 HA. As a preference, the Shore hardness of the first elastic part 2622A and the Shore hardness of the second elastic part 2622B may be 0.2 HA~95 HA. As a preference, the Shore hardness of the first elastic part 2622A and the Shore hardness of the second elastic part 2622B may be 0.4 HA~85 HA. As a preference, the Shore hardness of the first elastic part 2622A and the Shore hardness of the second elastic part 2622B may be 0.6 HA~75 HA. As a preference, the Shore hardness of the first elastic part 2622A and the Shore hardness of the second elastic part 2622B may be 0.8 HA~65 HA. As a preference, the Shore hardness of the first elastic part 2622A and the Shore hardness of the second elastic part 2622B may be 1 HA~55 HA. As a preference, the Shore hardness of the first elastic part 2622A and the Shore hardness of the second elastic part 2622B may be 1 HA~50 HA. As a preference, the Shore hardness of the first elastic part 2622A and the Shore hardness of the second elastic part 2622B may be 1 HA~40 HA. As a preference, the Shore hardness of the first elastic part 2622A and the Shore hardness of the second elastic part 2622B may be 1 HA~30 HA. As a preference, the Shore hardness of the first elastic part 2622A and the Shore hardness of the second elastic part 2622B may be 1 HA~20 HA. As a preference, the Shore hardness of the first elastic part 2622A and the Shore hardness of the second elastic part 2622B may be 1 HA~10 HA.

In some embodiments, a thickness of the first elastic part 2622A in a vibration direction of the vibration assembly 220 may be 10 μm~300 μm. As a preference, the thickness of the first elastic part 2622A in the vibration direction of the vibration assembly 220 may be 30 μm~260 μm. As a preference, the thickness of the first elastic part 2622A in the vibration direction of the vibration assembly 220 may be 50 μm~240 μm. As a preference, the thickness of the first elastic part 2622A in the vibration direction of the vibration assembly 220 may be 50 μm~200 μm. As a preference, the thickness of the first elastic part 2622A in the vibration direction of the vibration assembly 220 may be 70 μm~160 μm. As a preference, the thickness of the first elastic part 2622A in the vibration direction of the vibration assembly 220 may be 90 μm~120 μm. As a preference, the thickness of the first elastic part 2622A in the vibration direction of the vibration assembly 220 may be 100 μm~110 μm.

In some embodiments, a length (i.e., a width from one side close to the mass element 221 to the other side away from the mass element 221) of the first elastic part 2622A in a direction perpendicular to the vibration direction of the mass element 221 may be 10 μm~300 μm. In some embodiments, the width of the first elastic part 2622A from one side close to the mass element 221 to the other side away from the mass element 221 may be 40 μm~240 μm. In some embodiments, the width of the first elastic part 2622A from one side close to the mass element 221 to the other side away from the mass element 221 may be 60 μm~180 μm. In some embodiments, the width of the first elastic part 2622A from one side close to the mass element 221 to the other side away from the mass element 221 may be 90 μm~120 μm. In some embodiments, the width of the first elastic part 2622A from one side close to the mass element 221 to the other side away from the mass element 221 may be 100 μm~110 μm. In some embodiments, a width of the second elastic part 2622B from one side close to the mass element 221 to the other side away from the mass element 221 may be 20 μm~280 μm. In some embodiments, the width of the second elastic part 2622B from one side close to the mass element 221 to the other side away from the mass element 221 may be 50 μm~240 μm. In some embodiments, the width of the second elastic part 2622B from one side close to the mass element 221 to the other side away from the mass element 221 may be 50 μm~220 μm. In some embodiments, the width of the second elastic part 2622B from one side close to the mass element 221 to the other side away from the mass element 221 may be 70 μm 160 μm. In some embodiments, the width of the second elastic part 2622B from one side close to the mass element 221 to the other side away from the mass element 221 may be 90 μm~120 μm. In some embodiments, the width of the second elastic part 2622B from one side close to the mass element 221 to the other side away from the mass element 221 may be 100 μm~110 μm.

In some embodiments, as shown in FIGS. 26-27, the buffer 240 may be disposed in the vibration sensor 2600, and the buffer 240 may be used to limit a vibration amplitude of the vibration assembly 220. In some embodiments, the buffer 240 may be disposed in the vibration sensor 2600. The buffer 240 may limit the vibration amplitude of the vibration assembly 220 by providing the vibration assembly 220 with a buffer distance in the vibration direction of the vibration assembly 220, thereby preventing the vibration assembly 220 from colliding with other components (e.g., the acoustic transducer 210 or the housing 230) of the vibration sensor 2600 in the vibration process, realizing protection of the vibration assembly 220, and improving the reliability of the vibration sensor 2600.

In some embodiments, as shown in FIG. 26, the structure and arrangement of the buffer in FIG. 26 is similar to that of the buffer in FIG. 24. In some embodiments, the buffer 240 may be disposed in the second acoustic cavity 260 and connected to the mass element 221 and/or the housing 230. In some embodiments, the buffer 240 may also be disposed in the first acoustic cavity 250 and connected to the mass element 221 and/or the substrate of the acoustic transducer 210. The buffer 240 may provide the vibration assembly 220 with the buffer distance in the vibration direction of the vibration assembly 220.

In some embodiments, as shown in FIG. 27, the structure and arrangement of the buffer 240 in FIG. 27 is similar to that of the buffer 240 in FIG. 25. In some embodiments, the buffer 240 may include the magnetic buffer 243. The magnetic buffer 243 may be used to generate a magnetic field. In some embodiments, when the buffer 240 includes the magnetic buffer 243, the mass element 221 may include a magnetic member or a magnetizable member, the mass element 221 may be located within the magnetic field generated by the magnetic buffer 243, and the mass element 221 may be subjected to the magnetic force of the magnetic field. In some embodiments, the magnetic field generated by the magnetic buffer 243 may adjust the force on the mass element 221, thereby limiting the vibration amplitude of the mass element 221. More descriptions regarding the magnetic buffer may be found in FIGS. 14A and 14B, and the related descriptions thereof.

In some embodiments, the structure and arrangement of the buffer 240 is similar to that of the buffer 240 in FIG. 3. The buffer 240 may include a first buffer part and a second buffer part, and the first buffer part and the second buffer part may be respectively disposed on both sides of the elastic element 2622 in the vibration direction of the vibration assembly 220. The first buffer part may be connected to the housing 230 or the first elastic part 2622A. The second buffer part may be connected to the acoustic transducer or the second elastic element 15222. In some embodiments, the first buffer part may provide the vibration assembly 220 with a first buffer distance in the vibration direction of the vibration assembly 220, and the second buffer part may provide the vibration assembly 220 with a second buffer distance in the vibration direction of the vibration assembly 220 distance.

In some embodiments, the structure and arrangement of the buffer 240 is similar to that of the buffer 240 in FIG. 4. The buffer 240 may be connected between the first elastic part 2622A and the acoustic transducer 210 (and/or the housing 230). The first buffer part and the second buffer part of the buffer 240 may be respectively disposed on both sides of the first elastic part 2622A in the vibration direction of the vibration assembly 220. Specifically, two ends of the first buffer part located in the second acoustic cavity 260 in the vibration direction of the vibration assembly 220 may be respectively connected to the housing 230 and the first elastic part 2622A. Two ends of the second buffer part located in the first acoustic cavity 250 in the vibration direction of the vibration assembly 220 may be respectively connected to the acoustic transducer 210 and the first elastic part 2622A.

Figure 28:
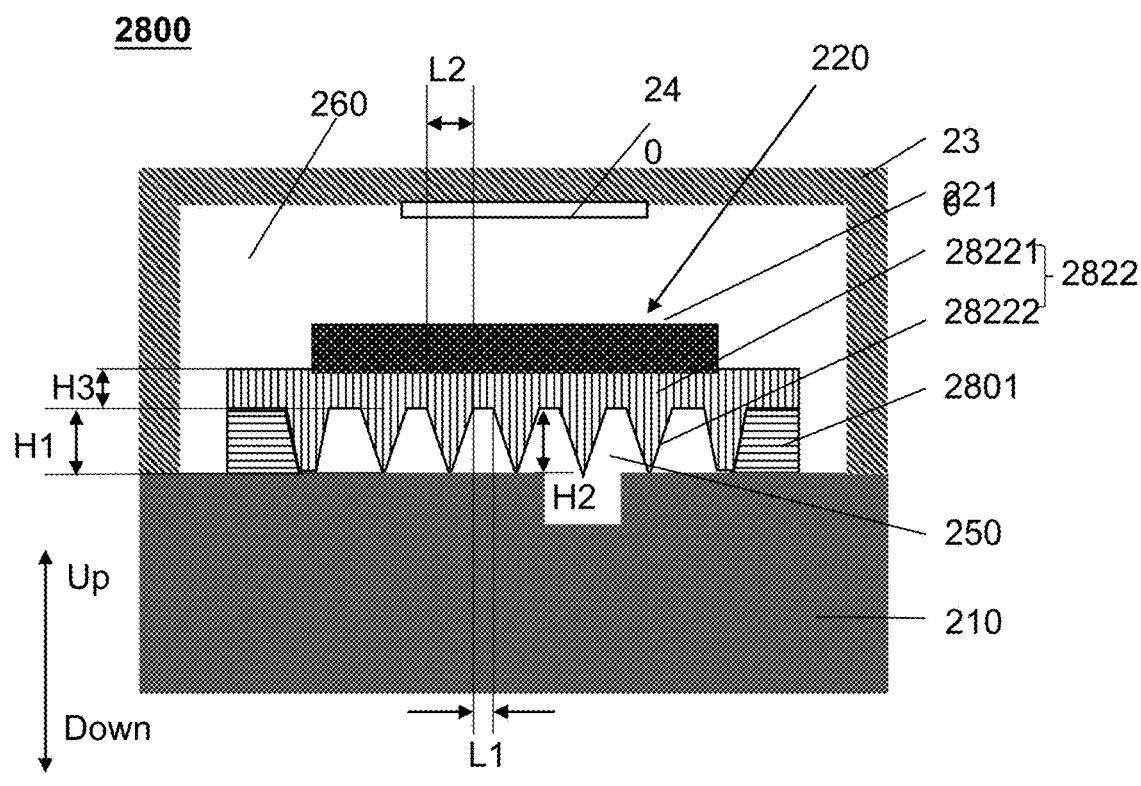
FIG. 28 is a structural diagram illustrating an exemplary vibration sensor according to some embodiments of the present disclosure.
Figure 29:
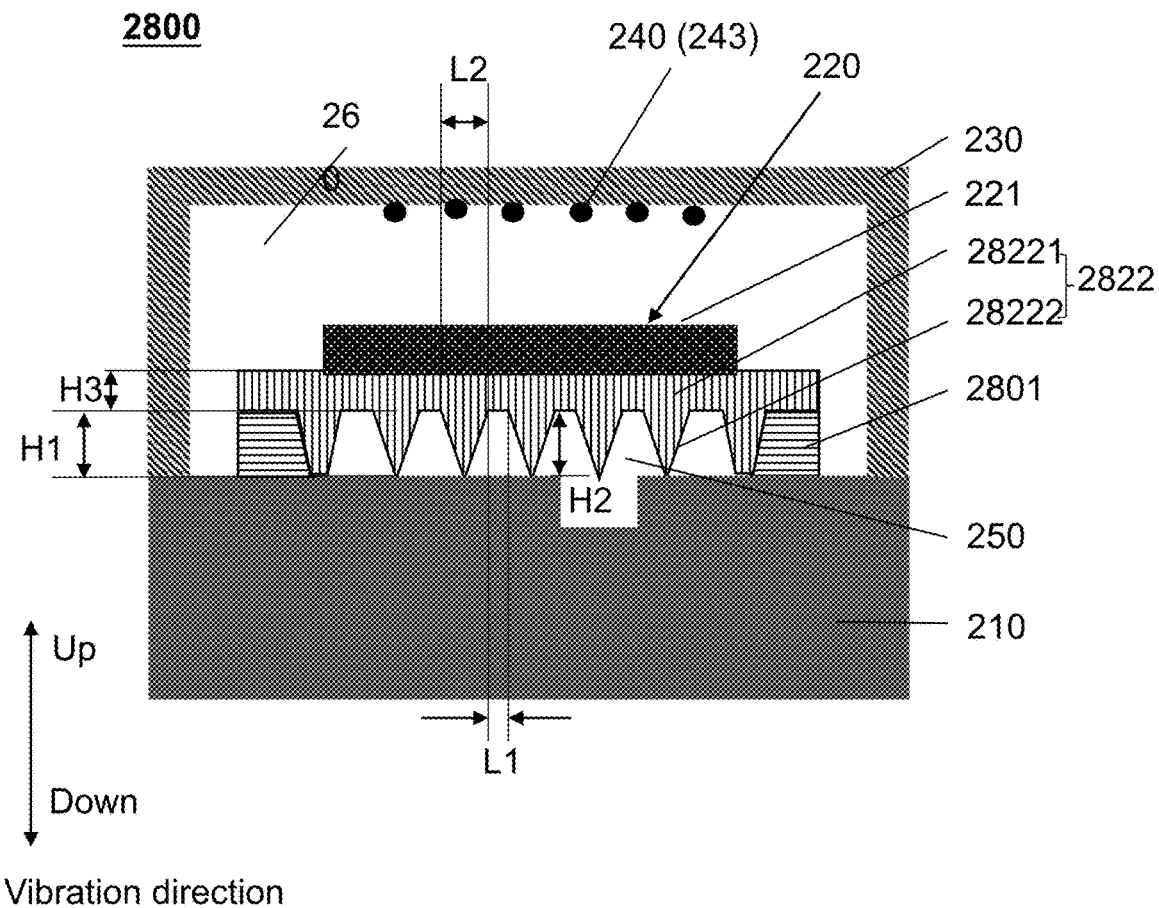
FIG. 29 is a structural diagram illustrating an exemplary vibration sensor according to some embodiments of the present disclosure.

FIG. 28 is a structural diagram illustrating an exemplary vibration sensor according to some embodiments of the present disclosure. FIG. 29 is a structural diagram illustrating an exemplary vibration sensor according to some embodiments of the present disclosure.

In some embodiments, an elastic element 2822 of the vibration assembly 220 shown in FIGS. 28-29 may be disposed opposite to the acoustic transducer 210, and the first acoustic cavity 250 may be formed between the elastic element 2822 and the acoustic transducer 210. In some embodiments, the elastic element 2822 may include an elastic membrane 28221, and a convex structure 28222 may be disposed on one side of the elastic membrane 28221 facing the first acoustic cavity 250. The convex structure 28222 and the elastic membrane 28221 may form the first acoustic cavity 250 together with the acoustic transducer 210. The elastic membrane 28221 may form a first sidewall of the first acoustic cavity 250, and a second sidewall of the first acoustic cavity 250 may be formed on an upper surface of the acoustic transducer 210 perpendicular to the vibration direction of the vibration assembly 220.

In some embodiments, an outer edge of the elastic membrane 28221 may be physically connected to the acoustic transducer 210. In some embodiments, a connection between a top end of the convex structure 28222 disposed on the periphery of the elastic membrane 28221 and a surface of the acoustic transducer 210 may be sealed by a sealing member 2801, so that the convex structure 28222, the elastic membrane 28221, the sealing member 2801, and the acoustic transducer 210 may together form the closed first acoustic cavity 250. It is understood that a position where the sealing member 2801 is disposed is not limited to the above descriptions. In some embodiments, the sealing member 2801 may not be limited to be disposed at the connection between the top end of the convex structure 28222 and the surface of the acoustic transducer 210, but may also be disposed on an outer side (i.e., a side of the convex structure 28222 away from the first acoustic cavity 250) of the convex structure 28222 for forming the first acoustic cavity 250. In some embodiments, in order to further improve the sealing performance, a sealing structure may also be disposed inside the first acoustic cavity 250. The connection between the elastic element 2822 and the acoustic transducer 210 may be sealed through the sealing member 2801, which may ensure the sealing performance of the entire first acoustic cavity 250, thereby effectively improving the reliability and stability of the vibration sensor 2800. In some embodiments, the sealing member 2801 may be made of a material such as silicone and rubber, so as to further improve the sealing performance of the sealing member 2801. In some embodiments, a type of the sealing member 2801 may include a sealing ring, a sealing gasket, a sealing strip, or any combination thereof.

In some embodiments, the convex structure 28222 may be disposed in at least a partial area of a side (i.e., a lower surface of the elastic membrane 28221) of the elastic membrane 28221 facing the first acoustic cavity 250. In some embodiments, the convex structure 28222 may be disposed in all areas of the side (i.e., the lower surface of the elastic membrane 28221) of the elastic membrane 28221 facing the first acoustic cavity 250. In some embodiments, a ratio of an area of the lower surface of the elastic membrane 28221 occupied by the convex structure 28222 to an area of the lower surface of the elastic membrane 28221 may be smaller than three-quarter. In some embodiments, the ratio of the area of the lower surface of the elastic membrane 28221 occupied by the convex structure 28222 to the area of the lower surface of the elastic membrane 28221 may be smaller than two-thirds. In some embodiments, the ratio of the area of the lower surface of the elastic membrane 28221 occupied by the convex structure 28222 to the area of the lower surface of the elastic membrane 28221 may be smaller than one-half. In some embodiments, the ratio of the area of the lower surface of the elastic membrane 28221 occupied by the convex structure 28222 to the area of the lower surface of the elastic membrane 28221 may be smaller than one-quarter. In some embodiments, the ratio of the area of the lower surface of the elastic membrane 28221 occupied by the convex structure 28222 to the area of the lower surface of the elastic membrane 28221 may be smaller than one-sixth.

In some embodiments, the convex structure 28222 may have certain elasticity. Since the convex structure 28222 has elasticity, the convex structure 28222 may produce elastic deformation when extruded by an external force. In some embodiments, the top end of the convex structure 28222 may abut against a sidewall (i.e., the second sidewall of the first acoustic cavity 250) of the first acoustic cavity 250 opposite to the elastic element 2822. In some embodiments, the top end refers to an end of the convex structure 28222 away from the elastic membrane 28221. When the convex structure 28222 abuts against the second sidewall of the first acoustic cavity 250, vibration of the elastic element 2822 may drive the convex structure 28222 to move. At this time, the convex structure 28222 and the second sidewall of the first acoustic cavity 250 may be extruded, so that the convex structure 28222 may produce elastic deformation. The elastic deformation may make the convex structure 28222 protrude further into the first acoustic cavity 250, thereby reducing a volume of the first acoustic cavity 250. Therefore, the volume change of the first acoustic cavity 250 may be further increased, thereby improving the sensitivity of the vibration sensor 2800.

In some embodiments, a volume of the first acoustic cavity 250 $V_0$ may be related to a density of the convex structures 28222 that forms the first acoustic cavity 250. It is understood that the smaller the interval between adjacent convex structures 28222, and the higher the density of the convex structure 28222, the smaller the volume $V_0$ of the first acoustic cavity 250 formed by the convex structure 28222. The interval between adjacent convex structures 28222 refers to a distance between centers of adjacent convex structures 28222. The center herein may be understood as a centroid on a cross section of the convex structure 28222. For the convenience of illustration, the interval between adjacent convex structures 28222 may be represented by L1 in FIG. 28, i.e., a distance between the top ends or centers of adjacent convex structures. In some embodiments, the interval L1 between adjacent convex structures 28222 may be in a range of 1 μm~2000 μm. In some embodiments, the interval L1 between adjacent convex structures 28222 may be in the range of 4 μm~1500 μm. In some embodiments, the interval L1 between adjacent convex structures 28222 may be in the range of 8 μm~1000 μm. In some embodiments, the interval L1 between adjacent convex structures 28222 may be in the range of 10 μm~500 μm.

In some embodiments, the volume $V_0$ of the first acoustic cavity 250 may be related to a width of the convex structure 28222. The width of the convex structure 28222 may be understood as a size of the convex structure 28222 in a direction perpendicular to the vibration direction of the mass element 221. For the convenience of illustration, the size of the convex structure 28222 in a direction perpendicular to the vibration direction of the mass element 221 may be represented by L2 in FIG. 28. In some embodiments, the width L2 of a single convex structure 28222 may be in a range of 1 μm~1000 μm. In some embodiments, the width L2 of a single convex structure 28222 may be in the range of 2 μm~800 μm. In some embodiments, the width L2 of a single convex structure 28222 may be in the range of 3 μm~600 μm. In some embodiments, the width L2 of a single convex structure 28222 may be in the range of 6 μm~400 μm. In some embodiments, the width of a single convex structure 28222 may be in the range of 10 μm~300 μm.

For vibration sensors 2800 of different types and/or sizes, a ratio of the width L2 of the convex structure 28222 to the interval L1 between adjacent convex structures 28222 may be within a certain range. In some embodiments, the ratio of the width L2 of the convex structure 28222 to the interval L1 between adjacent convex structures 28222 may be in the range of 0.05~20. In some embodiments, the ratio of the width L2 of the convex structure 28222 to the interval L1 between adjacent convex structures 28222 may be in the range of 0.1~20. In some embodiments, the ratio of the width L2 of the convex structure 28222 to the interval L1 between adjacent convex structures 28222 may be in the range of 0.1 In some embodiments, the ratio of the width L2 of the convex structure 28222 to the interval L1 between adjacent convex structures 28222 may be in the range of 0.5~8. In some embodiments, the ratio of the width L2 of the convex structure 28222 to the interval L1 between adjacent convex structures 28222 may be in the range of 1~6. In some embodiments, the ratio of the width L2 of the convex structure 28222 to the interval L1 between adjacent convex structures 28222 may be in the range of 2~4.

In some embodiments, the volume $V_0$ of the first acoustic cavity 250 may be related to a height H1 of the convex structure 28222. The height of the convex structure 28222 may be understood as a size of the convex structure 28222 in the vibration direction of the mass element 221 when the convex structure 28222 is in a natural state (e.g., when the convex structure 28222 may be not extruded and elastically deformed). For the convenience of illustration, the size of the convex structure 28222 in the vibration direction of the mass element 221 may be represented by H1 in FIG. 28. In some embodiments, the height H1 of the convex structure 28222 may be in a range of 1 μm~1000 μm. In some embodiments, the height H1 of the convex structure 28222 may be in the range of 2 μm~800 μm. In some embodiments, the height H1 of the convex structure 28222 may be in the range of 4 μm~600 μm. In some embodiments, the height H1 of the convex structure 28222 may be in the range of 6 μm~500 μm. In some embodiments, the height H1 of the convex structure 28222 may be in the range of 8 μm 400 μm. In some embodiments, the height H1 of the convex structure 28222 may be in the range of 10 μm~300 μm.

In some embodiments, a difference between a height of the first acoustic cavity 250 and the height of the convex structure 28222 may be within a certain range. For example, at least part of convex structure 28222 may not be in contact with the acoustic transducer 210. At this time, there may be a certain gap between the convex structure 28222 and the surface of the acoustic transducer 210. The gap between the convex structure 28222 and the surface of the acoustic transducer 210 refers to a distance between the top end of the convex structure 28222 and the surface of the acoustic transducer 210. The gap may be formed in a process of processing the convex structure 28222 or mounting the elastic element 2822. The height of the first acoustic cavity 250 may be understood as a size of the first acoustic cavity 250 in the vibration direction of the mass element 221 when the first acoustic cavity 250 is in a natural state (e.g., when the first sidewall and the second sidewall of the first acoustic cavity 250 may not vibrate or produce elastic deformation). For convenience of illustration, the size of the first acoustic cavity 250 in the vibration direction of the mass element 221 may be represented by H2 in FIG. 28. In some embodiments, a difference between the height H1 of the convex structure 28222 and the height H2 of the first acoustic cavity 250 may be within 20%. In some embodiments, the difference between the height H1 of the convex structure 28222 and the height H2 of the first acoustic cavity 250 may be within 15%. In some embodiments, the difference between the height H1 of the convex structure 28222 and the height H2 of the first acoustic cavity 250 may be within 10%. In some embodiments, the difference between the height H1 of the convex structure 28222 and the height H2 of the first acoustic cavity 250 may be within 5%. In some embodiments, the gap between the convex structures 28222 and the surface of the acoustic transducer 210 may be within 10 μm. In some embodiments, the gap between the convex structures 28222 and the surface of the acoustic transducer 210 may be within 5 μm. In some embodiments, the gap between the convex structures 28222 and the surface of the acoustic transducer 210 may be within 1 μm.

When the vibration sensor 2800 works, the elastic element 2822 may generate vibration or elastic deformation after receiving an external signal (e.g., a vibration signal) and drive the convex structure 28222 to move in the vibration direction of the mass element 221, so that the first acoustic cavity 250 may shrink or expand, and a resulting volume change of the first acoustic cavity 250 may be expressed as ΔV1. Since motion amplitudes of the elastic element 2822 and the convex structure 28222 in the vibration direction of the mass element 221 is relatively small, for example, the motion range of the convex structure 28222 in the vibration direction of the mass element 221 may be usually smaller than 1 μm, in the process, the convex structure 28222 may not be in contact with the surface of the acoustic transducer 210. Therefore, ΔV1 may be not related to the convex structure 28222 and have a relatively small value.

For the vibration sensors 2800 of different types and/or sizes, a ratio or a difference between the height H1 of the convex structure 28222 and a thickness (the thickness of the elastic membrane 28221 may be represented by H3 in FIG. 28) of the elastic membrane 28221 may be within a certain range. In some embodiments, the ratio of the height H1 of the convex structure 28222 to the thickness H3 of the elastic membrane 28221 may be in the range of 0.5~500. In some embodiments, the ratio of the height H1 of the convex structure 28222 to the thickness H3 of the elastic membrane 28221 may be in the range of 1~500. In some embodiments, the ratio of the height H1 of the convex structure 28222 to the thickness H3 of the elastic membrane 28221 may be in the range of 1~200. In some embodiments, the ratio of the height H1 of the convex structure 28222 to the thickness H3 of the elastic membrane 28221 may be in the range of 1~100. In some embodiments, the ratio of the height H1 of the convex structure 28222 to the thickness H3 of the elastic membrane 28221 may be in the range of 10~90. In some embodiments, the ratio of the height H1 of the convex structure 28222 to the thickness H3 of the elastic membrane 28221 may be in the range of 20~80. In some embodiments, the ratio of the height H1 of the convex structure 28222 to the thickness H3 of the elastic membrane 28221 may be in the range of 40~60.

For the vibration sensors 2800 of different types and/or sizes, a ratio of a projected area of the mass element 221 in the vibration direction of the mass element 221 to a projected area of the first acoustic cavity 250 in the vibration direction of the mass element 221 may be within a certain range. In some embodiments, the ratio of the projected area of the mass element 221 in the vibration direction of the mass element 221 to the projected area of the first acoustic cavity 250 in the vibration direction of the mass element 221 may be in the range of 0.05~0.95. In some embodiments, the ratio of the projected area of the mass element 221 in the vibration direction of the mass element 221 to the projected area of the first acoustic cavity 250 in the vibration direction of the mass element 221 may be in the range of 0.2~0.9. In some embodiments, the ratio of the projected area of the mass element 221 in the vibration direction of the mass element 221 to the projected area of the first acoustic cavity 250 in the vibration direction of the mass element 221 may be in the range of 0.4~0.7. In some embodiments, the ratio of the projected area of the mass element 221 in the vibration direction of the mass element 221 to the projected area of the first acoustic cavity 250 in the vibration direction of the mass element 221 may be in the range of 0.5~0.6.

In some embodiments, as shown in FIG. 28, the buffer 240 may be disposed in the second acoustic cavity 260, and the buffer 240 may be connected to the mass element 221 and/or the housing 230. The buffer 240 may provide the vibration assembly 220 with a buffer distance in the vibration direction of the vibration assembly 220. Taking the buffer 240 disposed in the second acoustic cavity 260 and connected to a sidewall of the housing 230 facing the mass element 221 in the vibration direction of the vibration assembly 220 as an example, the buffer distance provided by the buffer 240 for the vibration assembly 240 may be a distance between a lower surface of the buffer 240 in the vibration direction of the vibration assembly 220 and an upper surface of the mass element 221. In some embodiments, when the vibration sensor 2800 works, the vibration assembly 220 may extrude the buffer 240 when vibrating to a certain amplitude (e.g., when the mass element 221 is in contact with the buffer member 240), thereby limiting the vibration amplitude of the mass element 221, preventing the mass element 221 from colliding with the housing 230, and improving the reliability of the vibration sensor 2800.

In some embodiments, as shown in FIG. 28, since the convex structure 28222 of the elastic element 2822 abuts against the sidewall (e.g., the substrate of the acoustic transducer 210) of the first acoustic cavity 250 opposite to the elastic element 2822, the convex structure 28222 may have elasticity, and when the vibration assembly 220 vibrates, the convex structure 28222 may produce elastic deformation under the action of the vibration assembly 220. In the process of the convex structure 28222 producing the elastic deformation, the vibration amplitude of the vibration assembly 220 may be limited, which may prevent the elastic membrane 28221 from colliding with the acoustic transducer 210 due to an excessive vibration amplitude, thereby improving the reliability of the vibration sensor 2800.

In some embodiments, the buffer 240 may be disposed in the second acoustic cavity 260, and the buffer 240 may also be connected between the vibration assembly 220 and the housing 230. In some embodiments, two ends of the buffer 240 in the vibration direction of the vibration assembly 220 may be respectively connected to the housing 230 and the elastic membrane 28221 of the elastic element 2822. In some embodiments, the two ends of the buffer 240 in the vibration direction of the vibration assembly 220 may be respectively connected to the housing 230 and the mass element 221. In some embodiments, there may be a plurality of buffers 240, and two ends of each of the plurality of buffers 240 in the vibration direction of the vibration assembly 220 may be respectively connected to the housing 230 and the vibration assembly 220. In some embodiments, when the buffer 240 is connected between the vibration assembly 220 and the housing 230, the buffer 240 may provide the vibration assembly 220 with the buffer distance in the vibration direction of the vibration assembly 220. The buffer distance may be a difference distance between a natural length of the buffer 240 and a length of the buffer 240 when a maximum deformation occurs.

In some embodiments, as shown in FIG. 29, the buffer 240 may include the magnetic buffer 243. The magnetic buffer 243 may be used to generate a magnetic field. In some embodiments, the magnetic buffer 243 (e.g., a coil) may be mounted on a sidewall (e.g., a sidewall of the housing 230 facing the mass element 221 in the vibration direction of the vibration assembly 220) of the second acoustic cavity 260. In some embodiments, the magnetic buffer 243 (e.g., the coil) may also be embedded in the sidewall (e.g., the sidewall of the housing 230 facing the mass element 221 in the vibration direction of the vibration assembly 220) of the second acoustic cavity 260. In some embodiments, the magnetic buffer 243 (e.g., the coil) may also be embedded in the substrate of the acoustic transducer 210. In some embodiments, when the buffer 240 includes the magnetic buffer 243, the mass element 221 may include a magnetic member or a magnetizable member, the mass element 221 may be located within the magnetic field generated by the magnetic buffer 243, and the mass element 221 may be subjected to the magnetic force of the magnetic field. In some embodiments, the magnetic field generated by the magnetic buffer 243 may adjust the force on the mass element 221, thereby limiting the vibration amplitude of the mass element 221. More descriptions regarding the magnetic buffer may be found in FIGS. 14A and 14B and the related descriptions thereof.

Figure 30:
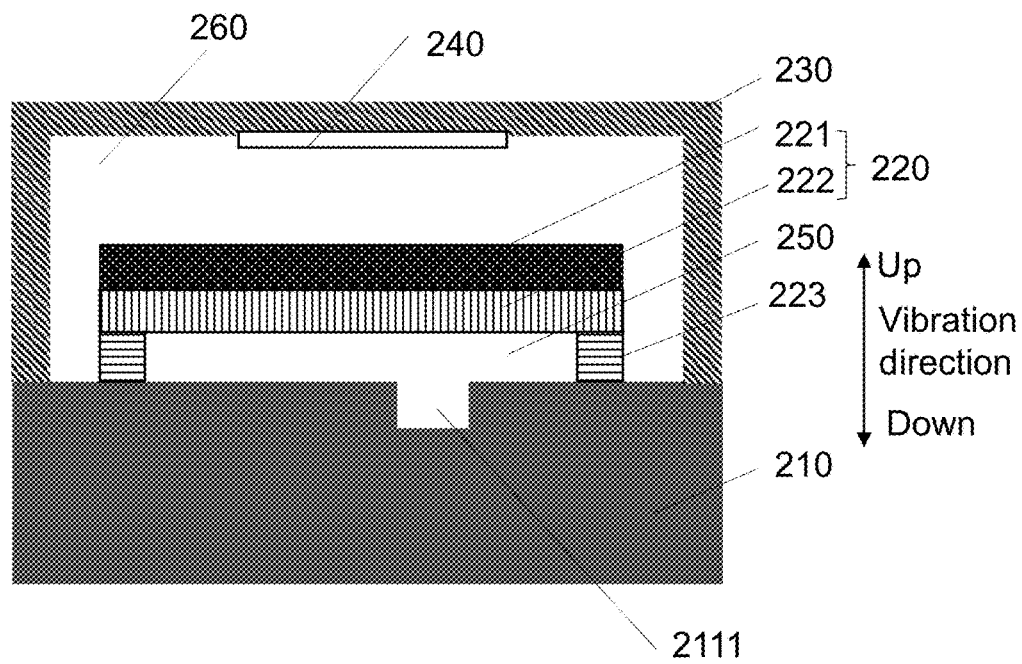
FIG. 30 is a structural diagram illustrating an exemplary vibration sensor according to some embodiments of the present disclosure.
Figure 31:
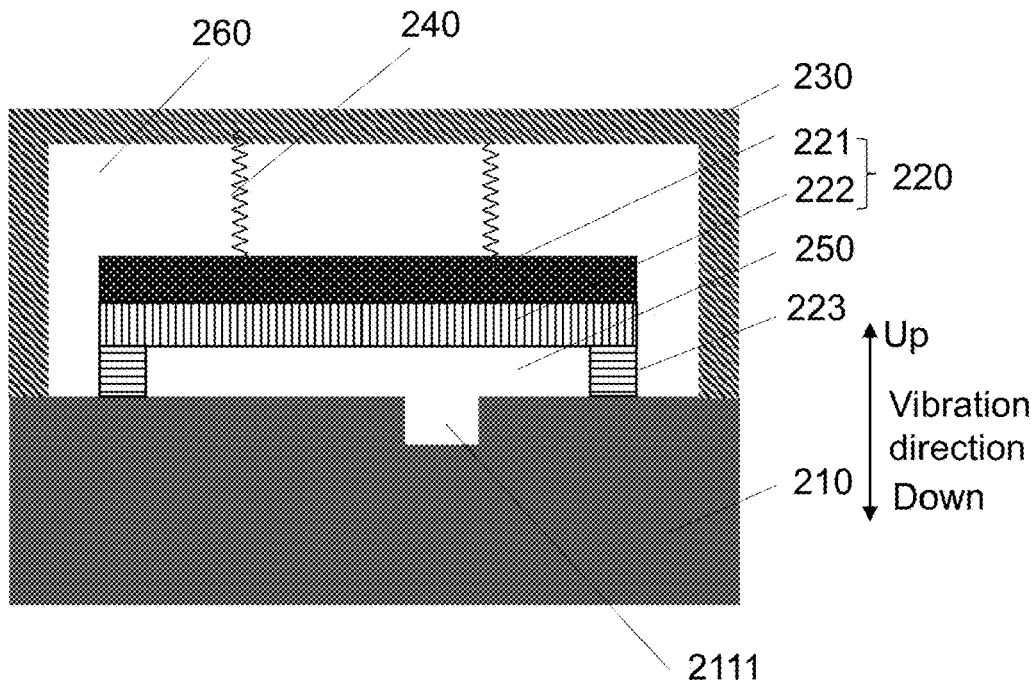
FIG. 31 is a structural diagram illustrating an exemplary vibration sensor according to some embodiments of the present disclosure.
Figure 32:
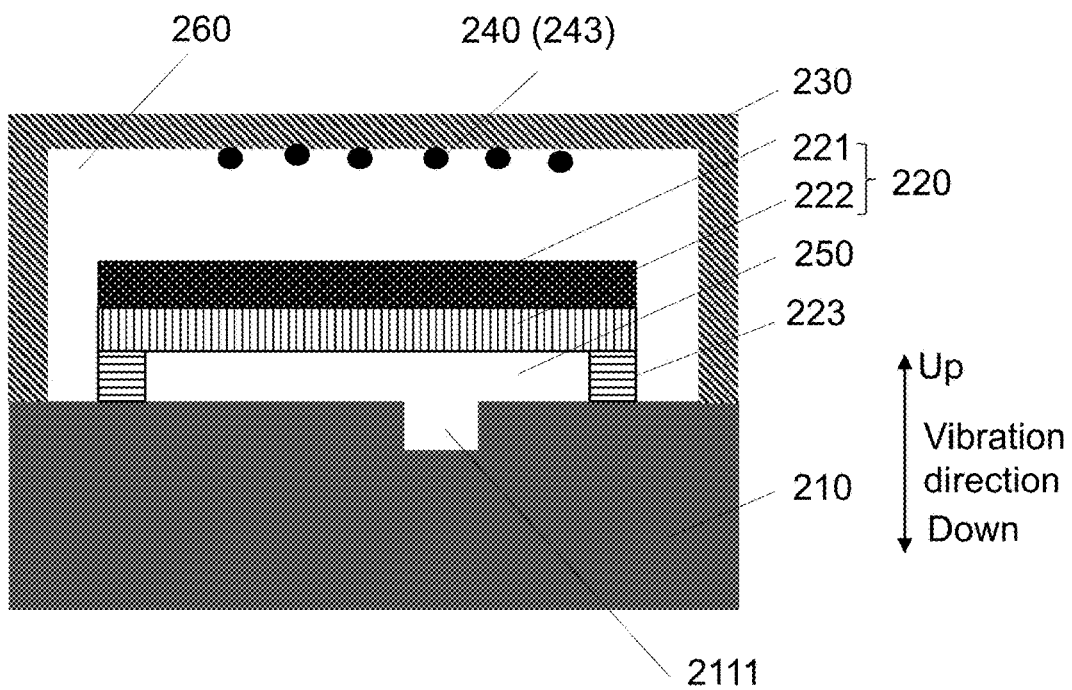
FIG. 32 is a structural diagram illustrating an exemplary vibration sensor according to some embodiments of the present disclosure.

FIG. 30 is a structural diagram illustrating a n exemplary vibration sensor according to some embodiments of the present disclosure. FIG. 31 is a structural diagram illustrating a n exemplary vibration sensor according to some embodiments of the present disclosure. FIG. 32 is a structural diagram illustrating a n exemplary vibration sensor according to some embodiments of the present disclosure.

In some embodiments, the structure of the vibration sensor 3000 shown in FIGS. 30-32 is similar to that of the vibration sensor 200 shown in FIGS. 2-4, and the difference lies in a vibration assembly. In some embodiments, the vibration assembly 220 of the vibration sensor 3000 may include the mass element 221, the elastic element 222, and the support element 223. The mass element 221 and the support element 223 may be physically connected to both sides of the elastic element 222, respectively. For example, the mass element 221 and the support element 223 may be respectively connected to an upper surface and a lower surface of the elastic element 222. The support element 223 may be physically connected to the acoustic transducer 210, for example, an upper end of the support element 223 may be connected to the lower surface of the elastic element 222, and a lower end of the support element 223 may be connected to the acoustic transducer 210. The support element 223, the elastic member 222, and the acoustic transducer 210 may form the first acoustic cavity 250. In some embodiments, when the vibration assembly 220 responds to a vibration signal of the housing 230, the mass element 221 may compress an area where the elastic element 222 is in contact with the support element 223 in the vibration process, and the compression deformation of the elastic element 222 may change a volume of the first acoustic cavity 250, so that the acoustic transducer 210 may generate an electrical signal based on the volume change of the first acoustic cavity 250.

In some embodiments, an area of a cross-section of the mass element 221 perpendicular to a vibration direction of the vibration assembly 220 may be greater than an area of a cross-section of the first acoustic cavity 250 perpendicular to the vibration direction of the vibration assembly 220. In some embodiments, an area of a cross-section of the elastic element 222 perpendicular to the vibration direction of the vibration assembly 220 may be greater than an area of a cross-section of the first acoustic cavity 250 perpendicular to the vibration direction of the vibration assembly 220.

In some embodiments, the area of the cross-section of the mass element 221 perpendicular to the vibration direction of the vibration assembly 220 may be greater than the area of the cross-section of the first acoustic cavity 250 perpendicular to the vibration direction of the vibration assembly 220, which may be understood as that the mass element 221 completely covers an upper end opening of the first acoustic cavity 250. In some embodiments, the area of the cross-section of the mass element 221 perpendicular to the direction of the vibration direction of the vibration assembly 220 may be greater than the area of the cross-section of the first acoustic cavity 250 perpendicular to the vibration direction of the vibration assembly 220, which may be understood as that the mass element 221 completely covers an upper end opening of the first acoustic cavity 250. Through the design of the area of the cross-section of the mass element 221 perpendicular to the vibration direction of the vibration assembly 220 and the area of the cross-section of the elastic element 222 perpendicular to the vibration direction of the vibration assembly 220, so that an area where the vibration assembly 220 is deformed may be an area where the elastic element 222 is in contact with the support element 223.

It should be noted that when the area of the cross-section of the first acoustic cavity 250 perpendicular to the vibration direction of the vibration assembly 220 changes with different heights, the area of the cross-section of the first acoustic cavity 250 in the direction perpendicular to the vibration direction of the vibration assembly 220 described in the present disclosure refers to an cross-sectional area of a sidewall of the first acoustic cavity 250 close to the elastic element 222 perpendicular to the vibration direction of the vibration assembly 220.

In some embodiments, when the mass element 221 vibrates, the compression deformation may merely occur in the area where the elastic element 222 is in contact with the support element 223, and a contact portion between the elastic element 222 and the support element 223 may be equivalent to a spring, and the sensitivity of the vibration sensor 3000 may be increased by disposing the support element 223.

In some embodiments, the first acoustic cavity 250 may be directly in communication with the sound inlet hole 2111 of the acoustic transducer 210 to form an acoustic connection between the first acoustic cavity 250 and the acoustic transducer 210.

In some embodiments, the support element 223 may be a rigid material (e.g., metal or plastic) to support the elastic element 222 and the mass element 221. The support element 223 may be set as a rigid material, the rigid support element 223 may cooperate with the elastic element 222 and the mass element 221 to change the volume of the first acoustic cavity 250, and an acoustic cavity of a smaller thickness may be processed since the rigid support element 223 is easy to process, so that it is more convenient to precisely limit the height of the first acoustic cavity 250 (e.g., make the height of the first acoustic cavity 250 smaller), thereby improving the sensitivity of the vibration sensor 3300.

In some embodiments, the thickness of the support element 223 may be a distance between a lower surface and an upper surface of the support element 223. In some embodiments, the thickness of the support element 223 may be greater than a first thickness threshold (e.g., 1 um). In some embodiments, the thickness of the support element 223 may be smaller than a second thickness threshold (e.g., 1000 um). For example, the thickness of the support element 223 may be 1 um~1000 um. As another example, the thickness of the support element 223 may be 5 um~600 um. As yet another example, the thickness of the support element 223 may be 10 um~200 um.

In some embodiments, the height of the first acoustic cavity 250 may be equal to the thickness of the support element 223. In other embodiments, the height of the first acoustic cavity 250 may be smaller than the thickness of the support element 223.

In some embodiments, the support element 223 may include a ring structure. When the support element 223 includes the ring structure, the first acoustic cavity 250 may be located in a hollow portion of the ring structure, and the elastic element 222 may be disposed above the ring structure and close the hollow portion of the ring structure to form the first acoustic cavity 250.

It is understood that the ring structure may include a circular ring structure, a triangular ring structure, a rectangular ring structure, a hexagonal ring structure, an irregular ring structure, etc. In the present disclosure, the ring structure may include an inner edge and an outer edge surrounding the inner edge. A shape of the inner edge of the ring structure may be the same as a shape of the outer edge of the ring structure. For example, the inner edge and the outer edge of the ring structure may be circular, and the ring structure at this time may be a circular ring structure. As another example, the inner edge and the outer edge of the ring structure may be hexagonal, and the ring structure at this time may be a hexagonal ring structure. The shape of the inner edge of the ring structure may be different from the shape of the outer edge of the ring structure. For example, the inner edge of the ring structure may be circular, and the outer edge of the ring structure may be rectangular.

In some embodiments, the outer edge of the mass element 221 and the outer edge of the elastic element 222 may both be located on the support element 223. Merely by way of example, when the support element 223 includes the ring structure, the outer edge of the mass element 221 and the outer edge of the elastic element 222 may both be located on an upper surface of the ring structure, or the outer edge of the mass element 221 and the outer edge of the elastic element 222 may be flush with an outer ring of the ring structure. In some embodiments, the outer edge of the mass element 221 and the outer edge of the elastic element 222 may both be located outside the support element 223. For example, when the support element 223 includes the ring structure, the outer edge of the mass element 221 and the outer edge of the elastic element 222 may both be located outside the outer ring of the ring structure.

In some embodiments, a difference between an inner diameter and an outer diameter of the ring structure may be greater than a first difference threshold (e.g., 1 um). In some embodiments, the difference between the inner diameter and the outer diameter of the ring structure may be smaller than a second difference threshold (e.g., 300 um). For example, the difference between the inner diameter and the outer diameter of the ring structure may be 1 um~300 um. As another example, the difference between the inner diameter and the outer diameter of the ring structure may be 5 um~200 um. As yet another example, the difference between the inner diameter and the outer diameter of the ring structure may be 10 um~100 um. The difference between the inner diameter and the outer diameter of the ring structure may be limited, which may limit an area of the area where the elastic element 222 is in contact with the support element 223, so the difference between the inner diameter and the outer diameter of the ring structure may be limited within the above range, which can improve the sensitivity of the vibration sensor 3000.

In some embodiments, as shown in FIG. 30, the buffer 240 may be disposed in the second acoustic cavity 260, and the buffer 240 may be connected to the mass element 221 and/or the housing 230. The buffer 240 may provide the vibration assembly 220 with a buffer distance in the vibration direction of the vibration assembly 220. In some embodiments, the buffer 240 may be disposed in the second acoustic cavity 260 and connected to the sidewall of the housing 230 facing the mass element 221 in the vibration direction of the vibration assembly 220. The buffer distance provided by the buffer 240 for the vibration assembly may be a distance between a lower surface of the buffer 240 in the vibration direction of the vibration assembly 220 and an upper surface of the mass element 221. In some embodiments, when the vibration sensor 3000 works, the vibration assembly 220 may extrude the buffer 240 when vibrating to a certain amplitude (e.g., when the mass element 221 is in contact with the buffer 240), thereby limiting the vibration amplitude of the mass element 221, thereby preventing the mass element 221 from colliding with the housing 230 and improving the reliability of the vibration sensor 3000.

In some embodiments, as shown in FIG. 31, the buffer 240 may be disposed in the second acoustic cavity 260, and the buffer 240 may be connected between the vibration assembly 220 and the housing 230. In some embodiments, two ends of the buffer 240 in the vibration direction of the vibration assembly 220 may be respectively connected to the housing 230 and the mass element 221. In some embodiments, there may be a plurality of buffers 240. and the two ends of each of the plurality of buffers 240 in the vibration direction of the vibration assembly 220 may be respectively connected to the housing 230 and the vibration assembly 220. In some embodiments, when the buffer 240 is connected between the vibration assembly 220 and the housing 230, the buffer 240 may provide the vibration assembly 220 with the buffer distance in the vibration direction of the vibration assembly 220. The buffer distance may be a difference distance between a natural length of the buffer 240 and a length of the buffer 240 when a maximum deformation occurs.

In some embodiments, as shown in FIG. 32, the buffer 240 may include the magnetic buffer 243. The magnetic buffer 24 may be used to generate a magnetic field. In some embodiments, the magnetic buffer 243 (e.g., a coil) may be mounted on a sidewall (e.g., a sidewall of the housing 230 facing the mass element 221 in the vibration direction of the vibration assembly 220) of the second acoustic cavity 260. In some embodiments, the magnetic buffer 243 (e.g., the coil) may also be embedded in the sidewall (e.g., the sidewall of the housing 230 facing the mass element 221 in the vibration direction of the vibration assembly 220) of the second acoustic cavity 260. In some embodiments, the magnetic buffer 243 (e.g., the coil) may also be embedded in the substrate of the acoustic transducer 210. In some embodiments, when the buffer 240 includes the magnetic buffer 243, the mass element 221 may include a magnetic member or a magnetizable member, the mass element 221 may be located within the magnetic field generated by the magnetic buffer 243, and the mass element 221 may be subjected to the magnetic force of the magnetic field. In some embodiments, the magnetic field generated by the magnetic buffer 243 may adjust the force on the mass element 221, thereby limiting the vibration amplitude of the mass element 221. More descriptions regarding the magnetic buffer may be found in FIGS. 14A and 14B, and the related descriptions thereof.

Figure 33:
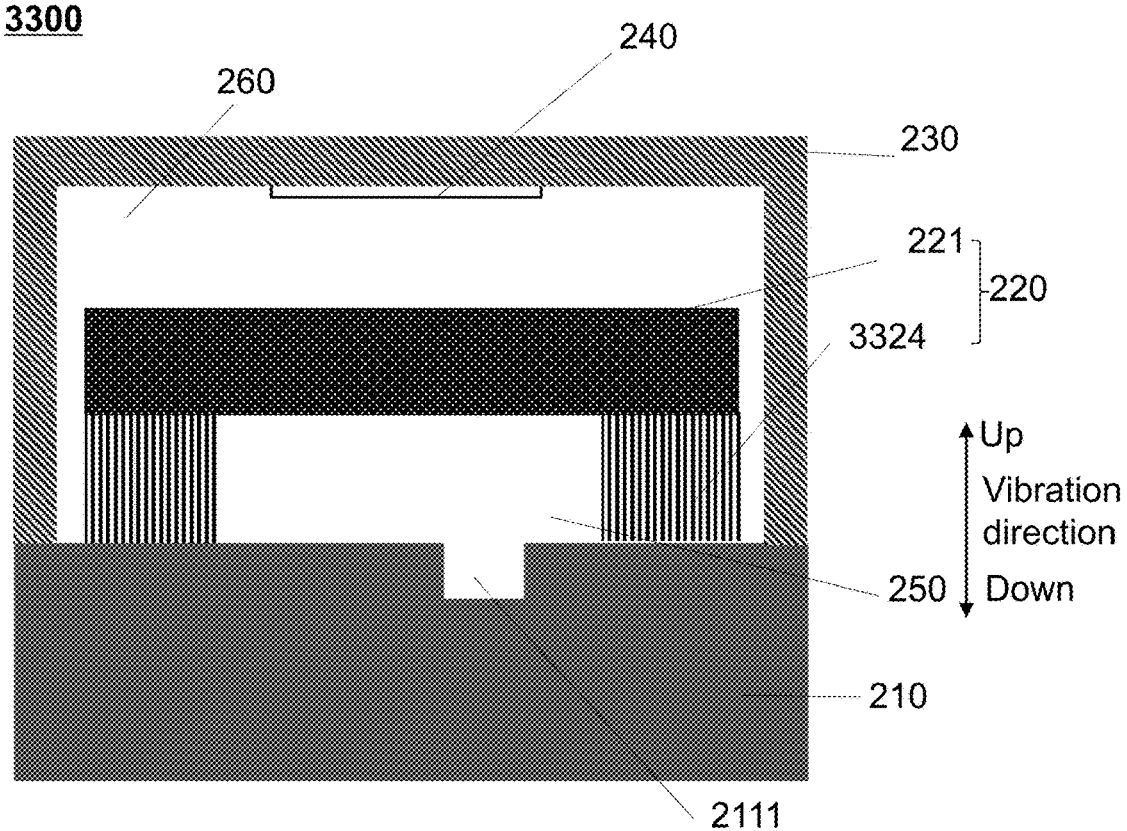
FIG. 33 is a structural diagram illustrating an exemplary vibration sensor according to some embodiments of the present disclosure.
Figure 34:
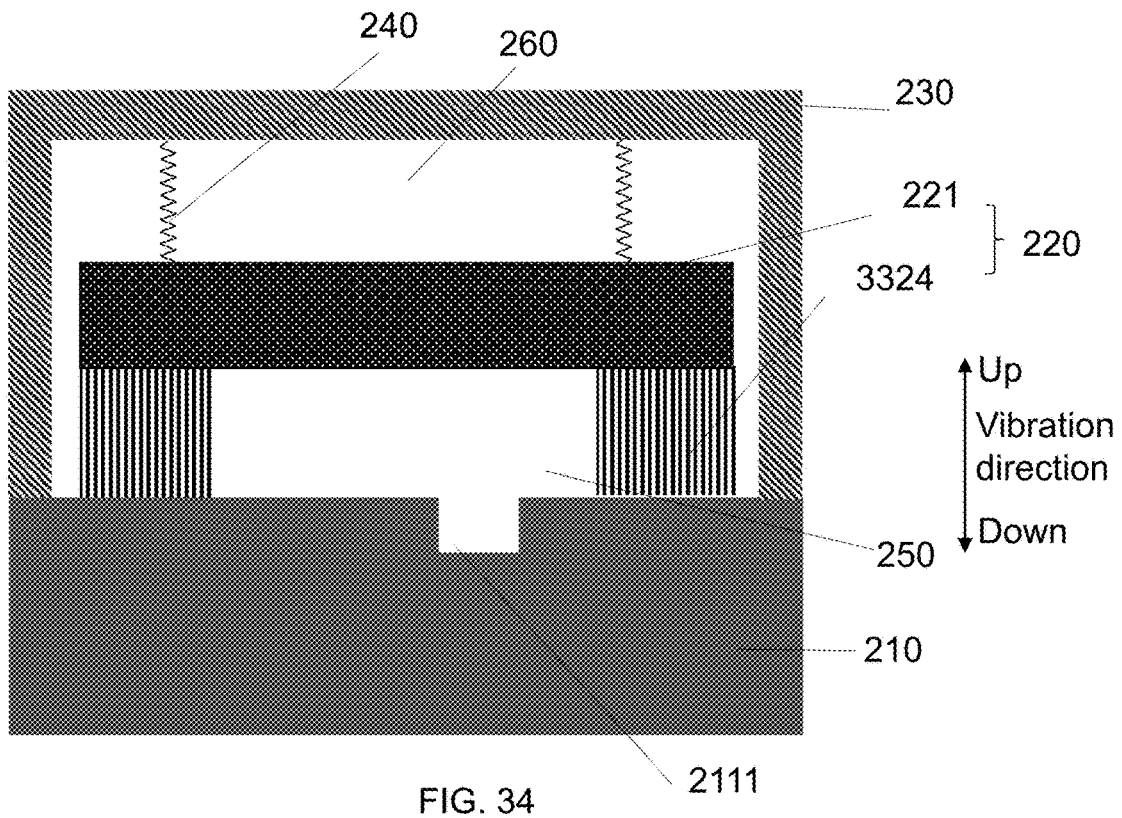
FIG. 34 is a structural diagram illustrating an exemplary vibration sensor according to some embodiments of the present disclosure.
Figure 35:
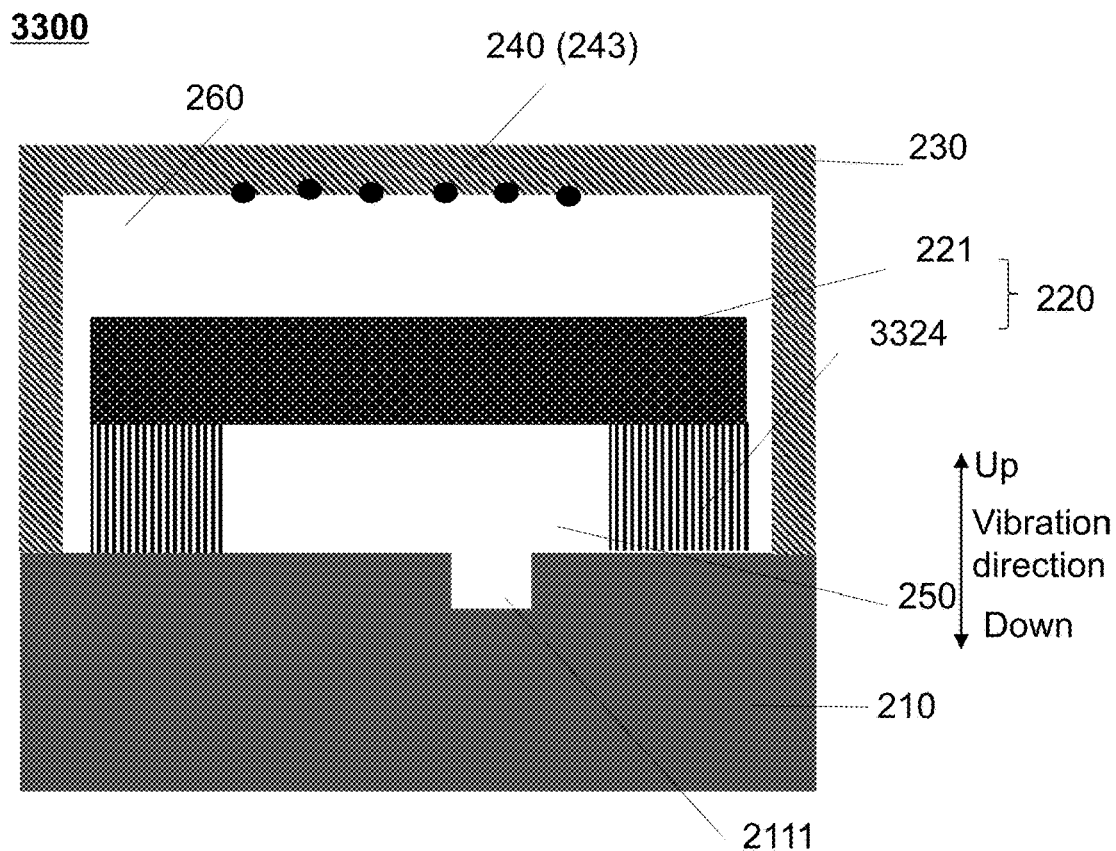
FIG. 35 is a structural diagram illustrating an exemplary vibration sensor according to some embodiments of the present disclosure.

FIG. 33 is an exemplary structural diagram illustrating a vibration sensor according to some embodiments of the present disclosure. FIG. 34 is an exemplary structural diagram illustrating a vibration sensor according to some embodiments of the present disclosure. FIG. 35 is a structural diagram illustrating a n exemplary vibration sensor according to some embodiments of the present disclosure.

The vibration sensor 3300 shown in FIGS. 33-35 is similar to the vibration sensor 3000 shown in FIG. 30, and the difference lies in an elastic element and a support element. In some embodiments, the vibration sensor 3300 may replace a structure of the support element 223 and the elastic element 222 of the vibration sensor 3000 with an elastic support element 3324, i.e., the vibration assembly 220 of the vibration sensor 3300 may include the mass element 221 and the elastic support element 3324. In some embodiments, the elastic support element 3324 may be a material with certain elasticity. For example, the material may be a polymer elastic material such as polytetrafluoroethylene or polydimethylsiloxane. In some embodiments, as shown in FIG. 33 and FIG. 30, a thickness of the support element 223 may be smaller than a thickness of the elastic support element 3324, so that a size of the first acoustic cavity 250 of the vibration sensor 3000 may be smaller, and the vibration sensor 3000 may have a greater sensitivity. Taking the ring-shaped support element 223 and the ring-shaped elastic support element 3324 as an example, since a processing difficulty of the support element 223 is relatively low, an area of a cross-section of the support element 223 perpendicular to a vibration direction of the vibration assembly 220 may be made smaller than an area of a cross-section of the elastic support element 3324 perpendicular to the vibration direction of the vibration assembly 220, so that an area where the compression deformation occurs may be smaller, and an equivalent stiffness of the vibration assembly 220 of the vibration sensor 3000 may be smaller. The smaller equivalent stiffness may mean a smaller resonance frequency.

In some embodiments, as show in FIG. 33, the vibration sensor 3300 may further include the buffer 240. The structure and arrangement of the buffer 240 is similar to that of the buffer 240 in FIG. 30. In some embodiments, the buffer 240 may be disposed in the second acoustic cavity 260, and the buffer 240 may be connected to the mass element 221 and/or the housing 230. The buffer 240 may provide the vibration assembly 220 with a buffer distance in the vibration direction of the vibration assembly 220. In some embodiments, when the vibration sensor 3300 works, the vibration assembly 220 may extrude the buffer 240 when vibrating to a certain amplitude (i.e., when the mass element 221 is in contact with the buffer 240), thereby limiting the vibration amplitude of the mass element 221, and preventing the mass element 221 from colliding with the housing 230, and improving the reliability of the vibration sensor 3000.

In some embodiments, since the elastic support element 3324 has a certain elasticity, when the vibration assembly 220 vibrates, the elastic support element 3324 may produce elastic deformation under the action of the vibration assembly 220. In the process of the elastic support element 3324 producing the elastic deformation, the vibration amplitude of the mass element 221 may be limited, which can prevent the mass element 221 from colliding with the acoustic transducer 210 due to an excessive vibration amplitude, thereby improving the reliability of the vibration sensor 3300.

In some embodiments, as shown in FIG. 34, the structure and arrangement of the buffer 240 is similar to that of the buffer 240 in FIG. 31. The buffer 240 may be disposed in the second acoustic cavity 260, and the buffer 240 may be connected between the vibration assembly 220 and the housing 230. In some embodiments, two ends of the buffer 240 in the vibration direction of the vibration assembly 220 may be respectively connected to the housing 230 and the mass element 221. In some embodiments, there may a plurality of buffers 240, and two ends of each of the plurality of buffers 240 in the vibration direction of the vibration assembly 220 may be respectively connected to the housing 230 and the vibration assembly 220. In some embodiments, when the buffer 240 is connected between the vibration assembly 220 and the housing 230, the buffer 240 may provide the vibration assembly 220 with the buffer distance in the vibration direction of the vibration assembly 220.

In some embodiments, as shown in FIG. 35, the structure and arrangement of the buffer 240 is similar to that of the buffer 240 in FIG. 32. The buffer 240 may include the magnetic buffer 243. The magnetic buffer 243 may be used to generate a magnetic field. In some embodiments, the magnetic buffer 243 (e.g., a coil) may be mounted on a sidewall of the second acoustic cavity 260, or embedded in the sidewall of the second acoustic cavity 260. The sidewall may be the sidewall of the housing 230 facing the mass element 221 in the vibration direction of the vibration assembly 220. In some embodiments, the magnetic buffer 243 (e.g., the coil) may also be embedded in the substrate of the acoustic transducer 210. In some embodiments, when the buffer 240 includes the magnetic buffer 243, the mass element 221 may include a magnetic member or a magnetizable member, the mass element 221 may be located within the magnetic field generated by the magnetic buffer 243, and the mass element 221 may be subjected to the magnetic force of the magnetic field. In some embodiments, the magnetic field generated by the magnetic buffer 243 may adjust the force on the mass element 221, thereby limiting the vibration amplitude of the mass element 221.

Figure 36:
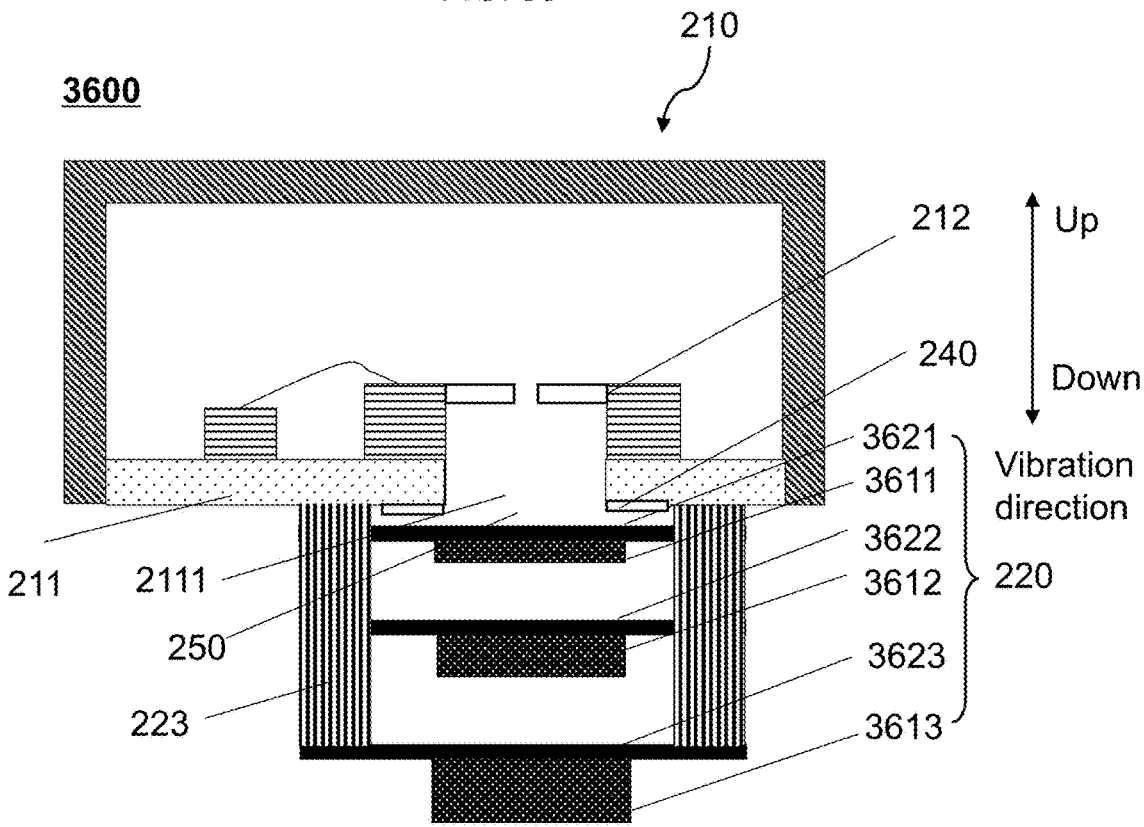
FIG. 36 is a structural diagram illustrating an exemplary vibration sensor according to some embodiments of the present disclosure.

FIG. 36 is a structural diagram illustrating a n exemplary vibration sensor according to some embodiments of the present disclosure.

The vibration sensor 3600 shown in FIG. 36 is similar to the vibration sensor 1100 shown in FIG. 11, and the difference lies in a vibration assembly. In some embodiments, the vibration assembly 220 of vibration sensor 3600 may include one or more groups of elastic elements and mass elements. In some embodiments, the elastic element may be a diaphragm, and the mass element may be a mass block, i.e., the vibration assembly 220 of the vibration sensor 3600 may include one or more groups of diaphragms and mass blocks. One or more groups of elastic elements may include a first elastic element 3621 (i.e., a first diaphragm), a second elastic element 3622 (i.e. a second diaphragm), and a third elastic element 3623 (i.e., a third diaphragm) disposed in sequence in the vibration direction of the vibration assembly 220. One or more groups of mass elements may include a first mass element 3611 (i.e., a first mass block), a second mass element 3612 (i.e., a second mass block), and a third mass element 3613 (i.e., a third mass block) disposed in sequence in the vibration direction of the vibration assembly 220. The first elastic element 3621 may be connected to the first mass element 3611, the second elastic element 3622 may be connected to the second mass element 3612, and the third elastic element 3623 may be connected to the third mass element 3613.

In some embodiments, a distance between any two adjacent elastic elements of the first elastic element 3621, the second elastic element 3622, and the third elastic element 3623 may be greater than or equal to a maximum amplitude of the two adjacent elastic elements, which can ensure that the elastic element may not interfere with adjacent elastic elements when vibrating and affect the transmission effect of the vibration signal. In some embodiments, when the vibration assembly 220 includes a plurality of groups of elastic elements and mass elements, the elastic elements may be disposed sequentially in the vibration direction of the vibration assembly 220, and the distances between adjacent elastic elements may be the same or different. In some embodiments, gaps between the elastic elements and the adjacent elastic elements may form a plurality of cavities, and the plurality of cavities between the elastic elements and the adjacent elastic elements may accommodate air and allow the elastic element to vibrate therein.

In some embodiments, the vibration assembly 220 may further include a limit structure (not shown in the figure), which may be configured to make the distance between adjacent elastic elements of the vibration assembly 220 greater than or equal to the maximum amplitude of the adjacent elastic elements. In some embodiments, the limit structure may be connected to an edge of the elastic element, and the limit structure may not interfere with the vibration of the elastic element by controlling damping of the limit structure.

In some embodiments, there may be a plurality of mass elements in each group of elastic elements and mass elements (which may also be referred to as a group of vibration assembly), and the plurality of mass elements may be respectively disposed on both sides of the elastic element. Exemplarily, it is assumed that a group of vibration assembly includes two mass elements, and the two mass elements may be symmetrically disposed on both sides of the elastic element. In some embodiments, the mass elements in a plurality of groups of vibration assemblies may be located on a same side of the elastic element. The mass elements may be disposed on an outer side or inner side of the elastic element. A side of the elastic element close to the acoustic transducer 210 may be the inner side, and a side away from the acoustic transducer 210 may be the outer side. It should be noted that, in some embodiments, the mass elements in the plurality of groups of vibration assemblies may be located on different sides of the elastic elements, for example, the first mass element 3611 and the second mass element 3612 may be located on the outer side of the corresponding elastic element, and the third mass element 3613 may be located on the inner side of the corresponding elastic element.

In some embodiments, the elastic element may be configured as a membrane-like structure capable of allowing air to pass through, and in some embodiments, the elastic element may be a gas permeable membrane. The elastic element may be configured to allow air to pass through, so that the vibration signal may make the vibration assembly 220 vibrate, at the same time further penetrate the air permeable membrane, and may be received by the acoustic transducer, thereby improving the sensitivity in a target frequency band. In some embodiments, materials and sizes of the plurality of elastic elements of the vibration assembly 220 may be different or the same. Exemplarily, a radius of the third elastic element 3623 may be larger than a radius of the first elastic element 3621 and the second elastic element 3622.

In some embodiments, when the elastic element is configured to be airtight, a material of the elastic element may be a polymer membrane (e.g., polyurethane, epoxy resin, acrylate), or a metal membrane (e.g., copper, aluminum, tin, other alloys and composite membranes thereof). In some embodiments, the material of the elastic element may also be obtained by processing the air permeable membrane (e.g., covering air permeable holes).

In some embodiments, the elastic element may be a membrane material with through holes. Specifically, a diameter of the through hole may be 0.01 μm~10 μm. As a preference, the diameter of the through hole may be 0.1 μm~5 μm, such as 0.2 μm, 0.5 μm, 0.8 μm, 1 μm, or 2 μm. In some embodiments, diameters of the through holes on the plurality of elastic elements of the vibration assembly 220 may be the same or different, and diameters of the through holes on a single elastic element may be the same or different. In some embodiments, the diameter of the through hole may also be greater than 5 μm. When the diameter of the through hole is greater than 5 μm, other materials (e.g., silicone) may be disposed on the elastic element to cover part of the through holes or a part of an area of the through holes without affecting the air permeability.

In some embodiments, in a case where the vibration assembly 220 is provided with the plurality of elastic elements, an elastic element farthest from the acoustic transducer 210 may be configured not to allow air to pass through. As shown in FIG. 36, the third elastic element 3623 in the figure may be configured not to allow air to pass through. Through the arrangement, a closed space may be formed between the third elastic element 3623, the acoustic transducer 210, and the support element 223, which may better response to vibration information. It should be noted that, in some embodiments, the elastic element farthest from the acoustic transducer 210 may be configured to allow air to pass through. For example, when a conduction housing is disposed outside the sound inlet hole 2111, the conduction housing and the acoustic transducer 210 may enclose an accommodation space, and the air in the accommodation space may better response to vibration information.

In some embodiments, the vibration assembly 220 may further include the support element 223. The support element 223 may be used to support the one or more groups of elastic elements and mass elements. The support element 223 may be physically connected to the acoustic transducer 210 (e.g., the substrate 211), and the one or more groups of elastic elements and mass elements may be connected to the support element 223. In some embodiments, the support element 223 may be connected to the elastic element to achieve fixed support to control the distance between adjacent elastic elements, so as to ensure the transmission effect of the vibration signal.

In some embodiments, the support element 223 may have a hollow tubular structure with openings at both ends, and a cross section of the tubular structure may be rectangular, triangular, circular or other shapes. In some embodiments, cross-sectional areas of the tubular structure may be the same everywhere, or may not be completely the same, for example, an end near the acoustic transducer 210 may have a larger cross-sectional area. In some embodiments, the one or more groups of mass elements and elastic elements of the vibration assembly 220 may be mounted at the opening of the support element 223.

In some embodiments, the elastic element may be embedded on an inner wall of the support element 223 or embedded in the support element 223. In some embodiments, the elastic element may vibrate in a space inside the support element 223 while the elastic element may completely cover the opening of the support element, i.e., an area of the elastic element may be greater than or equal to an opening area of the support element, which may make air vibration (e.g., sound wave) pass through the elastic element as completely as possible, and the vibration may be picked up by the sound pickup device 212, thereby effectively improving the sound pickup quality.

In some embodiments, the support element 223 may be made of an airtight material, and the airtight support element 223 may make the vibration signal in the air cause a sound pressure change (or air vibration) in the support element 223 in the transmission process, so that the internal vibration signal of the support element 223 may be transmitted to the acoustic transducer 210 through the sound inlet hole 2111 and may not escape outward through the support element 223 in the transmission process, thereby ensuring the sound pressure intensity and improving the sound transmission effect. In some embodiments, the support element 223 may include, but is not limited to, metal, an alloy material (e.g., aluminum alloy, chrome-molybdenum steel, scandium alloy, magnesium alloy, titanium alloy, magnesium-lithium alloy, nickel alloy), rigid plastic, foam, or the like, or any combination thereof.

In some embodiments, each group of the one or more groups of elastic elements and mass elements may correspond to a target frequency band of one or more different target frequency bands, so that a sensitivity of the vibration sensor 3600 may be greater than a sensitivity of the acoustic transducer 210 in the corresponding target frequency band. In some embodiments, the sensitivity of the vibration sensor 3600 attached with one or more groups of mass elements and elastic elements may be increased by 3 dB~30 dB compared with the acoustic transducer 210 in the target frequency band. It should be noted that, in some embodiments, the sensitivity of the vibration sensor 3600 attached with one or more groups of mass elements and elastic elements may be increased by more than 30 dB compared with the acoustic transducer 210, for example, the plurality of groups of mass elements and elastic elements may have a same resonance peak.

In some embodiments, the resonance frequency of one or more groups of mass elements and elastic elements may be within 1 kHz to 10 kHz. In some embodiments, the resonance frequency of one or more groups of mass elements and elastic elements may be within 1 kHz to 5 kHz. In some embodiments, at least two groups of mass elements and elastic elements of the plurality of groups of mass elements and elastic elements may have different resonance frequencies. In some embodiments, a difference between two adjacent resonance frequencies of the resonance frequencies of the plurality of groups of mass elements and elastic elements may be smaller than 2 kHz. The two adjacent resonance frequencies refer to two resonance frequencies that are numerically adjacent in magnitude of the resonance frequencies. Since the sensitivity of the vibration sensor 3600 corresponding to a frequency other than the resonance frequency may decrease rapidly, by controlling the resonance frequency difference, the vibration sensor 3600 may have a relatively large sensitivity in a relatively wide frequency band and at the same time, the sensitivity may not fluctuate greatly. In some embodiments, the difference between two adjacent resonance frequencies of the plurality of groups of mass elements and elastic elements may be smaller than or equal to 1.5 kHz. In some embodiments, the difference between two adjacent resonance frequencies of the plurality of groups of mass elements and elastic elements may be smaller than or equal to 1 kHz (e.g., 500 Hz, 700 Hz, 800 Hz). In some embodiments, the difference between two adjacent resonance frequencies of the plurality of groups of mass elements and elastic elements may be smaller than or equal to 500 Hz.

It should be noted that, in some embodiments, the plurality of groups of elastic elements and mass elements may have the same resonance frequency, so that the sensitivity in the target frequency band may be greatly improved. Exemplarily, when the vibration sensor 3600 is mainly used to detect mechanical vibration of 5 kHz to 5.5 kHz, the resonance frequencies of the plurality of groups of elastic elements and mass elements may be configured as values within a detection range (e.g., 5.3 kHz), so that the vibration sensor 3600 may have a greater sensitivity within the detection range than a vibration sensor where merely one group of elastic elements and mass elements is disposed. It should be noted that the count of groups of elastic elements and mass elements shown in FIG. 36 is merely for the purpose of illustration, and is not intended to limit the scope of the present disclosure. For example, the count of groups of elastic elements and mass elements may be one, two, four, etc.

In some embodiments, as shown in FIG. 36, the vibration sensor 3600 may further include the buffer 240. The buffer 240 may be disposed on a sidewall (e.g., the substrate 211, the first elastic element 3621) of the first acoustic cavity 250 in the vibration direction of the vibration assembly 220. The first acoustic cavity 250 may be formed by the substrate 211, the first elastic element 3621, and the support element 223. In some embodiments, the buffer 240 may be connected to the substrate 211 and/or the first elastic element 3621. The buffer 240 may provide a buffer distance in the vibration direction of the vibration assembly 220 for the vibration assembly 220 (especially, a group of elastic elements and mass elements closest to the substrate 211, e.g., the first elastic element 3621 and the first mass element 3611). In some embodiments, when the vibration sensor 3600 works, the vibration assembly 220 may extrude the buffer 240 when vibrating to a certain amplitude (e.g., when the first elastic element 3621 is in contact with the buffer component 240), thereby limiting the vibration amplitude of the vibration assembly 220, preventing the vibration assembly 220 from colliding with the substrate 211, and improving the reliability of the vibration sensor 3600.

In some embodiments, the buffer 240 may include a magnetic buffer. The magnetic buffer may be used to generate a magnetic field. In some embodiments, the magnetic buffer may be mounted on a sidewall of the first acoustic cavity 250 or embedded in the sidewall of the first acoustic cavity 250. The sidewall refers to the substrate 211. In some embodiments, when the buffer 240 includes a magnetic buffer, the mass element may include a magnetic member or a magnetizable member, the mass element may be located within the magnetic field generated by the magnetic buffer, and the mass element may be subjected to the magnetic force of the magnetic field. In some embodiments, the magnetic field generated by the magnetic buffer may adjust the force on the mass element, thereby limiting the vibration amplitude of the mass element.

In some embodiments, when the vibration sensor 3600 has a plurality of mass elements, some of the mass elements of the plurality of mass elements may have magnetic members or magnetizable members. As a preference, two mass elements relatively far apart of the plurality of mass elements may have magnetic members or magnetizable members, and the remaining mass elements have no magnetic members or magnetizable members. Taking the three mass elements shown in FIG. 36 as an example, the first mass element 3611 may have the magnetic member or magnetizable member, and the second mass element 3612 and the third mass element 3613 may have no magnetic members or magnetizable members. As another example, the first mass element 3611 and the third mass element 3613 may have magnetic members or magnetizable members, and the second mass element 3612 may have no magnetic member or magnetizable member. The arrangement may not only make the vibration amplitude of the mass elements with magnetic members or magnetizable members adjustable, but also avoid the mutual magnetic force between the mass elements with magnetic members or magnetizable members. In some embodiments, all mass elements of the plurality of mass elements may have magnetic members or magnetizable members. In the arrangement, the magnetic force between the plurality of mass elements may be adjusted by adjusting the magnetic permeability or magnetization of each of the plurality of mass elements.

Figure 37:
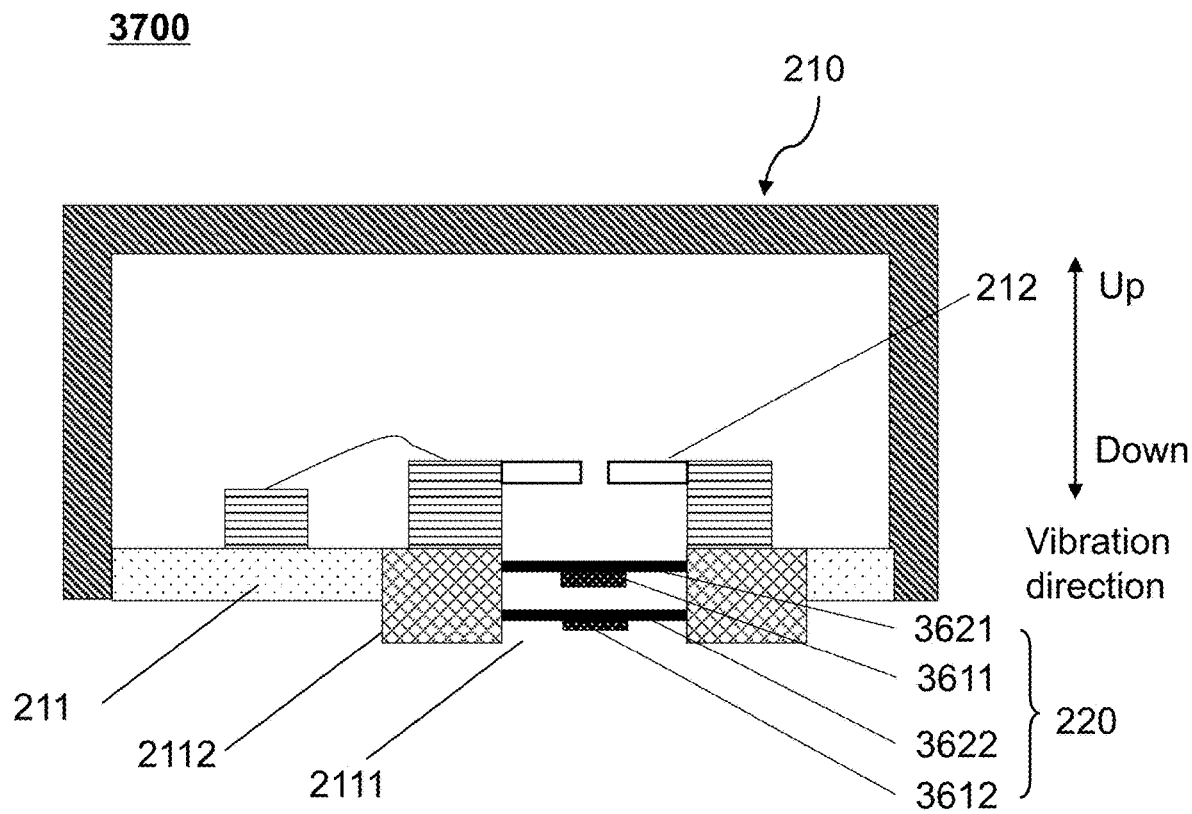
FIG. 37 is a structural diagram illustrating an exemplary vibration sensor according to some embodiments of the present disclosure.

FIG. 37 is a structural diagram illustrating a n exemplary vibration sensor according to some embodiments of the present disclosure.

The vibration sensor 3700 shown in FIG. 37 is similar to the vibration sensor 3600 shown in FIG. 36, and the difference lies in a position of a vibration assembly. In some embodiments, the vibration assembly 220 in the vibration sensor 3700 may be disposed in the sound inlet hole 2111 parallel to a radial section of the sound inlet hole 2111 (i.e., perpendicular to a vibration direction of the vibration assembly 220). An elastic element of the vibration assembly 220 may include the first elastic element 3621 and the second elastic element 3622 disposed in the sound inlet hole 2111 parallel to the radial section of the sound inlet hole 2111, and a mass element may include the first mass element 3611 and the second mass element 3612 disposed in the sound inlet hole 2111 parallel to the radial section of the sound inlet hole 2111. In some embodiments, a conduit 2112 may be disposed at the sound inlet hole 2111, and the conduit 2112 may be made of an airtight material, and a function of the conduit 2112 is similar to that of the support element 223 in the vibration sensor 3600. In some embodiments, in order to ensure free vibration of the mass element, the mass element may be not in contact with an inner wall of the sound inlet hole 2111 or the conduit 2112. It should be noted that the disposing the conduit 2112 is merely a specific embodiment, and may not limit the scope of the present disclosure. For example, in some embodiments, the conduit 2112 may not be disposed, and one or more groups of elastic elements and mass elements may be directly connected to the sound inlet hole 2111, or the support element may be disposed in the sound inlet hole 2111, and support the one or more groups of elastic elements and mass elements.

In some embodiments, the first mass element 3611 and the second mass element 3612 may simultaneously generate resonance in response to vibration of an external environment. The resonance generated by the first elastic element 3621, the second elastic element 3622, the first mass element 3611, and the second mass element 3612, together with the vibration from the outside, may be transmitted to the acoustic transducer 210 through the conduit 2112 and converted into an electrical signal, thereby achieving the process of the vibration signal being converted into the electrical signal after being strengthened in one or more target frequency bands. It should be noted that the count of groups of elastic elements and mass elements shown in FIG. 37 of two is merely for the purpose of illustration and may not limit the protection scope of the present disclosure. For example, the count of groups of elastic elements and quality elements may be one, three, or other numerical values.

In some embodiments, when the vibration assembly 220 is disposed in the sound inlet hole 2111, the buffer may include a magnetic buffer, and the magnetic buffer may be used to generate a magnetic field. In some embodiments, the magnetic buffer may include a coil, and the coil may be embedded in a sidewall of the first acoustic cavity 250 opposite to the substrate 211 (i.e., a housing of the vibration sensor 3700 away from the substrate 211) or mounted on the sidewall. In some embodiments, when the coil is embedded in the substrate 211, the coil may be formed by directly etching in the substrate 211. In some embodiments, when the buffer includes a magnetic buffer, the mass element may include a magnetic member or a magnetizable member, the mass element may be located within the magnetic field generated by the magnetic buffer, and the mass element may be subjected to the magnetic force of the magnetic field. In some embodiments, the magnetic field generated by the magnetic buffer may adjust the force on the mass element, thereby limiting the vibration amplitude of the vibration assembly 220 and preventing the vibration assembly 220 from colliding with other components (e.g., the pickup device 212) of the vibration sensor 3700.

In some embodiments, when the vibration sensor 3600 has a plurality of mass elements, some of the mass elements of the plurality of mass elements may have magnetic members or magnetizable members. As a preference, a mass element close to the sound pickup device 212 may include the magnetic member or magnetizable member, and the remaining mass elements may not include the magnetic member or magnetizable member. More descriptions regarding the distribution of the mass element with the magnetic member or magnetizable member of the plurality of mass elements may be found in FIG. 14B and FIG. 36 and the related descriptions thereof.

Having thus described the basic concepts, it may be rather apparent to those skilled in the art after reading this detailed disclosure that the foregoing detailed disclosure is intended to be presented by way of example only and is not limiting Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "data block," "module," "engine," "unit," "component," or "system." Furthermore, aspects of the present disclosure may take the form of a computer program product embodied in one or more computer-readable media having computer-readable program code embodied thereon.

A non-transitory computer-readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer-readable signal medium may be any computer-readable medium that is not a computer-readable storage medium and that may communicate, propagate, or transport a program for use by or in connection with an instruction execution system, apparatus, or device. Program code embodied on a computer-readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB, NET, Python or the like, conventional procedural programming languages, such as the "C" programming language, Visual Basic, Fortran 2003, Perl, COBOL 2002, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A vibration sensor, comprising:
   a vibration assembly, the vibration assembly including a mass element and an elastic element, and the mass element being connected to the elastic element;
   a first acoustic cavity, the elastic element constituting one of sidewalls of the first acoustic cavity, and the vibration assembly vibrating to make a volume of the first acoustic cavity change in response to an external vibration signal;
   an acoustic transducer, the acoustic transducer being in communication with the first acoustic cavity and the acoustic transducer generating an electrical signal in response to a volume change of the first acoustic cavity;

a buffer, the buffer limiting a vibration amplitude of the vibration assembly, wherein the acoustic transducer has a first resonance frequency, the vibration assembly has a second resonance frequency, and the second resonance frequency is smaller than the first resonance frequency; and a housing, wherein the housing receives the external vibration signal and transmits the external vibration signal to the vibration assembly, the housing forms an acoustic cavity, the vibration assembly is located in the acoustic cavity and separates the acoustic cavity into the first acoustic cavity and a second acoustic cavity, the elastic element is disposed opposite to the acoustic transducer, at least one convex structure is disposed on a side of the elastic element facing the first acoustic cavity, the elastic element drives the at least one convex structure to move in response to the external vibration signal, and the movement of the at least one convex structure changes the volume of the first acoustic cavity.

2. The vibration sensor of claim 1, wherein at a frequency smaller than 1000 Hz, a sensitivity of the vibration assembly is greater than or equal to −40 dB.

3. The vibration sensor of claim 1, wherein the second resonance frequency is smaller than the first resonance frequency by 1 kHz-10 KHz.

4. The vibration sensor of claim 1, wherein the buffer is disposed on a sidewall of the first acoustic cavity that is perpendicular to a vibration direction of the vibration assembly, the buffer provides a buffer distance in the vibration direction of the vibration assembly for the vibration assembly, and the buffer distance is greater than or equal to 0 and is smaller than a maximum vibration amplitude of the vibration assembly.

5. The vibration sensor of claim 1, wherein the buffer is disposed in at least one of the first acoustic cavity and the second acoustic cavity, and the buffer provides a buffer distance in a vibration direction of the vibration assembly for the vibration assembly.

6. The vibration sensor of claim 5, wherein the buffer includes a first buffer part and a second buffer part, and the first buffer part and the second buffer part are respectively disposed on both sides of the elastic element in the vibration direction of the vibration assembly.

7. The vibration sensor of claim 6, wherein the first buffer part is connected to the housing or the elastic element, and the second buffer part is connected to the elastic element or the acoustic transducer.

8. The vibration sensor of claim 7, wherein the first buffer part includes a plurality of first buffer blocks, and the second buffer part includes a plurality of second buffer blocks.

9. The vibration sensor of claim 5, wherein one end of the buffer in the vibration direction of the vibration assembly is connected to the elastic element, and another end of the buffer in the vibration direction of the vibration assembly is connected to the housing or the acoustic transducer.

10. The vibration sensor of claim 9, wherein the buffer includes a first buffer part and a second buffer part, and the first buffer part and the second buffer part are respectively disposed on both sides of the elastic element in the vibration direction of the vibration assembly.

11. The vibration sensor of claim 9, wherein there are a plurality of buffers, and the plurality of the buffers are spaced along a circumferential direction of the elastic element.

12. The vibration sensor of claim 1, wherein
the buffer includes a magnetic buffer used to generate a magnetic field; and
the mass element includes a magnetic member or a magnetizable member, and the mass element is located within the magnetic field.

13. The vibration sensor of claim 12, wherein the magnetic buffer includes a coil, the coil being mounted on a sidewall of the acoustic transducer connected to the first acoustic cavity.

14. The vibration sensor of claim 13, wherein the coil is embedded in the sidewall of the acoustic transducer connected to the first acoustic cavity.

15. The vibration sensor of claim 12, wherein the vibration assembly includes one or more groups of diaphragms and mass blocks, and in each group of diaphragm and mass block, the mass block is physically connected to the diaphragm.

16. The vibration sensor of claim 15, wherein the vibration assembly further includes a support element configured to support the one or more groups of diaphragms and mass blocks, the support element is physically connected to the acoustic transducer, and the one or more groups of diaphragms and mass blocks are connected to the support element.

17. The vibration sensor of claim 1, wherein
the buffer is disposed in the first acoustic cavity, and the buffer is connected to at least one of the mass element and the acoustic transducer; and/or
the buffer is disposed in the second acoustic cavity, and the buffer is connected to at least one of the mass element and the housing.

18. The vibration sensor of claim 1, wherein
the buffer includes a coil used to generate a magnetic field;
the mass element includes a magnetic member or a magnetizable member, and the mass element is located within the magnetic field; and
the coil is mounted on a sidewall of the acoustic transducer connected to the first acoustic cavity.

* * * * *